(12) United States Patent
Ericksen et al.

(10) Patent No.: US 11,794,543 B2
(45) Date of Patent: *Oct. 24, 2023

(54) METHOD AND APPARATUS FOR AN ADJUSTABLE DAMPER

(71) Applicant: Fox Factory, Inc., Duluth, GA (US)

(72) Inventors: Everet Owen Ericksen, Woodland, CA (US); Christopher Paul Cox, Capitola, CA (US); Philip Tsiaras, Dacula, GA (US); Mark Larson, Santa Cruz, CA (US); Mario Galasso, Sandy Hook, CT (US); Matt McLellan, Fremont, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,730

(22) Filed: Oct. 19, 2020

(65) Prior Publication Data

US 2021/0031582 A1 Feb. 4, 2021

Related U.S. Application Data

(60) Continuation of application No. 16/051,346, filed on Jul. 31, 2018, now Pat. No. 10,807,433, which is a
(Continued)

(51) Int. Cl.
*B60G 17/016* (2006.01)
*F16F 9/512* (2006.01)
(Continued)

(52) U.S. Cl.
CPC ......... *B60G 17/016* (2013.01); *B60G 17/015* (2013.01); *B60G 17/018* (2013.01);
(Continued)

(58) Field of Classification Search
CPC .. B60G 17/016; B60G 17/015; B60G 17/018; B60G 17/08; B60G 2202/24;
(Continued)

(56) References Cited

U.S. PATENT DOCUMENTS

| 435,995 A | 9/1890 | Dunlop |
| 1,078,060 A | 11/1913 | Newman |

(Continued)

FOREIGN PATENT DOCUMENTS

| CN | 101468587 A | 7/2009 |
| DE | 1555311 A1 | 8/1970 |

(Continued)

OTHER PUBLICATIONS

Kensuke, Suspension Control Device, machine translation of JPH05319054 (A), Dec. 3, 1993 (Year: 1993).*

(Continued)

*Primary Examiner* — Yuen Wong

(57) ABSTRACT

A method for controlling vehicle motion is described. The method includes accessing a set of control signals including a measured vehicle speed value associated with a movement of a vehicle. A control signal associated with user-induced input is also accessed. The method compares the measured vehicle speed value with a predetermined vehicle speed threshold value to achieve a speed value threshold approach status, and then compares the set of values to achieve a user-induced input threshold value approach status. The method monitors a state of a valve within the vehicle suspension damper, and determines a control mode for the vehicle suspension damper. The method also regulates damping forces within the vehicle suspension damper.

10 Claims, 41 Drawing Sheets

Related U.S. Application Data division of application No. 15/275,078, filed on Sep. 23, 2016, now Pat. No. 10,040,329, which is a division of application No. 14/466,831, filed on Aug. 22, 2014, now Pat. No. 9,452,654, which is a continuation-in-part of application No. 14/251,446, filed on Apr. 11, 2014, now Pat. No. 10,047,817, which is a continuation-in-part of application No. 13/934,067, filed on Jul. 2, 2013, now Pat. No. 10,060,499, which is a continuation-in-part of application No. 13/843,704, filed on Mar. 15, 2013, now Pat. No. 9,033,122, said application No. 14/251,446 is a continuation-in-part of application No. 13/485,401, filed on May 31, 2012, now abandoned, said application No. 14/251,446 is a continuation-in-part of application No. 13/189,216, filed on Jul. 22, 2011, now Pat. No. 9,239,090, which is a continuation-in-part of application No. 13/175,244, filed on Jul. 1, 2011, now Pat. No. 8,627,932, said application No. 13/189,216 is a continuation-in-part of application No. 13/010,697, filed on Jan. 20, 2011, now Pat. No. 8,857,580, said application No. 14/251,446 is a continuation-in-part of application No. 12/684,072, filed on Jan. 7, 2010, now abandoned.

(60) Provisional application No. 61/709,041, filed on Oct. 2, 2012, provisional application No. 61/667,327, filed on Jul. 2, 2012, provisional application No. 61/645,465, filed on May 10, 2012, provisional application No. 61/491,858, filed on May 31, 2011, provisional application No. 61/361,127, filed on Jul. 2, 2010, provisional application No. 61/296,826, filed on Jan. 20, 2010, provisional application No. 61/143,152, filed on Jan. 7, 2009.

(51) Int. Cl.
*B60G 17/018* (2006.01)
*B60G 17/08* (2006.01)
*B60G 17/015* (2006.01)

(52) U.S. Cl.
CPC .............. *B60G 17/08* (2013.01); *F16F 9/512* (2013.01); *F16F 9/5126* (2013.01); *B60G 2202/24* (2013.01); *B60G 2206/41* (2013.01); *B60G 2400/104* (2013.01); *B60G 2400/202* (2013.01); *B60G 2400/204* (2013.01); *B60G 2400/208* (2013.01); *B60G 2400/252* (2013.01); *B60G 2400/33* (2013.01); *B60G 2400/34* (2013.01); *B60G 2400/39* (2013.01); *B60G 2400/41* (2013.01); *B60G 2400/44* (2013.01); *B60G 2400/5182* (2013.01); *B60G 2400/62* (2013.01); *B60G 2400/63* (2013.01); *B60G 2500/10* (2013.01); *B60G 2500/102* (2013.01); *B60G 2500/11* (2013.01); *B60G 2600/02* (2013.01); *B60G 2600/187* (2013.01); *B60G 2600/20* (2013.01); *B60G 2600/26* (2013.01); *B60G 2600/70* (2013.01); *B60G 2800/012* (2013.01); *B60G 2800/014* (2013.01); *B60G 2800/91* (2013.01)

(58) Field of Classification Search
CPC .......... B60G 2206/41; B60G 2400/104; B60G 2400/202; B60G 2400/204; B60G 2400/208; B60G 2400/252; B60G 2400/33; B60G 2400/34; B60G 2400/39; B60G 2400/41; B60G 2400/44; B60G 2400/5182; B60G 2400/62; B60G 2400/63; B60G 2500/10; B60G 2500/102; B60G 2500/11; B60G 2600/02; B60G 2600/187; B60G 2600/20; B60G 2600/26; B60G 2600/70; B60G 2800/012; B60G 2800/014; B60G 2800/91; F16F 9/512; F16F 9/5126

See application file for complete search history.

(56) References Cited

U.S. PATENT DOCUMENTS

| | | |
|---|---|---|
| 1,307,502 A | 6/1919 | Martin |
| 1,313,763 A | 8/1919 | Thomas |
| 1,409,849 A | 3/1922 | Haeberlein |
| 1,468,652 A | 9/1923 | Storey et al. |
| 1,492,731 A | 5/1924 | Kerr |
| 1,560,477 A | 11/1925 | Kessler |
| 1,571,788 A | 2/1926 | Bramlette, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 1,970,239 A | 8/1934 | Klaas |
| 2,018,312 A | 10/1935 | Moulton |
| 2,098,119 A | 11/1937 | White |
| 2,115,072 A | 4/1938 | Hunt et al. |
| 2,122,407 A | 7/1938 | Chisholm |
| 2,186,266 A | 1/1940 | Henry |
| 2,259,437 A | 10/1941 | Dean |
| 2,354,340 A | 7/1944 | Utter |
| 2,363,867 A | 11/1944 | Isely |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,778,378 A | 1/1957 | Presnell |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Ransom et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,207,270 A | 9/1965 | Ellis |
| 3,216,535 A | 11/1965 | Schultze |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,447,644 A | 6/1969 | Duckett |
| 3,494,606 A | 2/1970 | Hanchen |
| 3,528,700 A | 9/1970 | Janu et al. |

(56) References Cited

U.S. PATENT DOCUMENTS

| | | |
|---|---|---|
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,618,972 A | 11/1971 | Buhl |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,981,204 A | 9/1976 | Starbard et al. |
| 3,981,479 A | 9/1976 | Foster et al. |
| 3,986,118 A | 10/1976 | Madigan |
| 3,995,883 A | 12/1976 | Glaze |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,106,522 A | 8/1978 | Manesse |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,166,612 A | 9/1979 | Freitag et al. |
| 4,174,098 A | 11/1979 | Baker et al. |
| 4,183,509 A | 1/1980 | Nishikawa et al. |
| 4,236,613 A | 12/1980 | Van Der Lely |
| 4,287,812 A | 9/1981 | Iizumi |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,550,899 A | 11/1985 | Holley |
| 4,570,851 A | 2/1986 | Cirillo et al. |
| 4,572,317 A | 2/1986 | Isono et al. |
| 4,588,053 A | 5/1986 | Foster |
| 4,616,810 A | 10/1986 | Richardson et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori et al. |
| 4,659,104 A | 4/1987 | Tanaka et al. |
| 4,660,689 A | 4/1987 | Hayashi et al. |
| 4,662,616 A | 5/1987 | Hennells |
| 4,673,194 A | 6/1987 | Sugasawa |
| 4,696,489 A | 9/1987 | Fujishiro et al. |
| 4,709,779 A | 12/1987 | Fakehara |
| 4,723,753 A | 2/1988 | Torimoto et al. |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Wander et al. |
| 4,773,671 A | 9/1988 | Inagaki |
| 4,786,034 A | 11/1988 | Heess et al. |
| 4,802,561 A | 2/1989 | Knecht et al. |
| 4,806,082 A | 2/1989 | Schenk |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |
| 4,838,394 A | 6/1989 | Lemme et al. |
| 4,838,527 A | 6/1989 | Holley |
| 4,846,317 A | 7/1989 | Hudgens |
| 4,858,733 A | 8/1989 | Noguchi et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,972,928 A | 11/1990 | Sirven |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,910 A | 10/1991 | Iwata et al. |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,127,634 A | 7/1992 | Le Gourvellec |
| 5,152,547 A | 10/1992 | Davis |
| 5,161,653 A | 11/1992 | Hare |
| 5,161,817 A | 11/1992 | Daum et al. |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,774 A | 5/1993 | Wolfe et al. |
| 5,230,364 A | 7/1993 | Leng et al. |
| 5,231,583 A | 7/1993 | Lizell |
| 5,236,169 A | 8/1993 | Johnsen et al. |
| 5,246,247 A | 9/1993 | Runkel |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,275,086 A | 1/1994 | Stallings, Jr. |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,074 A | 3/1994 | Williams |
| 5,295,563 A | 3/1994 | Bennett |
| 5,297,045 A | 3/1994 | Williams et al. |
| 5,301,776 A | 4/1994 | Beck |

(56) References Cited

U.S. PATENT DOCUMENTS

| | | |
|---|---|---|
| 5,307,907 A | 5/1994 | Nakamura et al. |
| 5,310,203 A | 5/1994 | Chen |
| 5,311,709 A | 5/1994 | Kobori et al. |
| 5,318,066 A | 6/1994 | Burgorf et al. |
| 5,328,004 A | 7/1994 | Fannin et al. |
| 5,346,242 A | 9/1994 | Karnopp |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,949 A | 2/1995 | Naganathan et al. |
| 5,392,885 A | 2/1995 | Patzenhauer et al. |
| 5,392,886 A | 2/1995 | Drummond |
| 5,396,973 A | 3/1995 | Schwemmer et al. |
| 5,398,787 A | 3/1995 | Woessner et al. |
| 5,413,196 A | 5/1995 | Forster |
| 5,445,366 A | 8/1995 | Shih et al. |
| 5,467,280 A | 11/1995 | Kimura |
| 5,475,593 A | 12/1995 | Townend |
| 5,480,011 A | 1/1996 | Nagai et al. |
| 5,485,417 A | 1/1996 | Wolf et al. |
| 5,487,006 A | 1/1996 | Kakizaki et al. |
| 5,503,258 A | 4/1996 | Clarke et al. |
| 5,517,898 A | 5/1996 | Kim et al. |
| 5,542,150 A | 8/1996 | Tu |
| 5,551,674 A | 9/1996 | Johnsen |
| 5,553,836 A | 9/1996 | Ericson |
| 5,558,190 A | 9/1996 | Chang |
| 5,566,794 A | 10/1996 | Wiard |
| 5,578,877 A | 11/1996 | Tiemann |
| 5,586,637 A | 12/1996 | Aidlin et al. |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,735,372 A | 4/1998 | Hamilton et al. |
| 5,803,443 A | 9/1998 | Chang |
| 5,806,159 A | 9/1998 | Ohnishi et al. |
| 5,810,128 A | 9/1998 | Eriksson et al. |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | Defreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,850,896 A | 12/1998 | Tanaka |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O'Callaghan |
| 5,957,252 A | 9/1999 | Berthold |
| 5,971,116 A | 10/1999 | Franklin |
| 5,987,368 A | 11/1999 | Kamimae et al. |
| 5,988,330 A | 11/1999 | Morris |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,079,526 A | 6/2000 | Nezu et al. |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A | 9/2000 | Graham et al. |
| 6,120,049 A | 9/2000 | Gonzalez et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,157,103 A | 12/2000 | Ohta et al. |
| 6,179,098 B1 | 1/2001 | Hayakawa et al. |
| 6,182,687 B1 | 2/2001 | Förster et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,290,034 B1 | 9/2001 | Ichimaru |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,460,567 B1 | 10/2002 | Hansen et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,527,093 B2 | 3/2003 | Oliver et al. |
| 6,592,136 B2 | 7/2003 | Becker et al. |
| 6,604,751 B2 | 8/2003 | Fox |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |

(56) References Cited

U.S. PATENT DOCUMENTS

| | | |
|---|---|---|
| 6,651,788 B1 | 11/2003 | Wohlfarth |
| 6,659,240 B2 | 12/2003 | Dernebo |
| 6,659,241 B2 | 12/2003 | Sendrea |
| 6,672,687 B2 | 1/2004 | Nishio |
| 6,701,234 B1 | 3/2004 | Vogelsang et al. |
| 6,722,678 B2 | 4/2004 | Mcandrews |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,883,650 B2 | 4/2005 | Van Wonderen et al. |
| 6,902,513 B1 | 6/2005 | Mcclure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | Mcandrews |
| 7,025,367 B2 | 4/2006 | Mckinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,208,845 B2 | 4/2007 | Schaefer et al. |
| 7,217,224 B2 | 5/2007 | Thomas |
| 7,234,574 B2 | 6/2007 | Matsunaga et al. |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | Mcandrews |
| 7,270,222 B1 | 9/2007 | Aymar et al. |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | Laplante et al. |
| 7,302,961 B2 | 12/2007 | Martin et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Munster et al. |
| 7,484,603 B2 | 2/2009 | Fox |
| 7,490,705 B2 | 2/2009 | Fox |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | Mcandrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,744,097 B2 | 6/2010 | Noguchi |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedei et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | Mcintyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,328,454 B2 | 12/2012 | Mcandrews et al. |
| 8,336,683 B2 | 12/2012 | Mcandrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |

(56) References Cited

U.S. PATENT DOCUMENTS

| | | |
|---|---|---|
| 8,458,080 B2 | 6/2013 | Shirai |
| 8,480,064 B2 | 7/2013 | Talavasek |
| 8,495,947 B2 | 7/2013 | Hata |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,930 B2 | 1/2014 | Smith et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,684,367 B2 | 4/2014 | Haugen |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |
| 9,810,282 B2 | 11/2017 | Roessle et al. |
| 9,975,598 B2 | 5/2018 | Bender et al. |
| 10,029,172 B2 | 7/2018 | Galasso et al. |
| 10,036,443 B2 | 7/2018 | Galasso et al. |
| 10,040,328 B2 | 8/2018 | Marking |
| 10,040,329 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 | 12/2018 | Galasso et al. |
| 10,180,171 B2 | 1/2019 | Laird et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,400,847 B2 | 9/2019 | Marking |
| 10,406,883 B2 | 9/2019 | Marking |
| 10,415,662 B2 | 9/2019 | Marking |
| 10,443,671 B2 | 10/2019 | Marking |
| 10,473,179 B2 | 11/2019 | Ripa |
| 10,550,909 B2 | 2/2020 | Haugen |
| 10,677,309 B2 | 6/2020 | Ericksen et al. |
| 10,697,514 B2 | 6/2020 | Marking |
| 10,718,397 B2 | 7/2020 | Marking |
| 10,737,546 B2 | 8/2020 | Tong |
| 11,162,555 B2 | 11/2021 | Haugen |
| 11,279,198 B2 | 3/2022 | Marking |
| 11,472,252 B2 | 10/2022 | Tong |
| 11,519,477 B2 | 12/2022 | Marking |
| 11,708,878 B2 | 7/2023 | Marking |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1* | 1/2003 | Hamilton ........... B60G 17/0152 280/5.515 |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | Laplante et al. |
| 2003/0191567 A1 | 10/2003 | Gentilcore |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Takeda et al. |
| 2004/0208687 A1 | 10/2004 | Sicz et al. |
| 2004/0220708 A1 | 11/2004 | Owen et al. |
| 2004/0220712 A1 | 11/2004 | Fakeda et al. |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0056507 A1 | 3/2005 | De Molina et al. |
| 2005/0077131 A1 | 4/2005 | Russell |
| 2005/0098401 A1 | 5/2005 | Hamilton et al. |
| 2005/0104320 A1 | 5/2005 | Wesling et al. |

(56) References Cited

U.S. PATENT DOCUMENTS

| | | |
|---|---|---|
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0254365 A1 | 11/2006 | Hamel |
| 2006/0265144 A1 | 11/2006 | Frolik |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | Mcandrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0260372 A1 | 11/2007 | Langer |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | Mcandrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | Mcandrews |
| 2009/0001684 A1 | 1/2009 | Mcandrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1 | 10/2009 | Mcintyre |
| 2009/0277736 A1 | 11/2009 | Mcandrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | Mcandrews et al. |
| 2010/0004097 A1 | 1/2010 | D'Eredita |
| 2010/0010709 A1 | 1/2010 | Song |
| 2010/0025946 A1 | 2/2010 | Inoue et al. |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0326780 A1 | 12/2010 | Murakami |
| 2010/0327542 A1 | 12/2010 | Hara et al. |
| 2011/0022266 A1 | 1/2011 | Ippolito et al. |
| 2011/0067965 A1 | 3/2011 | Mcandrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0221228 A1 | 8/2012 | Noumura et al. |
| 2012/0222927 A1 | 9/2012 | Marking |

(56) References Cited

U.S. PATENT DOCUMENTS

| | | |
|---|---|---|
| 2012/0228906 A1 | 9/2012 | Mcandrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1 | 3/2015 | Takamoto et al. |
| 2015/0081171 A1 | 3/2015 | Ericksen et al. |
| 2015/0090547 A1 | 4/2015 | Haugen |
| 2015/0141056 A1 | 5/2015 | Fefilatyev et al. |
| 2015/0175236 A1 | 6/2015 | Walthert et al. |
| 2015/0179062 A1 | 6/2015 | Ralston et al. |
| 2015/0191069 A1 | 7/2015 | Zuleger et al. |
| 2015/0197308 A1 | 7/2015 | Butora et al. |
| 2015/0226283 A1 | 8/2015 | Marking |
| 2015/0233442 A1 | 8/2015 | Noguchi |
| 2015/0290993 A1 | 10/2015 | Dillman et al. |
| 2015/0291248 A1 | 10/2015 | Fukao et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0200163 A1 | 7/2016 | Tsukahara |
| 2016/0200164 A1 | 7/2016 | Tabata et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2016/0364989 A1 | 12/2016 | Speasl et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0268595 A1 | 9/2017 | Inagaki et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0118302 A1 | 5/2018 | Fukao et al. |
| 2018/0150764 A1 | 5/2018 | Stenneth |
| 2018/0156300 A1 | 6/2018 | Sakai |
| 2018/0174446 A1 | 6/2018 | Wang |
| 2018/0208011 A1 | 7/2018 | Wigg et al. |
| 2018/0222541 A1 | 8/2018 | Madau et al. |
| 2018/0304149 A1 | 10/2018 | Galasso et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0031264 A1 | 1/2019 | Laird et al. |
| 2019/0032745 A1 | 1/2019 | Marking |
| 2019/0154100 A1 | 5/2019 | Coaplen et al. |
| 2019/0176557 A1 | 6/2019 | Marking et al. |
| 2019/0184782 A1 | 6/2019 | Shaw et al. |
| 2019/0203798 A1 | 7/2019 | Cox et al. |
| 2019/0247744 A1 | 8/2019 | Galasso et al. |
| 2020/0191227 A1 | 6/2020 | Laird |
| 2022/0252129 A1 | 8/2022 | Haugen |

FOREIGN PATENT DOCUMENTS

| | | |
|---|---|---|
| DE | 3241901 A1 | 5/1984 |
| DE | 3613386 A1 | 10/1986 |
| DE | 3532292 A1 | 3/1987 |
| DE | 3536655 A1 | 4/1987 |
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4022099 C1 | 12/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 0403803 A1 | 12/1990 |
| EP | 552568 A1 | 7/1993 |
| EP | 0735280 A2 | 10/1996 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 1825220 A2 | 8/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 3786049 A1 | 3/2021 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2190461 A | 11/1987 |
| GB | 2282864 A | 4/1995 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | H05319054 A * | 1/1992 |
| JP | 04203540 A | 7/1992 |

(56) References Cited

FOREIGN PATENT DOCUMENTS

| | | | |
|---|---|---|---|
| JP | 05149364 A | 6/1993 | |
| JP | 06101735 A | 4/1994 | |
| JP | 06185562 A | 7/1994 | |
| JP | H084818 A | 1/1996 | |
| JP | 2005119548 A | 5/2005 | |
| JP | 2005119549 A | 5/2005 | |
| JP | 2007302211 A | 11/2007 | |
| JP | 2008238921 A | 10/2008 | |
| KR | 19980043226 U | 9/1998 | |
| KR | 20070076226 A | 7/2007 | |
| KR | 20100041679 A | 4/2010 | |
| RU | 2469224 C1 | 12/2012 | |
| WO | 9840231 A2 | 9/1998 | |
| WO | 99/06231 | 2/1999 | |
| WO | 0027658 A1 | 5/2000 | |
| WO | 03070546 A1 | 8/2003 | |
| WO | 2007017739 A2 | 2/2007 | |
| WO | 2007117884 A2 | 10/2007 | |
| WO | 2008086605 A1 | 7/2008 | |
| WO | 2008114445 A1 | 9/2008 | |
| WO | 2013066159 A1 | 5/2013 | |

OTHER PUBLICATIONS

European Search Report for European Application No. 19193903.2, 6 pages, dated Oct. 19, 2021 (dated Oct. 19, 2021).
European Search Report for European Application No. 19206334.5, 6 pages, dated May 12, 2020 (dated May 12, 2020).
European Search Report for European Application No. 19212356.0, 8 pages, dated May 7, 2020 (dated May 7, 2007).
Machine translation DE3613386; Oct. 1986.
Machine translation EP 0403803; Dec. 1990.
Machine translation KR20100041679; Apr. 2010.
European Search Report for European Application 19157767, dated Oct. 16, 2019, 9 Pages.
EP Search Report for European Application No. 21173940.4, dated Nov. 12, 2021, 9 Pages.
European Search Report for European Application No. 20187747, dated Nov. 18, 2020, 11 Pages.
Fachkunde Fahrradtechnik 4 Auflage, Gressmann_Inhaltv und S, 2011, 206-207.
Statement of Grounds of Appeal, EP App. No. 11153607.4, dated May 28, 2018, 88 Pages.
Grounds of Appeal, EP App. No. 11153607.4, dated Jun. 1, 2018, 28 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis For Claims Filed Jan. 23, 2015", European Patent Application No. 14189773.6, 2 Pages.
"Communication Re Oral Proceedings for European Application No. 10161906, dated Feb. 15, 2013 (Feb. 15, 2013)".
"European Search Report for European Application No. 09159949, 2 pages, dated Sep. 11, 2017 (dated Sep. 11, 2017)".
"European Search Report for European Application No. 10161906, 3 pages, dated Sep. 15, 2010 (dated Sep. 15, 2010)".
"European Search Report for European Application No. 11172612, 2 pages, dated Oct. 6, 2011 (dated Oct. 6, 2011))".
"European Search Report for European Application No. 11275170, 2 pages, dated Jan. 10, 2018 (dated Jan. 10, 2018)".
"European Search Report for European Application No. 13158034, 4 pages, dated Jun. 28, 2013 (dated Jun. 28, 2013))".
"European Search Report for European Application No. 15167426, 4 pages, dated Sep. 18, 2015 (dated Sep. 18, 2015))".
"European Search Report for European Application No. 16167306, 2 pages, dated Mar. 23, 2017 (dated Mar. 23, 2017)".
"European Search Report for European Application No. 17188022, 9 pages, dated Feb. 1, 2018 (dated Feb. 1, 2018))".
"European Search Report for EP Application No. 18154672, 3 pages, dated Aug. 28, 2018 (dated Aug. 28, 2018))".
"Notice of Intent to Grant EP Application 09159949.8 dated Nov. 14, 2019, pp. 48".
"Office Action for European Application No. 13158034.2, 5 pages, dated May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Puhn, "How To Make Your Car Handle", HPBooks, 1981, 7 Pages.
Thum, Notice of Opposition to a European Patent, EP App. No. 14189773.6, Dec. 13, 2018, 49 Pages.
Thum, "Oppostion Letter Against EP2357098", Oct. 16, 2018, 39.
Thum, "Oppostion Letter Against EP2357098", Dec. 17, 2019, 25 Pages.
Waechter, et al., "A Multibody Model for the Simulation of Bicycle Suspension Systems", Vehicle System Dynamics, vol. 37, No. 1, 2002, 3-28.
Electronic Translation of DE3709447A1.
English language abstract for EP 0207409 (no date).
European Search Report for European Application No. 19155995, 11 pages, dated Aug. 28, 2019.
European Search Report, European Patent Application No. 14189773.6, dated May 4, 2015, 4 Pages.
EP Search Report for European Application No. 15163428.4, dated Jul. 3, 2017, 7 Pages.
"European Patent Office Final Decision dated Mar. 21, 2013", European Patent Application No. 10161906.2.
"European Search Report for European Application No. 09177128, 4 pages, dated Aug. 25, 2010 (dated Aug. 25, 2010)".
"European Search Report for European Application No. 10187320, 12 pages, dated Sep. 25, 2017 (dated Sep. 25, 2017)".
"European Search Report for European Application No. 11153607, 3 pages, dated Aug. 10, 2012 (dated Aug. 10, 2012))".
"European Search Report for European Application No. 11172553, 2 pages, dated Sep. 25, 2017 (dated Sep. 25, 2017)".
"European Search Report for European Application No. 11175126, 2 pages, dated Sep. 25, 2017 (dated Sep. 25, 2017)".
"European Search Report for European Application No. 12170370, 2 pages, dated Nov. 15, 2017 (dated Nov. 15, 2017)".
"European Search Report for European Application No. 12184150, 10 pages, dated Dec. 12, 2017 (dated Dec. 12, 2017)".
"European Search Report for European Application No. 13174817.0, 13 pages, dated Jan. 8, 2018 (dated Jan. 8, 2018))".
"European Search Report for European Application No. 13189574, 2 pages, dated Feb. 19, 2014 (dated Feb. 19, 2014)".
"European Search Report for European Application No. 17154191, 2 pages, dated Jun. 28, 2017 (dated Jun. 28, 2017)".
"European Search Report and Written Opinion, European Patent Application No. 13165362.8", dated Sep. 24, 2014, 6 Pages.
Nilsson, "Opposition Letter Against EP-2357098", Oct. 13, 2017, 7.
Shiozaki, et al., "SP-861—Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Haller, E, EPO machine translation of CN 101468587 (A) Device with a suspension system and method for setting a suspension system, published on Jul. 1, 2009.

* cited by examiner

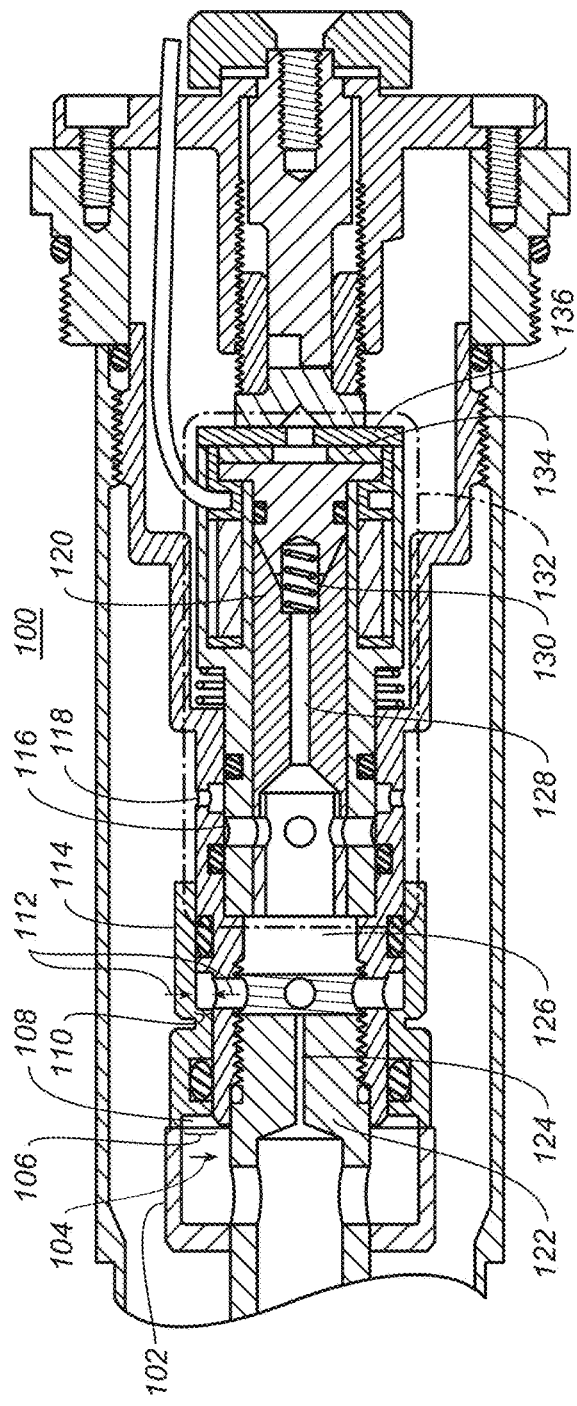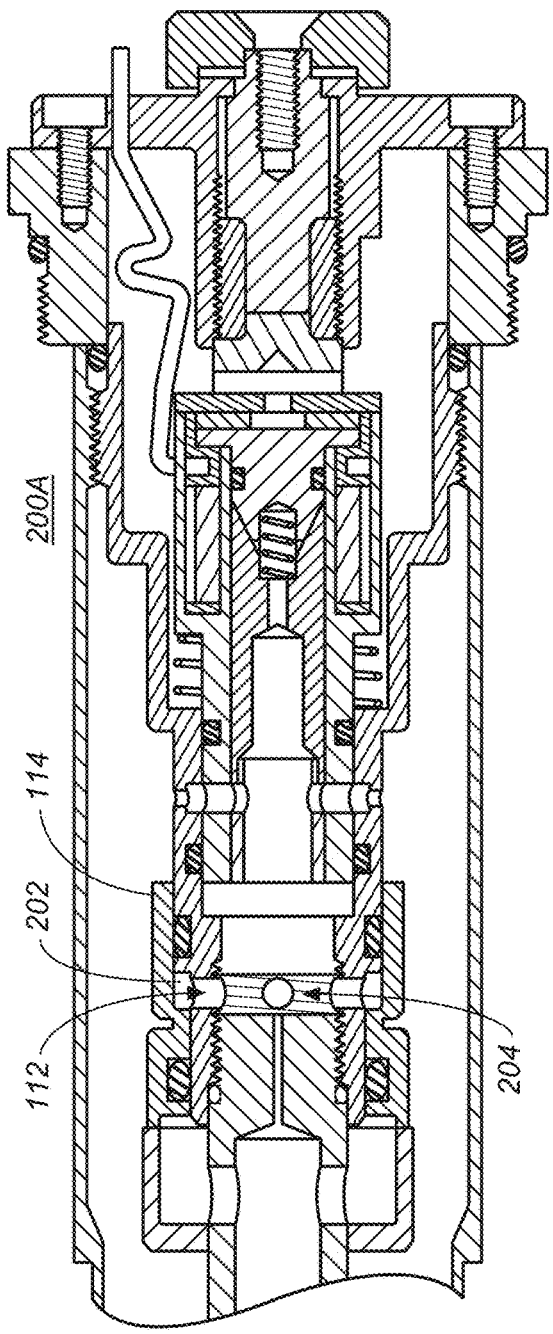
FIG. 1
FIG. 2A

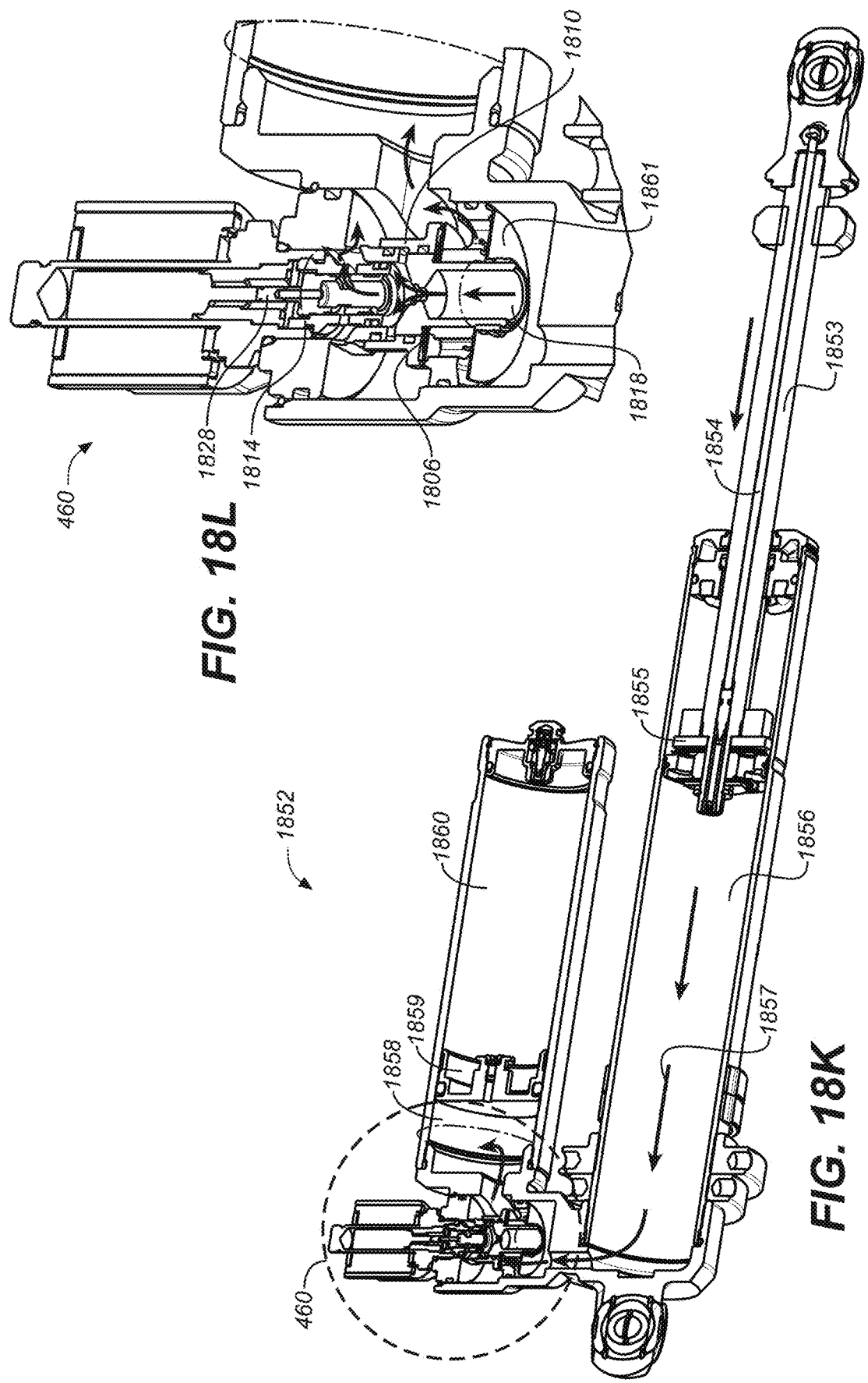

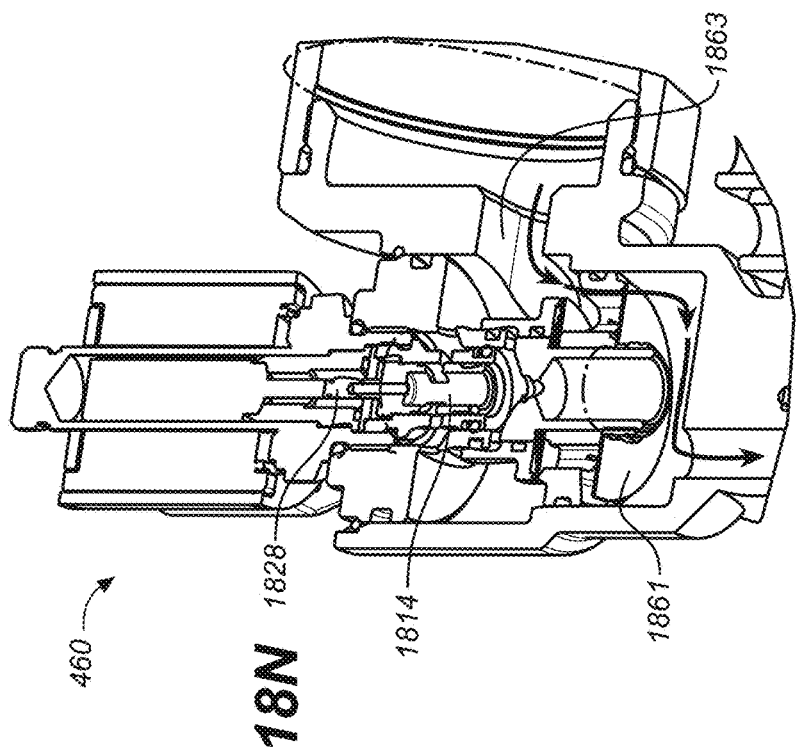
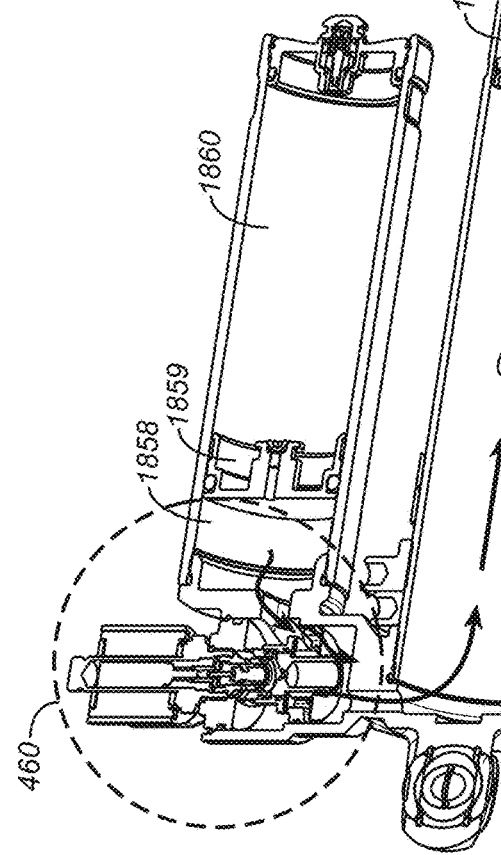
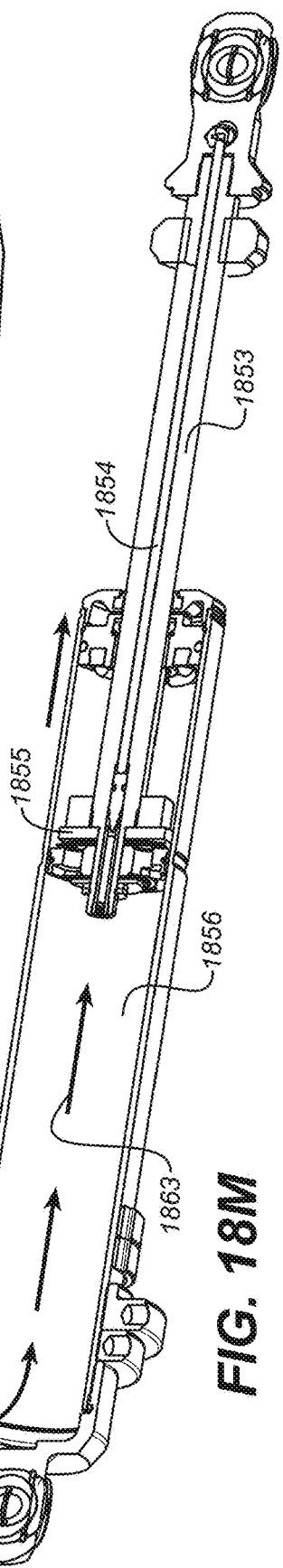
FIG. 18N
FIG. 18M

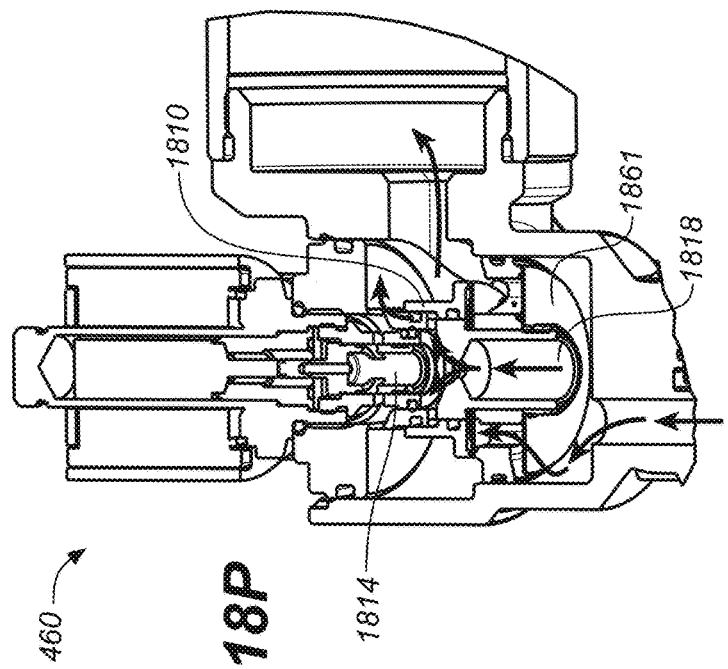
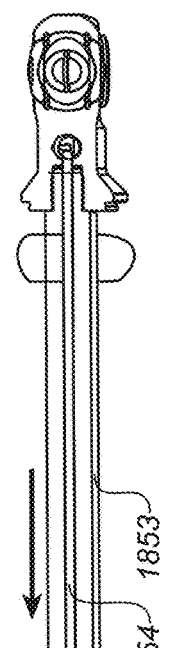
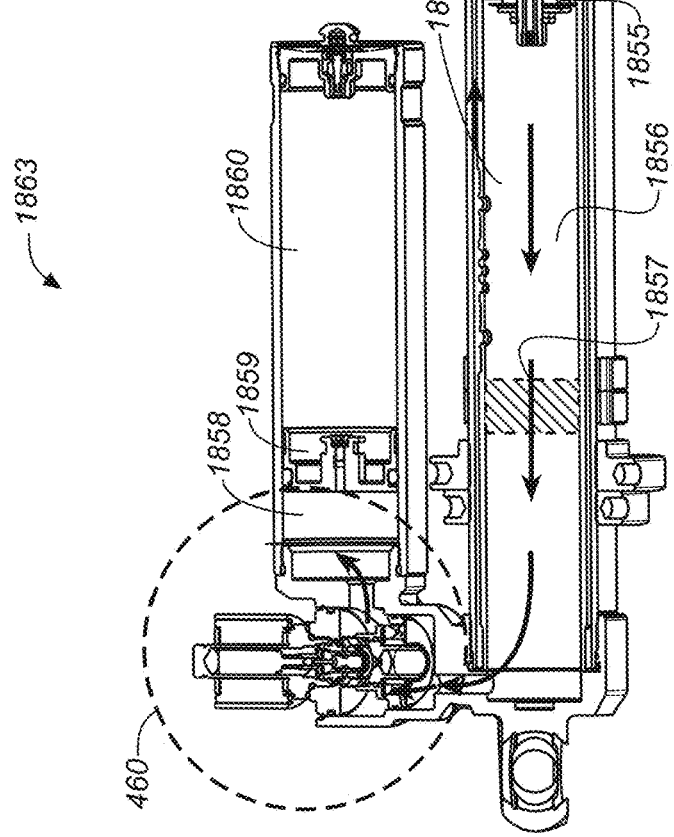
FIG. 18P
FIG. 18O

FIG. 18R1

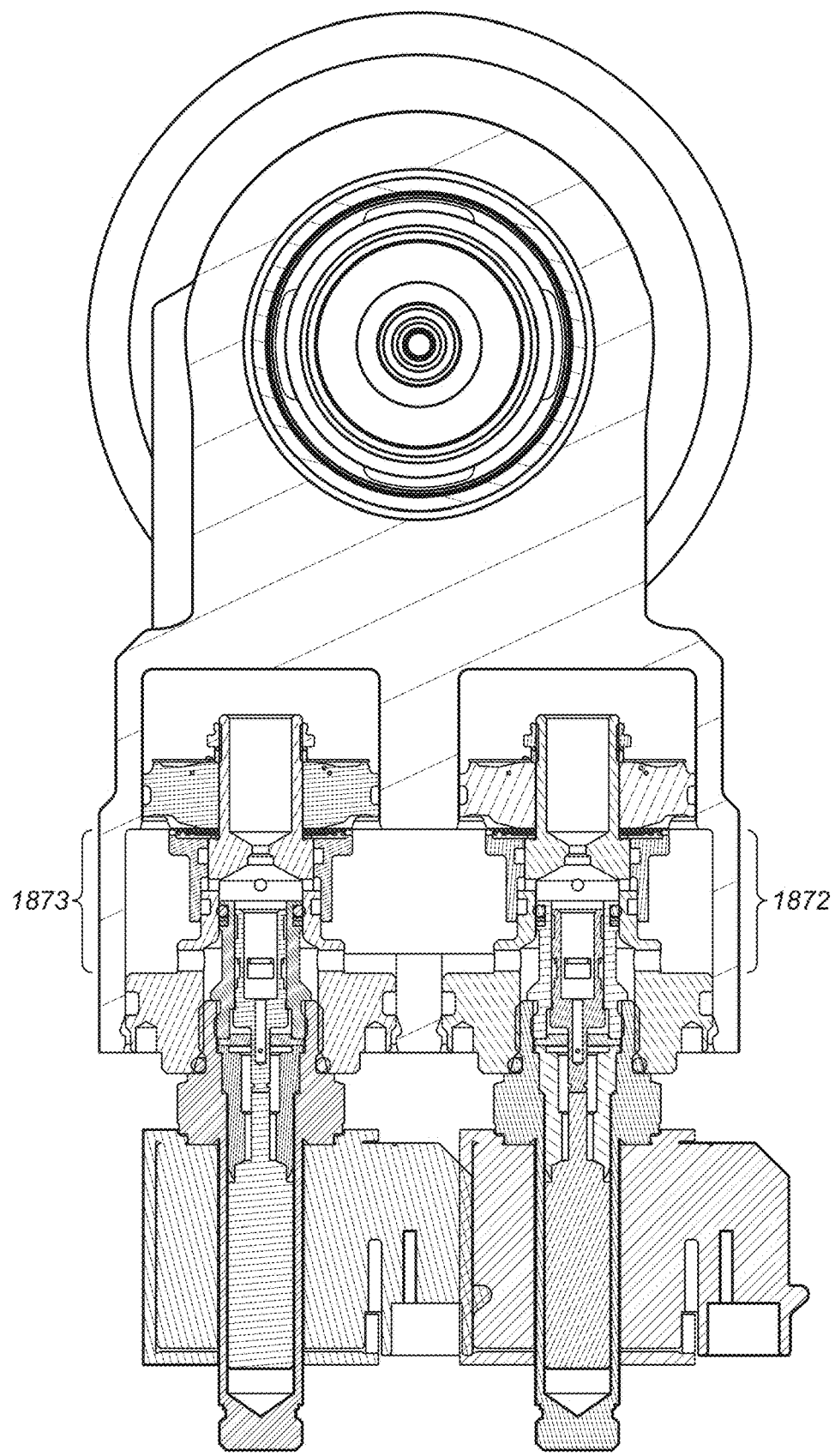
FIG. 18R2

METHOD AND APPARATUS FOR AN ADJUSTABLE DAMPER

CROSS-REFERENCE TO RELATED APPLICATIONS

This application is a continuation application of and claims the benefit of co-pending U.S. patent application Ser. No. 16/051,346, filed on Jul. 31, 2018, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 16/051,346 is a divisional application of and claims the benefit of U.S. patent application Ser. No. 15/275,078, filed on Sep. 23, 2016, now Issued U.S. Pat. No. 10,040,329, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 15/275,078 is a divisional application of and claims the benefit of U.S. patent application Ser. No. 14/466,831, now Issued U.S. Pat. No. 9,452,654, filed on Aug. 22, 2014, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 14/466,831 is a continuation-in-part application of and claims the benefit of U.S. patent application Ser. No. 14/251,446, filed on Apr. 11, 2014, now Issued U.S. Pat. No. 10,047,817, entitled "METHOD AND APPARATUS FOR ADJUSTABLE DAMPER" by Ericksen et al., assigned to the assignee of the present application, and is hereby incorporated by reference in its entirety herein.

The U.S. patent application Ser. No. 14/251,446 is a continuation-in-part application of and claims the benefit of U.S. patent application Ser. No. 13/934,067, filed on Jul. 2, 2013, now Issued U.S. Pat. No. 10,060,499, entitled "METHOD AND APPARATUS FOR ADJUSTABLE DAMPER" by Ericksen et al., assigned to the assignee of the present application, and is hereby incorporated by reference in its entirety herein.

The application with Ser. No. 13/934,067 is a continuation-in-part application of and claims the benefit of U.S. patent application Ser. No. 13/843,704, now Issued U.S. Pat. No. 9,033,122, filed on Mar. 15, 2013, entitled "METHOD AND APPARATUS FOR ADJUSTABLE DAMPER" by Ericksen et al., assigned to the assignee of the present application, and is hereby incorporated by reference in its entirety herein.

The application with Ser. No. 13/843,704, claims the benefit of and claims priority of U.S. provisional patent application Ser. No. 61/709,041, filed on Oct. 2, 2012, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 13/843,704, claims priority of U.S. provisional patent application Ser. No. 61/667,327, filed on Jul. 2, 2012, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 14/251,446 is a continuation-in-part application of and claims the benefit of U.S. patent application Ser. No. 13/485,401, now Abandoned, filed on May 31, 2012, entitled "METHODS AND APPARATUS FOR POSITION SENSITIVE SUSPENSION DAMPING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/491,858, filed on May 31, 2011, entitled "METHODS AND APPARATUS FOR POSITION SENSITIVE SUSPENSION DAMPENING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/645,465, filed on May 10, 2012, entitled "METHOD AND APPARATUS FOR AN ADJUSTABLE DAMPER" by Cox et al., assigned to the assignee of the present application, and is hereby incorporated by reference in its entirety herein.

The application with Ser. No. 14/251,446 is a continuation-in-part application of and claims the benefit of U.S. patent application Ser. No. 12/684,072, now Abandoned, filed on Jan. 7, 2010, entitled "REMOTELY OPERATED BYPASS FOR A SUSPENSION DAMPER" by John Marking, assigned to the assignee of the present application, and is hereby incorporated by reference in its entirety herein.

The application with Ser. No. 12/684,072 claims the benefit of and claims priority of U.S. provisional patent application Ser. No. 61/143,152, filed on Jan. 7, 2009, entitled "REMOTE BYPASS LOCK-OUT" by John Marking, assigned to the assignee of the present application, and is hereby incorporated by reference in its entirety herein.

The application with Ser. No. 14/251,446 is a continuation-in-part application of and claims the benefit of U.S. patent application Ser. No. 13/189,216, now Issued U.S. Pat. No. 9,239,090, filed on Jul. 22, 2011, entitled "SUSPENSION DAMPER WITH REMOTELY-OPERABLE VALVE" by John Marking, assigned to the assignee of the present application, and is hereby incorporated by reference in its entirety herein.

The application with Ser. No. 13/189,216 is a continuation-in-part application of and claims the benefit of U.S. patent application Ser. No. 13/010,697, now Issued U.S. Pat. No. 8,857,580, filed on Jan. 20, 2011, entitled "REMOTELY OPERATED BYPASS FOR A SUSPENSION DAMPER" by John Marking, assigned to the assignee of the present application, and is hereby incorporated by reference in its entirety herein.

The application with Ser. No. 13/010,697 claims the benefit of and claims priority of U.S. provisional patent application Ser. No. 61/296,826, filed on Jan. 20, 2010, entitled "BYPASS LOCK-OUT VALVE FOR A SUSPENSION DAMPER" by John Marking, assigned to the assignee of the present application, and is hereby incorporated by reference in its entirety herein.

The application with Ser. No. 13/189,216 is a continuation-in-part application of and claims the benefit of U.S. patent application Ser. No. 13/175,244, now Issued U.S. Pat. No. 8,627,932, filed on Jul. 1, 2011, entitled "BYPASS FOR A SUSPENSION DAMPER" by John Marking, assigned to the assignee of the present application, and is hereby incorporated by reference in its entirety herein.

The application with Ser. No. 13/175,244 claims the benefit of and claims priority of U.S. provisional patent application Ser. No. 61/361,127, filed on Jul. 2, 2010, entitled "BYPASS LOCK-OUT VALVE FOR A SUSPENSION DAMPER" by John Marking, assigned to the assignee of the present application, and is hereby incorporated by reference in its entirety herein.

BACKGROUND

Field of the Invention

Embodiments generally relate to a damper assembly for a vehicle. More specifically, the invention relates to an adjustable damper for use with a vehicle suspension.

Description of the Related Art

Vehicle suspension systems typically include a spring component or components and a dampening component or components. Typically, mechanical springs, like helical springs are used with some type of viscous fluid-based dampening mechanism and the two are mounted functionally in parallel. In some instances, a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there through which may be covered by shim stacks to provide for different operational characteristics in compression or extension.

Conventional damping components provide a constant damping rate during compression or extension through the entire length of the stroke. Other conventional damping components provide mechanisms for varying the damping rate. Further, in the world of bicycles, damping components are most prevalently mechanical. As various types of recreational and sporting vehicles continue to become more technologically advanced, what is needed in the art are improved techniques for varying the damping rate.

BRIEF DESCRIPTION OF THE DRAWINGS

Aspects of the present invention are illustrated by way of example, and not by way of limitation, in the accompanying drawings, wherein:

FIG. 1 depicts an example electronic valve of a vehicle suspension damper, in accordance with an embodiment.

FIGS. 2A-2C depict an electronic valve, in accordance with an embodiment.

FIG. 18K is an electronic valve 460 integrated into a monotube design of a shock absorber, with a piggy back chamber, in accordance with an embodiment.

FIG. 18L is an enlarged cross-sectional view of the base valve electronic valve of Detail A of FIG. 18K, in accordance with an embodiment.

FIG. 18M is the monotube design of FIG. 18K in a rebound position, in accordance with an embodiment.

FIG. 18N is an enlarged view of the electronic valve 460 shown in Detail A of FIG. 18M, in accordance with an embodiment.

FIG. 18O is the electronic valve 460 integrated into an internal bypass monotube design 1863 for a shock absorber, in accordance with an embodiment.

FIG. 18P is an enlarged view of the electronic valve 460 of Detail A shown in FIG. 18O, in accordance with an embodiment.

FIG. 18R1 is a side section view of the twin tube 1878 in a compression state, in accordance with an embodiment.

FIG. 18R2 is a section view of the two electronic valves of FIG. 18R1 positioned in parallel with each other, in accordance with an embodiment.

Figure 2B:
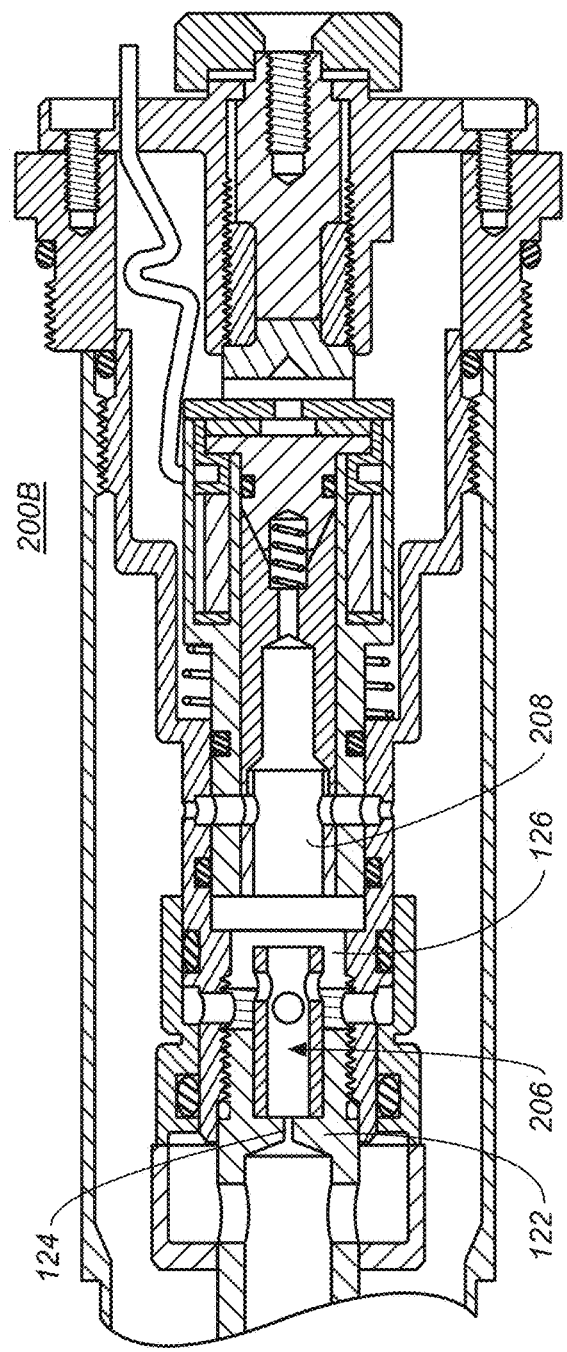

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Notation and Nomenclature

Unless specifically stated otherwise as apparent from the following discussions, it is appreciated that throughout the present Description of Embodiments, discussions utilizing terms such as "accessing", "comparing", "monitoring", "determining", regulating", "calculating", or the like, often refer to the actions and processes of a computer system or similar electronic computing device (or portion thereof) such as, but not limited to, a control system. (See FIGS. 3, 4A, 4C and 4D.) The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, and/or display components of the electronic computing device or other electronic computing device(s). Under the direction of computer-readable instructions, the electronic computing device may carry out operations of one or more of the methods described herein.

Overview of Discussion

As is generally known, shock absorbers, such as those described in US patent application Ser. No. 114/231,446, "Method and Apparatus for an Adjustable Damper", may be applied to a multi-wheeled vehicle. These shock absorbers may include an electronic valve that has an orifice block, a primary valve and a pilot valve assembly. Sensors may be attached to the vehicle and provide information, to a control system attached to the electronic valve, on acceleration (with respect to a bicycle) and on acceleration, tilt, velocity and position (with respect to vehicles with more than two wheels). The control system accesses the sensor signals and actuates the electronic valve to provide variable damping.

Example conventional and novel techniques, systems, and methods for controlling vehicle motion are described herein. Herein, with reference to FIGS. 1 and 2A-2C, various conventional systems, methods and techniques that utilize a conventional control system and a conventional electronic valve for controlling vehicle motion in vehicles with three or more wheels are described. Then, with reference to FIGS. 4A-4D, a novel electronic valve and its functioning is described. This novel electronic valve is not only utilized to perform the conventional methods for controlling a vehicle' motion described with respect to FIGS. 1, 2A-2C and 5-8, but also novel methods for controlling a vehicle's motion by enabling even more selective damping to occur, discussed with reference to FIGS. 10A-16B.

In regards to FIGS. 1 and 2A-2C, the conventional features described therein, and as will be described herein, not only deduce the vertical acceleration values, but also deduce, from a received set of control signals (that include acceleration values associated with various vehicle components), the roll and pitch of a vehicle with more than two wheels. These measured acceleration values relate to the tilt (e.g., roll, pitch) of the vehicle and are compared to a database having thereon preprogrammed acceleration threshold values associated with vehicle components as it relates to tilt. Further, the conventional control system receives measured velocity values associated with user-induced events (e.g., turning a steering wheel, pressing/releasing a brake pedal, pressing/releasing the gas pedal, thereby causing a throttle to open/close). The control system compares these measured velocity values relating to user-induced events to a database having preprogrammed thereon velocity threshold values associated with vehicle components. Based on the comparison performed with regard to the measured acceleration values with the predetermined acceleration threshold values and the measured velocity values with the predetermined velocity threshold values, as well as the determined state of valves within various vehicle suspension dampers attached to vehicle components, the control system sends an activation signal to power sources of the vehicle suspension dampers. The activation signal activates the power source to deliver a current to valve assemblies within the vehicle suspension dampers. Once delivered, the valve assemblies adjust to a desired state. The desired state is configured to adjust the damping force to reduce or eliminate the tilt of the vehicle's frame. In other words, the orientation of the vehicle frame is placed as close to level as possible.

As will be described herein, these conventional systems and methods also provide various system modes within which the vehicle suspension dampers may operate, along with control modes for affecting roll and pitch dynamics of the vehicle. Further, these conventional methods and systems for implementing delays and rebound settle time, for de-conflicting multiple control modes and for cycling between different system modes are described.

Thus, described first herein are conventional, though newer, systems and methods for controlling a vehicle's motion by increasing and/or decreasing damping forces within a vehicle suspension damper in quick response to sensed movement of vehicle components (e.g., vehicle wheel base). These systems and methods may be used in various types of multi-wheeled vehicles, such as, but not limited to, side-by-sides (four-wheel drive off-road vehicle), snow mobiles, etc. These conventional devices may be positioned in both the front fork and the rear shock. While, in general, vehicle suspension dampers cannot respond quickly enough to a sensed movement of a vehicle's front wheel traversing an obstacle such that the rider avoids feeling the effect via the vehicle's frame, the conventional, though newer, systems and methods described herein are able to quickly and selectively apply damping forces through the vehicle suspension dampers (that are coupled with both the vehicle's forks and the vehicle's frame). Such damping enables the vehicle's frame, and thus the vehicle's rider, to experience less acceleration than that being experienced by the wheel base(s).

The conventional systems and methods described herein for controlling vehicle motion provide a control system that enables the use of sensors and an electronic valve to read the terrain and make changes to the vehicle suspension damper (s) in real time. The conventional control system described herein enables at least the following functions: the execution of algorithms that enable a quicker response and adjustment to the vehicle suspension damper(s) than other conventional vehicle suspension dampers; a quiet operation since there are no audible electronic valve actuation sounds; a power efficient model that is designed for low power consumption; an easily tunable model that may use conventional means in combination with the control system described herein, such as, but not limited to, valve shims; a fail-safe shock absorber, as the electronic valve also functions as a conventional shock if power is lost; a small model that can be packaged in bicycle forks and shocks; and a versatile model that may function in conventional shocks, twin tube shocks and bypass shocks.

In contrast to the conventional system and method for controlling a vehicle's motion described herein, embodiments utilize a variable pressure valve as part of an electronic valve (instead of a pilot valve assembly), as will be discussed herein with reference to FIGS. 4A-4D and 10A-16B. A variable pressure valve is, in comparison to the pilot valve, more robust for use in vehicles with three or more wheels, such as side-by-sides. Further, embodiments of the present technology provide for methods for controlling vehicle motion that consider a wider range of variables (e.g., temperature, humidity, date, pressure applied against vehicle seats and storage compartments, and vehicle component acceleration, velocity, speed and position, etc.) (as compared with the conventional methods described herein), which enables the vehicle suspension damper to even more selectively tune damping effects (as compared with conventional methods). The robust variable pressure valve is capable of implementing such tuned damping within the shock absorber. The methods described herein enable a firm control mode, a medium control mode, a soft control mode, and control modes there between.

Thus, the novel systems and methods discussed herein for controlling vehicle motion, according to embodiments, not only provide the same aforementioned benefits also provided by conventional electronic valves and conventional control system, but also provide a more robust alternative device/system for effecting changes within the shock absorbers (i.e., more or less damping), while providing methods for customized damping as it specifically applies to the vehicle's environment.

A conventional, though newer, electronic valve and control system and its operation will be explained first. Next, a novel electronic valve and control system and its operation will be explained. Following, novel methods for controlling a vehicle's movement will be described.

Conventional Electronic Valve with Pilot Valve Assembly and Operation Thereof

FIG. 1 shows the electronic valve 100 of a vehicle suspension damper. The electronic valve 100 includes at least a primary valve 112, a first pressure reducing means which, in FIG. 1, is an orifice block 122, and a second pressure reducing means which, in FIG. 1, is a pilot valve assembly 132, all of which components cooperatively control the flow of fluid throughout the electronic valve 100 and manipulate the fluid pressure within the pilot pressure chamber 126.

In basic operation, the permanent magnet 136 of the solenoid assembly 120 conducts through the component 134 to attract the pilot spool 128. This is the latched position as shown. The spool spring 130 resists this condition. When the coil is turned on with positive polarity, it cancels the effect of the permanent magnet 136 and the spool spring 130 moves the pilot spool 128 to the left or closed position. With negative polarity applied to the coil, the electromagnet is added to the permanent magnet 136 and the pilot spool 128 is drawn to the right or open position.

The main oil flow path, or first fluid flow path, is through the center of the base valve and radially outwardly into piston port 104 area. Assuming there is enough pressure in the piston ports, it then blows off the valve shims 108 and oil flows into the reservoir 102. A small amount of oil also flows in parallel through a second fluid flow path in the electronic valve 100 (also called an inertia valve), and in particular through the control orifice 124 and through the solenoid assembly 120. This generates a pilot pressure inside the area of the primary valve 112.

The valve member 114 acts to resist the valve shims 108 from opening. This resistive force is dependent on pressure inside the area of the primary valve 112 which is controlled by the pressure drop across the solenoid. Basically, when the solenoid is closed, there is high pressure inside the area of the primary valve 112 (resulting in locked-out fork or firm damping, depending on the damping characteristics determined for the electronic valve 100, as described in greater detail below). When the solenoid is in an open position, there is low pressure inside the area of the primary valve 112 and the valve member 114 pushes against valve shims 108 with less force, allowing the valve shims 108 to open under lower fluid pressure. This open position of the solenoid provides a normally-operating fork, by which is meant the damping characteristic of the inertia valve is determined predominantly by the tuning of the valve shims 108 (although there is some damping effect provided by the control orifice 124).

A more particular description follows. A control signal (a.k.a., activation signal sent by activation signal sender 450 of FIG. 4A) instructs the vehicle suspension damper to increase or decrease its damping force therein. The vehicle suspension damper is configured to respond to the control signal instruction. More particularly, the electronic valve 100 of the vehicle suspension damper, in response to the control signal instruction, quickly manipulates the pressure in the pilot pressure chamber of the electronic valve 100 by moving/adjusting the pilot valve assembly 132 to at least partially close or open the flow ports 118. The pressure in the pilot pressure chamber 126 increases or decreases in proportion to the amount of closure or opening that the flow ports 118 experience, respectively.

In general, fluid in the electronic valve 100 flows along a first fluid flow path from the damping cylinder interior 35 and through the shims 108 (unless the shims 108 are held closed under pressure from the valve member 114, as will be described herein) via the piston port 104 area. Additionally, fluid also flows along a second fluid flow path from the damping cylinder interior 35 and through the control orifice 124 of the orifice block 122. After having flowed through the control orifice 124, the fluid moves into the pilot pressure chamber 126. From the pilot pressure chamber 126, the fluid moves out of the pilot spool valve 116 (wherein the pilot spool valve 116 is in at least a partially open position) through a set of flow ports 118 and into the reservoir 102. Additionally, from the pilot pressure chamber 126, the fluid also moves into the area of the primary valve 112. When the fluid presents a predetermined pressure against surface 110 of the valve member 114, a force proportional to the pressure is exerted on the valve member 114 which urges it against the shims 108. The valve member 114 pushes against the shims 108, thereby biasing the shims 108 toward a closed position, even though fluid is moving through the shims 108 from the piston port 104 area and into the reservoir 102. If the force of the valve member 114 against the shims 108 is greater than the force of the fluid moving from the piston port 104 area against the shims 108, then the shims 108 will become biased toward closing. Likewise, if the force of the fluid moving from the piston port 104 area against the shims 108 is greater than the force of the valve member 114 against the shims 108, then the shims 108 will be biased toward an open position, in which the fluid may remain flowing through the shims 108.

During compression of the shock absorber, in order to change the fluid pressure within the pilot pressure chamber in quick response to changes in the vehicle's position and speed (and components thereof), for example, embodiments use a control system to receive control signals from a set of sensors positioned on a vehicle. In accordance with the control signals received from the set of sensors, the control system activates a power source that is attached to the electronic valve. The power source delivers a current to the electronic valve. The electronic valve responds to the delivered current by causing the pilot valve assembly 132 to move and block or open at least a portion of the flow ports 118 through which fluid may flow there through from the pilot pressure chamber 126 and into the reservoir 102, thereby at least partially closing or opening the flow parts 118.

In general, upon compression of the shock absorber, a damper piston moves into a damper cylinder interior. More particularly, when the flow ports 118 are at least partially closed, the fluid pressure within the pilot pressure chamber 126 increases such that the fluid pressure in the area of the primary valve 112 also increases. This increase in the fluid pressure in the area of the primary valve 112 causes the valve member 114 to move toward the shims 108 that are open and to push against the shims 108, thereby causing the shims 108 to at least partially or fully close. When these shims 108 are at least partially or fully closed, the amount of fluid flowing there through decreases or stops. The movement of the damper piston into the damper cylinder interior causes fluid to flow through the piston port 104 area and hence out through open shims 108 and into the reservoir 102. The fluid also flows through the control orifice 124 into the pilot pressure chamber 126. If the shims 108 are closed due to movement of the pilot valve assembly 132 to block the flow ports 118, then fluid may not flow out through the shims 108 or out through the flow ports 118 into the reservoir 102. Consequently, the ability of the damper piston to move within the damper cylinder interior to cause fluid to flow through the piston port 104 area as well as through the flow ports 118 is reduced or eliminated. The effect of the at least partial closure of the shims 108 is to cause a damping function to occur. Thus, the movement of the pilot valve assembly 132 to at least partially block the flow ports 118 causes the damping (or slowing of movement) of the damper piston into the damper cylinder interior.

The control orifice 124 operates cooperatively with the pilot valve assembly 132 to meter the flow of fluid to the primary valve 112. The control orifice 124 is a pathway within the orifice block 122 and is positioned between the damper cylinder interior 35 and the pilot pressure chamber 126. The size of the control orifice 124 is tunable according to the application; the size may be variously changed. The control orifice 124 is a key component in enabling the quick and accurate response to sensed changes in a vehicle's motion. As will be explained herein, without the presence of the control orifice 124, the vehicle would not experience damping during periods of low compression speed, or experience too much damping during periods of high compression speeds. The pilot valve assembly 132 would act like a bypass. In other words, without the control orifice, at low compression speed there would almost be no damping and the control orifice 124 and pilot valve assembly 132 would act like a bypass; but at higher compression speeds, pressure drop across the pilot valve assembly 132 would cause a high pressure in the pilot pressure chamber 126 and therefore too much clamping force on the shims 108. The control orifice 124, thus, allows damping to occur even during periods of low compression speed, and slows the damping rate during periods of high compression speed.

In this particular application, it was discovered that (without the control orifice 124) if the area of the primary valve is approximately 60% or more of the piston port 104 area, the valve member 114 is hydraulically locked (at all speeds) onto the shims 108. This led to undesirable high damping force at high compression speeds. Although in this particular application the hydraulic lock occurred at about 60% area ratio and higher, this may not be true in all cases: there may be arrangements where a lock occurs at a higher or lower ratio than 60%, or where no lock occurs at all at any ratio. It is expected that the particular ratio will be dependent on design parameters such as the valve shim arrangement and main piston design.

The solution is to cause a pressure drop of damping fluid before it enters the pilot pressure chamber 126. This is achieved with the control orifice 124. The control orifice 124 provides some damping effect at low compression speeds (by enabling damping fluid to 'bleed' through the control orifice), but at high compression speeds provides a significant pressure drop to ensure that the pressure inside the pilot pressure chamber does not get too high, thereby preventing the valve member 114 from locking onto the shims 108.

In its present form, the control orifice 124 is between 0.5 mm and 2 mm in diameter, but these sizes are dependent on the specific application and the desired damping curve. Pressure drop is directly proportional to the length of the control orifice 124, but inversely proportional to its diameter. Either one or both of these parameters can be changed at the design stage to affect the performance of the control orifice 124.

The essential function of the control orifice 124 is to create a pressure drop. Therefore, anything that will do this could be used in place of the specific arrangement shown. Some possible examples include, but are not limited to: a diffuser; a labyrinth between parallel plates; and leakage past a screw thread.

A further key feature is the combination of the area of the surface 110 inside the valve member 114, the control orifice 124, the pilot valve assembly 132, and the way this combination enables a variable force to be applied to the shims 108 to control the damping force at any point in time.

In particular, the ratio of the surface area 106 of the shims 108 (The surface area 106 is next to the piston port 104 area; the pressure is acting on the surface area 106 of the shims 108 as well as the surface area 110 of the inside of the valve member 114, within the primary valve 112 area) to the surface area 110 inside the valve member 114 controls the overall damping characteristic of the electronic valve 100, i.e., what overall range of force can be applied to the shims 108. By selecting this ratio appropriately, the valve member 114 can be set up to move between full lockout and a completely soft state, or between a firm damping state and a soft state, for example.

Within that overall range of force, a particular force at any point in time is set by the position of the pilot valve assembly 132, which, as explained above, controls the pressure drop across the flow ports 118. By adjusting the pressure drop across flow ports 118, the pressure of fluid in the pilot pressure chamber 126 is also adjusted. Since the pressure inside the pilot pressure chamber 126 acts against surface 110 of the valve member 114, the force applied by the valve member 114 to the shims is controllable by adjustment of the position of the pilot valve assembly 132.

It should be noted that the overall resistance to fluid flow along the first fluid flow path (i.e. through piston port 104 area and past shims 108) is given by the sum of the force provided by the shims 108 and the force applied to the shims 108 by the valve member 114.

A significant feature is that a force is generated on the valve member 114 by a control of pressure inside the area of the primary valve 112 (in contrast to other valve bodies where force comes from pressure acting on the outside of the valve member 114, usually from the damper reservoir). The ultimate source of pressure in the pilot pressure chamber 126 is the pressure of the damping fluid in the main damping cylinder 35 during compression (but regulated by the control orifice 124 and the pilot valve assembly 132 to give a lower pressure in the pilot pressure chamber 126).

There are significant advantages to the combination of the ratio of the area of the surface 110 to the area of the piston port 104, control orifice 124, and the pilot valve assembly 132. Some of them are as follows: 1) the damping force generated by electronic valve 100 is not temperature sensitive; 2) the damping force generated by electronic valve 100 is not position sensitive; 3) when using an electro-mechanical inertia device to control the pilot valve assembly 132, the damping force can be turned on and off very quickly (recent experiments achieved 4 ms between full firm and full soft- to the best of the applicant's knowledge and belief the fastest time for turning on and off of damping force in other devices is 20 ms. The reason such fast speeds are achieved is because, when the pressure in the pilot pressure chamber 126 is released, it is the pressure in the main damper (which is the same as the fluid pressure in the piston port 104 area) that pushes on the shims 108 and moves the primary valve 112 back (which can happen very quickly). This is in contrast to other arrangements that rely on an electric motor to move a valve body, for example, which takes more time; 4) using a latching solenoid pilot valve enables a full firm state to be maintained with no power; 5) the pilot valve assembly 132 enables very large damping forces to be controlled because: (a) the pilot pressure is 'magnified' according to the ratio of the area of the primary valve 112 to the area of the piston port 104; and (b) because the pilot valve assembly 132 is not required to move any element against the high pressure damping fluid; and 5) the pilot valve assembly 132 allows the damper to utilize conventional shims, but with some level of controllability over the damping force applied by the shims. This allows the shims to be tuned in a conventional manner. Furthermore, if power to the pilot valve assembly 132 fails, the shock absorber will continue to operate (in contrast to other electronically controlled shocks where power loss causes the shock to stop working completely).

Thus, the electronic valve 100, including the primary valve 112, the pilot valve assembly 132, and the orifice block 122, not only enables a variable force to be applied to shims 108, but also enables the control of the damping force within the vehicle at any point in time. The pilot valve assembly 132 meters a flow of fluid to the primary valve 112 and enables the generation of relatively large damping forces by a relatively small solenoid (or other motive source), while using relatively low amounts of power.

Furthermore, since the incompressible fluid inside the primary valve 112 of the shock absorber assembly causes damping to occur as the primary valve 112 opens and the valve member 114 collapses, a controllable preload on the shims 108 and a controllable damping rate are enabled. In four-wheeled vehicles, the solenoid continuously powers the inertia valve and does not have a latching mechanism. A monitor will continuously monitor a power source and its operation in order to make sure that the wires leading to the power source do not get cut, thereby providing a dangerous situation for the rider and other vehicles.

In regards to the area of the primary valve 112, although it is shown as an internal base valve, it is not limited to this position or application. For example, it can be mounted externally of the vehicle suspension damper (for example in a 'piggyback' reservoir). Further, it could be made part of the main damper piston (either in compression or rebound directions).

In considering the design of the control orifice 124, it must have at least the following two functions: a provision of low speed bleed; and a provision of a sufficient pressure drop at high speed to prevent hydraulic lock of the valve member 114 onto the shims 108. The general methodology for determining the diameter and/or length of the control orifice 124 during design is as follows: (1) identify the desired damping curve that the damper should have; (2) determine from step (1) the target low speed damping force; (3) determine from step (1) the target high speed damping force; (4) make informed guess at control orifice diameter and/or length to achieve steps (2) and (3); (5) test the output damping forces produced by shock at different speeds within low to high speed range; (6) compare the measured damping curve against the desired damping curve; (7) if there is too much high speed damping force, then reduce the diameter of the control orifice (to lower the pressure inside the pilot pressure chamber 126); (8) if there is too much low speed damping force, then decrease the area ratio (between the area of the primary valve 112 and the piston port 104 area), and increase the diameter of the control orifice 124; and (9) repeat steps (5)-(8) until a good approximate to a desired damping curve is obtained. It is to be noted that in steps (7) and (8) the length of the control orifice can also be adjusted, either separately or in addition to the diameter, to achieve a similar effect.

Figure 2C:
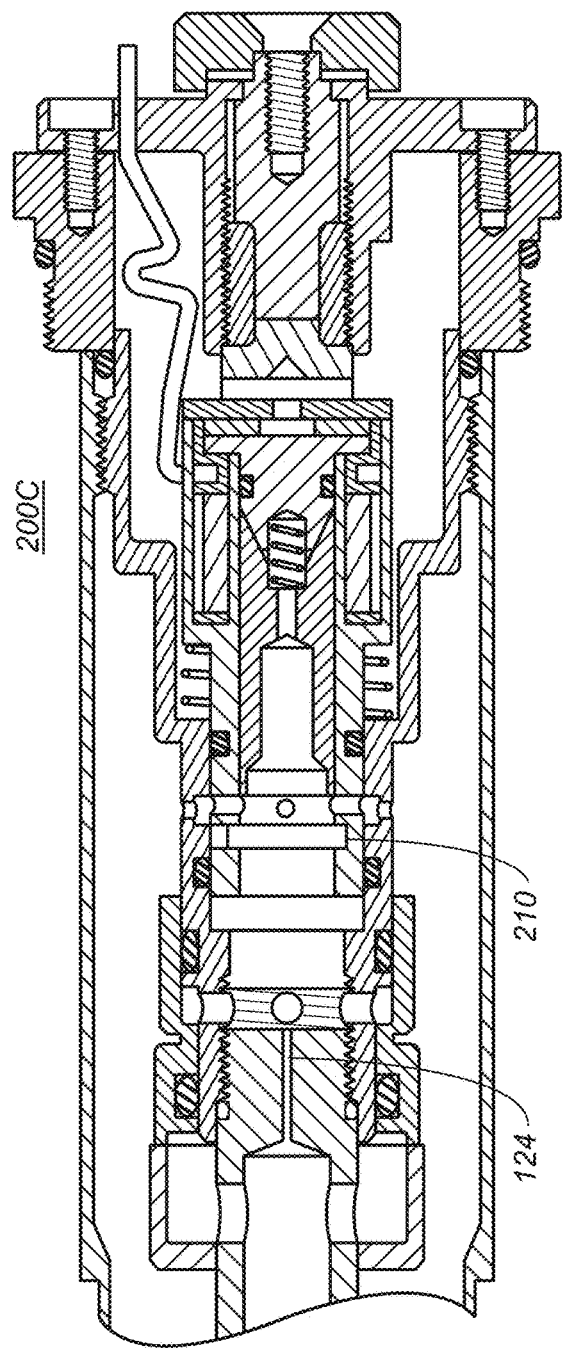

It was found that the pilot valve assembly 132 would "auto-close" at a certain oil high flow rate. A diffuser pin inserted into the vehicle suspension damper downstream of the control orifice 124 is used to eliminate this auto-closing issue. FIG. 2A shows an electronic valve 200A with a diffuser pin 204 positioned through one set of the cross holes 202 going to the primary valve 112 area. Another set of holes remains (normal to the page) to feed oil to the valve member 114. The diffuser pin 204 functions to disrupt the jet flow coming out of the control orifice 124. FIG. 2B shows an electronic valve 200B with a diffuser plug 206 pressed into, at least one of and at least partially, the orifice block 122 and the pilot pressure chamber 126. The diffuser plug 206 also functions to disrupt the jet flow coming out of the control orifice 124. FIG. 2C shows an electronic valve 200C with a diffuser pin 204. The spool retainer 208 (see FIG. 2C) is replaced with the diffuser pin 210. The diffuser pin 210 and its position within the vehicle suspension damper 200C functions to disrupt the jet flow coming out of the control orifice 124 and to minimize the contact of the pilot valve assembly 132 in the firm setting.

The solenoid includes a "latching" mechanism to open and close the pressure-balanced pilot spool. Due to the latching configuration of the solenoid, power is only required to open or close the pilot valve assembly 132. Power is not required to hold the pilot valve assembly 132 open or closed in either setting. Consequently, reduced power consumption is enabled compared to the traditional shock absorber.

Further, an externally-adjustable means of tuning the open state of the damper is described. An adjuster turns in or out to vary the effective orifice size of the flow ports 116 when in the open position. This allows the rider to adjust the soft setting of the damper to his preference.

With respect to the shock absorber described above in conjunction with FIGS. 1 and 2A-2C, it is to be noted that, whilst preferred, the use of a valve shims 108 is optional. Instead, it would be possible for the valve member 114 to act directly on the fluid flow ports 145. In fact, valve shims are optional in any shock absorber described herein at the point where it would be possible for the valve member 114 (or any other similar valve member described herein) to act directly on the fluid flow ports that control the main flow through the valve assembly.

With reference again to FIGS. 1, 2A-2C and 4A, it should be again noted that the set of sensors 440 may be positioned in various locations on various types of vehicles. For example, in one embodiment, the set of sensors 440 is positioned on the seat post of a bicycle. In another embodiment, a first set of sensors is positioned near the front wheel, while a second set of sensors is positioned near the rear wheel.

The set of sensors may include at least one accelerometer, but generally includes three accelerometers. The three accelerometers define a plane of the vehicle's body, such that the acceleration, and in other embodiments, the acceleration and the tilt (i.e., pitch and roll), of the vehicle body may be measured. When the set of sensors senses vehicle motion, the set of sensors sends a control signal to the control system attached to the vehicle suspension damper. The control system determines if the sensed vehicle motion meet and/or exceeds a predetermined threshold. The predetermined threshold may be a constant in one embodiment. However, in another embodiment, the predetermined threshold may be a variable based on other situations sensed at the vehicle. Once a control signal is received by the power source, the power source that is attached to the vehicle suspension damper becomes activated. Upon activation, the power source sends a current to the vehicle suspension damper, thereby causing the pilot valve assembly to move, as is described herein. Various methods of sensing via accelerometers and other forms of motion via sensors are known in the art.

As described herein, the vehicle to which a set of sensors and the vehicle suspension damper described thus far herein are attached may be attached to a multi-wheeled vehicle, such as, but not limited to, a bicycle, a side-by-side, a snowmobile, a car, a truck, etc. In one embodiment, more than one set of sensors may be used on the non-limiting example of a side-by-side vehicle (e.g., recreational off-highway vehicle [ROV]). For example, each wheel base (e.g., four) may include the shock absorber that has thus far been described herein. More specifically, each wheel base has attached thereto a different set of sensors, such as a set of accelerometers, each set being attached to a separate vehicle suspension damper. One set of sensors (e.g., set of accelerometers) is attached to the ROV, as well as being attached to one or more vehicle suspension dampers.

If the ROV is traveling along a path that does not have any bumps or uneven terrain, then the vehicle suspension dampers may each be programmed to operate in a fully open mode (i.e., soft mode), in which the pilot spool valve 116 of the pilot valve assembly 132 is open to the flow ports 118, thereby allowing fluid to flow from the damper cylinder interior 35 and into the reservoir 102 either through the first fluid flow path, with resistance provided by the shims 108 (and no additional force provided by the valve member 114), and/or through the control orifice 124 that permits low speed bleed of damping fluid via the second fluid flow path. Thus, for example, when the right front tire of an ROV hits a large rock, the right front tire and a portion of the suspension attached to the tire (or attached wheel base) may rise upwards to move over the rock. The set of sensors attached to the ROV's right front side will sense the tire's upward movement, and will sense the tire reaching its peak upward movement (the peak of the rock), and will sense the tire beginning to move downwards. The set of sensors on the ROV's right front side would send control signals to the vehicle suspension damper attached to the ROV's right front side throughout the tire's movement upward and downward. The control system attached to the vehicle suspension damper receives the control signals and causes the power source also attached to the vehicle suspension damper to deliver a current to the vehicle suspension damper in accordance with the control signals. The delivered current functions to cause the pilot valve assembly 132 to move to cause the flow ports 118 to be at least partially blocked. As described herein, the pressure within the pilot pressure chamber 126 increases due to the at least partially blocked flowports 118, thereby causing the pressure within the area of the primary valve 112 to increase. The valve member 114, in response to increased pressure in the area of the primary valve 112, is urged against the shims 108, thereby changing the damping characteristics of the shims 108. Thus, the fluid flowing along the first fluid flow path from the damper cylinder interior 35 and through the piston port 104 area is reduced, resulting in placing the vehicle suspension damper in a firm damping setting.

Significant advantages over other conventional shock absorber systems are as follows. In conventional mechanical inertia valves, an inertia valve senses a pressure wave (occurring at the speed of sound) after a vehicle's tire hits a bump. The inertia valve opens in response to receiving the pressure wave. However, the vehicle rider still experiences some form of response to the terrain before the inertia valve has a chance to open into a "soft" mode. In contrast, in the shock absorbers thus far described herein, using an electronic valve attached to accelerometers, the electronic valve opens into a "soft" mode before a motion significant enough for a vehicle rider to experience the motion has begun. For example, when a wheel motion occurs, such as an ROV wheel base beginning to move upward while running over a large rock, the wheel base experiences an upward acceleration. This acceleration is measured by embodiments. Before the wheels' velocity and/or displacement can be or is measured, a control signal is sent from a set of accelerometers that communicate the acceleration values of the wheel to a control system that is connected (wire or wirelessly) to the electronic valve. The set of accelerometers are positioned to measure the acceleration experienced by the wheel base. These acceleration signals are sent at the beginning of the wheel's ascent over the rock. The electronic valve is opened into a soft mode in response to receiving the signals from the set of accelerometers. The soft mode is initiated before the wheel experiences such a large acceleration upwards that the vehicle rider feels a reaction to the wheel's motion through the vehicle's frame. Unlike other conventional damping systems, in the instant conventional damping system, a quick response to a sensed acceleration of a vehicle wheel is enabled such that an acceleration of a vehicle frame due to the movement of the vehicle wheel may be reduced or prevented. It should be appreciated that one or more set of sensors may be attached to each ROV wheel base, and independently control the vehicle suspension damper to account for and respond to various rolls and other types of vehicle motion.

One or more motion sensors are provided on a forward or front part of a vehicle, and a signal or signals from the one or more motion sensors is used to control a vehicle suspension damper mounted on a rear part of the vehicle. In use, motion information learned from the movement of the front part of the vehicle can be used to anticipate movement of the rear part of the vehicle, and adjustments may be made to control the damper on the rear part accordingly.

Thus, the control of both compression and the rebound state of the vehicle suspension damper is enabled, such that an acceleration at the vehicle frame is maintained as close to zero as possible throughout off-road riding and over varied terrain, regardless of the acceleration being experienced at the vehicle's wheel.

As noted herein, more than one type of sensor may be used. For example and not limited to such example, an accelerometer and a gyrometer may be used. Further, the set of control signals sent to the control system may include, but are not limited to the following values: acceleration values; tilt (e.g., pitch, roll) values; and velocity values. It should also be noted that numerous methods for determining orientation in a plane in space using a sensor attached to an object are well known in the art. Thus, the adjustment of the vehicle compression dampers to a desired state, based on a comparison of the measured signal values with a database of threshold values, enables the reduction of the tilt of a vehicle's frame.

Novel Electronic Valve Having Variable Pressure Valve and Novel Control System and Operation Thereof As will be described herein, embodiments provide a novel and robust electronic valve that may be integrated within shock absorbers for use on vehicles having more than two wheels. Further, described herein are novel systems and methods for controlling vehicle motion, in which sensors are attached to the vehicle (with more than two wheels) and provide information on, for example, the following variables: acceleration, tilt, velocity, position, lateral acceleration, speed, temperature, pressure applied to vehicle seats and cargo bay, and humidity. A novel control system accesses the sensor signals and performs calculations to a control mode setting to be actuated depending on a particular predetermined relationship between the variables. According to an embodiment, the control system causes the electronic valve to become actuated, thereby providing variable damping that is more narrowly tailored to the vehicle's environment and to the vehicle rider.

The novel electronic valve includes an orifice block, a primary valve and a variable pressure valve is described herein with respect to FIGS. 4A-4D and 18A-18I, wherein the electronic valve is shown installed in a monotube piggyback arrangement (the electronic valve is located at the main piston), a monotube internal bypass arrangement and a twin-tube arrangement.

Figure 18A:
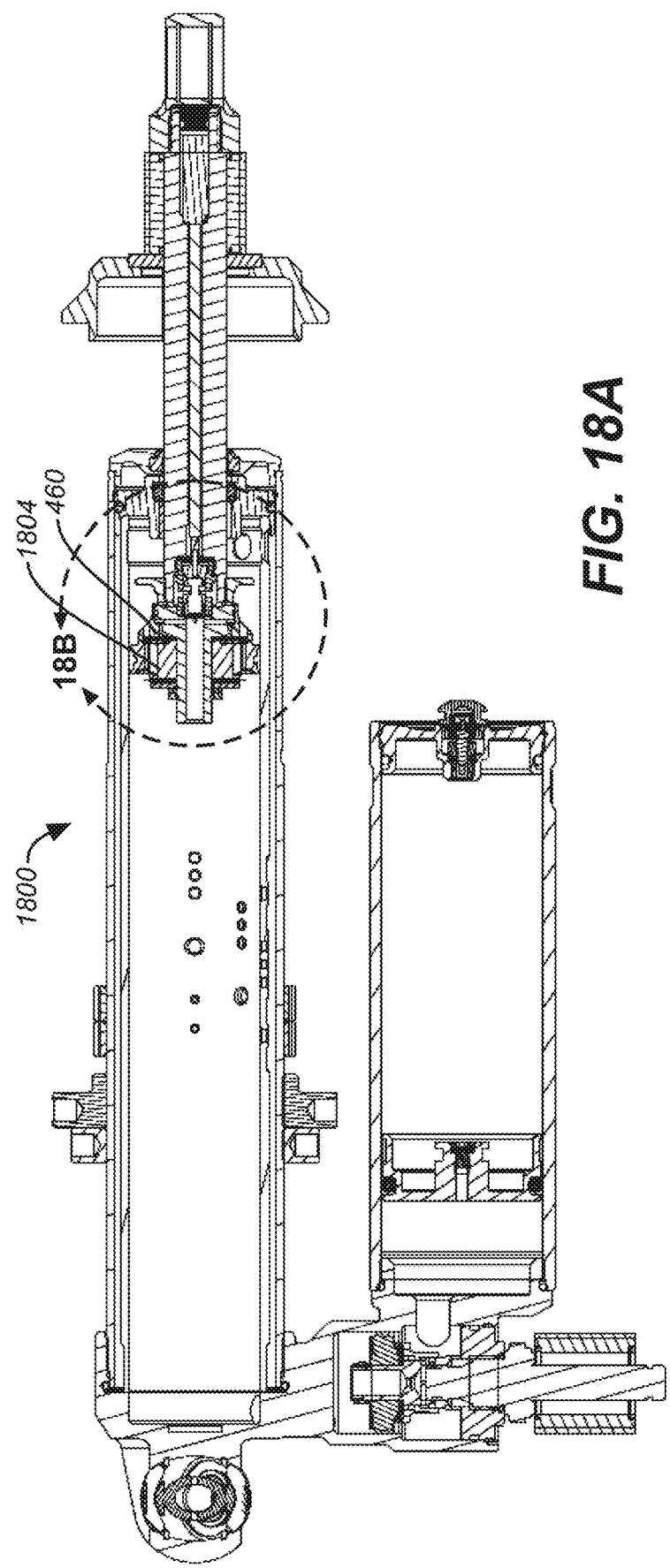
FIG. 18A is a side cross-sectional view of a monotube piggyback arrangement with the electronic valve located at the main piston, in accordance with an embodiment.

FIG. 18A is a side cross-sectional view of a monotube piggyback arrangement 1800 with the electronic valve 460 located at the main piston 1804, in accordance with an embodiment. The monotube piggyback arrangement 1800 is shown in a rebound configuration.

Figure 18B:
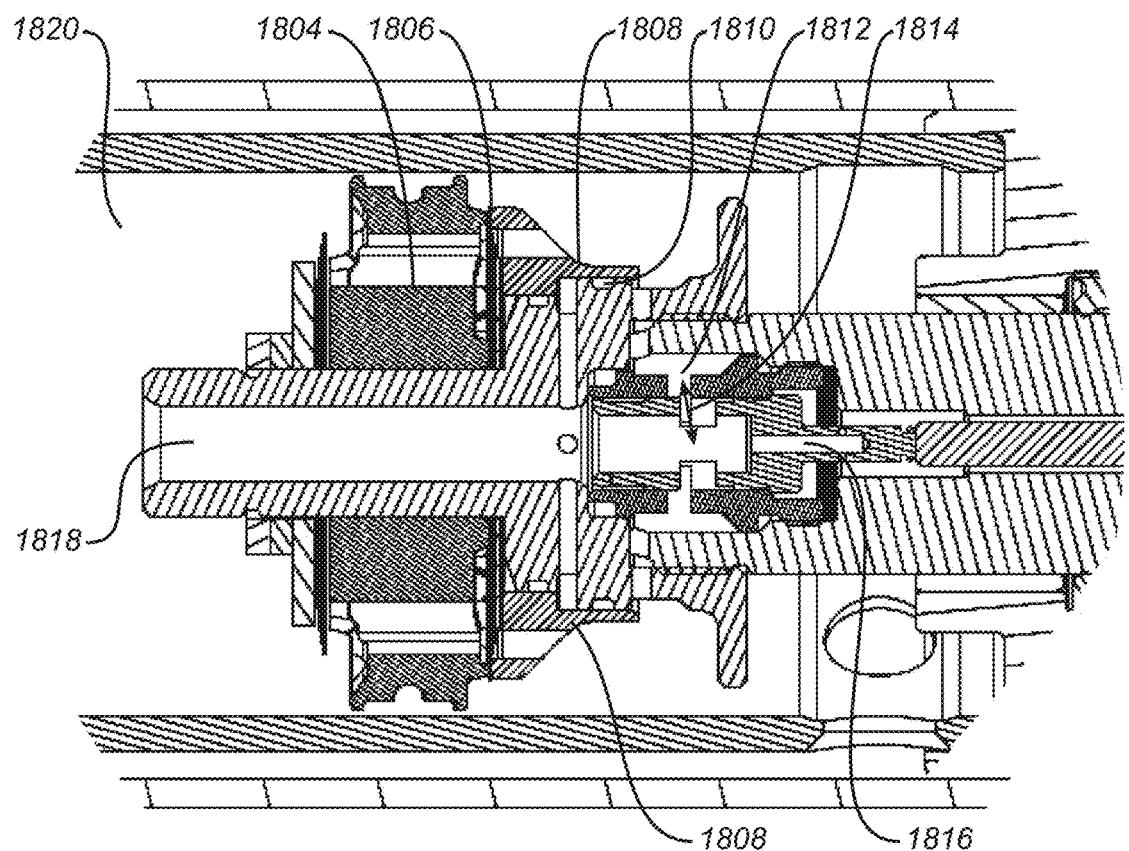
FIG. 18B is an enlarged view of Detail A of FIG. 18A, in accordance with an embodiment.

FIG. 18B is an enlarged view of Detail A of FIG. 18A, in a compression method position, in accordance with an embodiment. The electronic valve 460 includes the primary valve 1810, the variable pressure valve 1814, the orifice 1818 and reservoir 1920. In one embodiment, the valve member 1808 is a model TS08-20B-0-V-12ER valve, commercially available from HydraForce, Inc. of Lincolnshire, Ill., USA. Also shown in FIG. 18B is the piston 1804, the shims 1806, the valve member 1808, the flow ports 1812 and the pilot spool 1816. Upon compression, if the power source that is attached to the electronic valve 460 is not actuated, then the flow ports 1812 are and will remain closed, and the fluid that moves from the reservoir 1820 and into the orifice 1818 will then flow into the primary valve 1810. Once in the primary valve 1810, the fluid exerts force against the outer walls of the valve member 1808, which causes the valve member to move closer to the shims 1806. Upon moving closer to the shims 1806, the shims 1806 begin to close against the components on the other side of the shims 1806. Due to limited flow ports through which the fluid, during compression may travel, a large damping effect is created. Of note, both positions (rebound and compression positions) of FIGS. 18A and 18B, respectively, may use a similar cartage fashion control valve as is shown in FIGS. 18C and 18D.

Figure 18E:
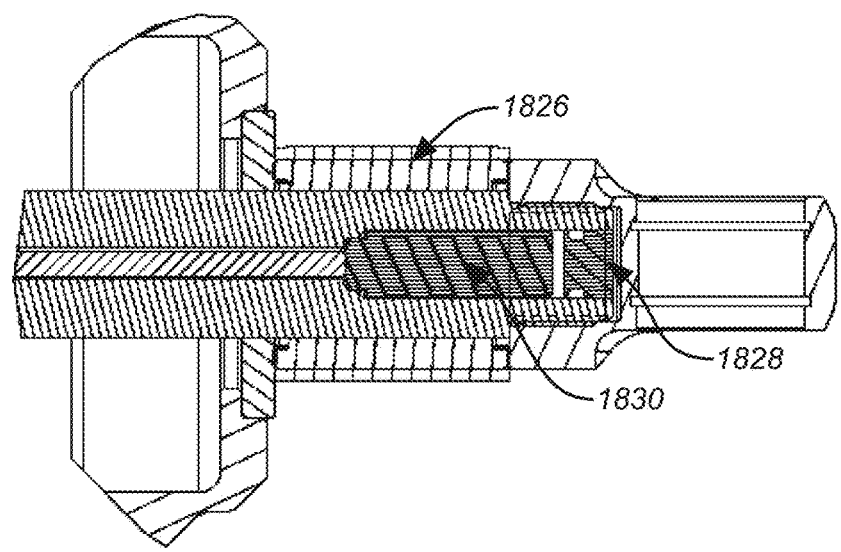
FIG. 18E is a side cross-sectional view of a solenoid and surrounding components, in accordance with an embodiment.
Figure 18C:
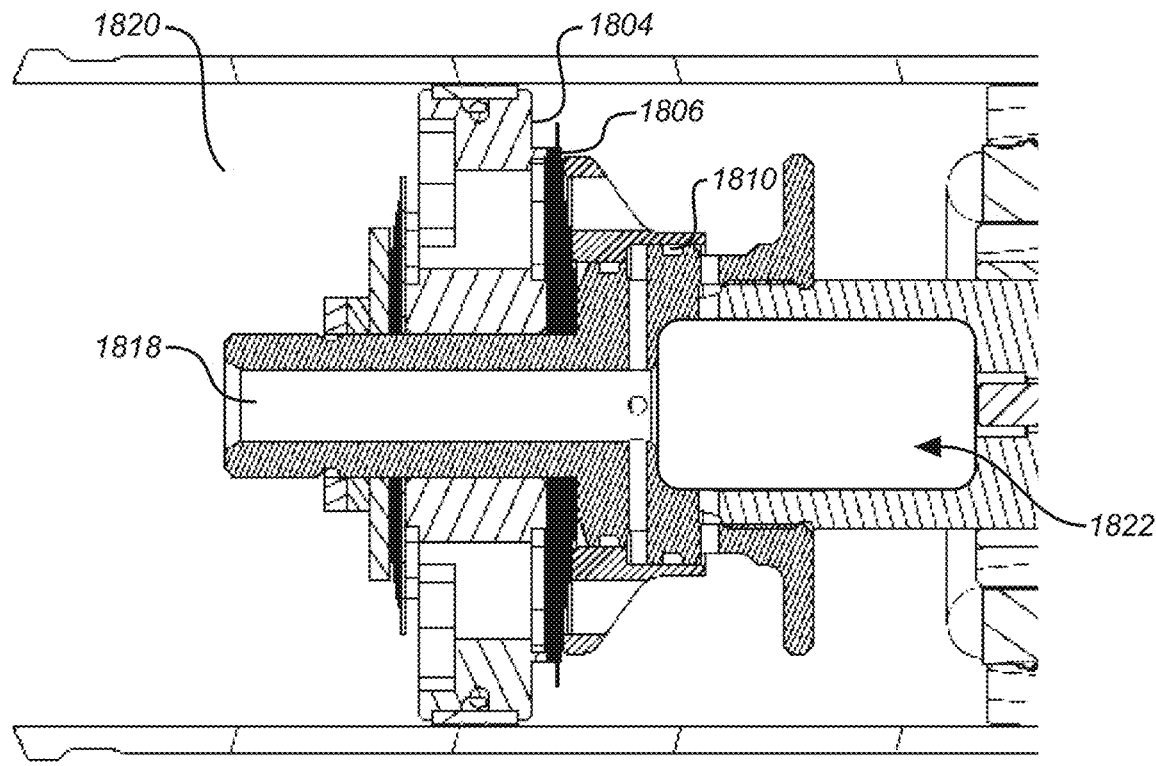
FIG. 18C is an enlarged cross-sectional view of Detail of FIG. 18A, in accordance with an embodiment.

FIG. 18C is an enlarged cross-sectional view of Detail A of FIG. 18A. FIG. 18A shows the orifice 1818, the reservoir 1820, the piston 1804, the shims 1806, the valve member 1808, the primary valve 1810, and a second valve 1822. It should be appreciated that the port within FIG. 18C showing the second valve 1822 may use any applicable metering device such as a pilot operated and non-pilot operated spool-type valve, poppet type valves and pressure relief valves. Further, the second valve 1822 may be the variable pressure valve mentioned above, or another type of fluid metering device. The robustness of the design of the electronic valve 460 is due in part to the placement of the primary valve 1810 below the valve member 1808, which itself is placed directly against the shims 1806. The second valve 1822 will provide an additional form of damping, in one embodiment.

Figure 18D:
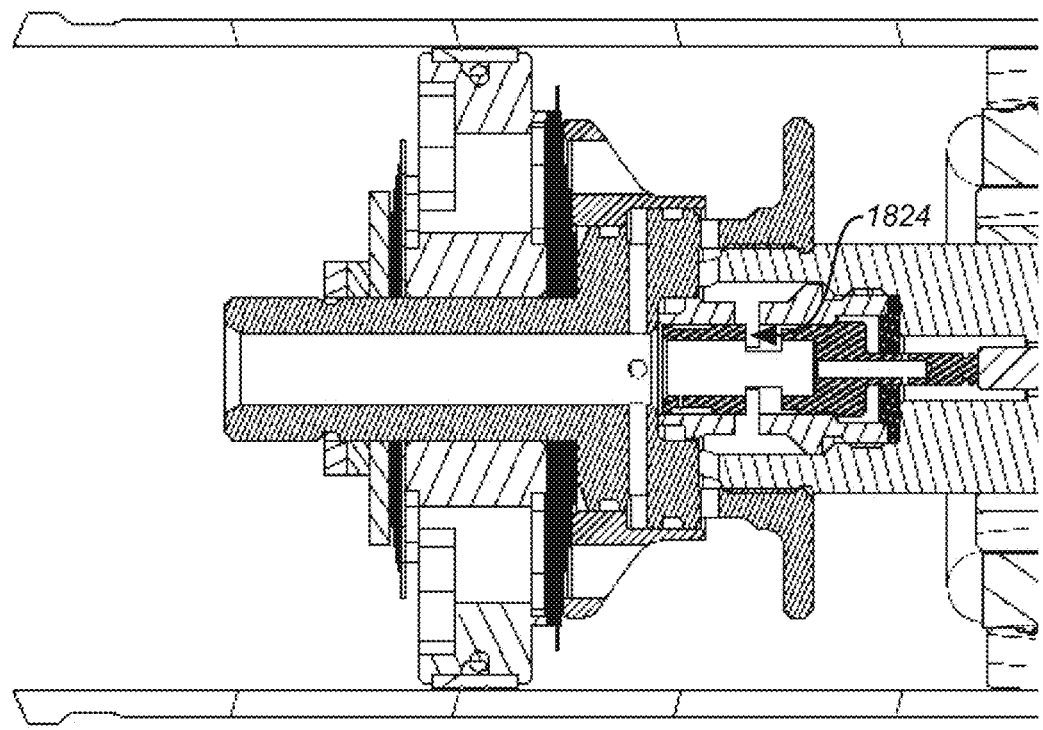
FIG. 18D is an enlarged cross-sectional view of Detail of FIG. 18A, in accordance with an embodiment.

FIG. 18D is an enlarged cross-sectional view of Detail A of FIG. 18A. FIG. 18D shows a type of metering device 1824 placed into the area at which the second valve 1822 was shown (see FIG. 18C). Known in the art is a proportionally controlled pilot operated spool valve placed in the "modular valve port location", also known as a location for the second valve 1822. These valves that occupy the location for the second valve 1822 may be actuated through electronic means such as a solenoid, stepper motor or servo motor, according to an embodiment.

FIG. 18E is a side cross-sectional view of a solenoid and surrounding components, in accordance with an embodiment. FIG. 18E shows a novel method of applying a solenoid to increase the ease of vehicle packaging. In this method, the shaft is used for the solenoid housing and will conduct the magnetic field to the solenoid plunger 1830 so as to produce movement of the metering control device 1824, in accordance with an embodiment. Embodiments also allow for the moving parts to be wet or under pressure so as not to have seal friction of a pressure differential requiring a higher output of force for actuation. The solenoid plunger 1830 is sealed into the shaft using a press fit plug 1828. The coil 1826 surrounds the shaft, similar to other known methods regarding solenoids. According to embodiments, the coil must have enough stiffness to support the load of the main vehicle spring that surrounds the shock absorber. Another method is to use a snap ring fitting onto the shaft in order to separate the spring forces from the coil 1826. This snap ring design may be used as a separate nonintegrated device that is 90 degrees oriented out of the eyelet of the shock absorber.

Figure 18F:
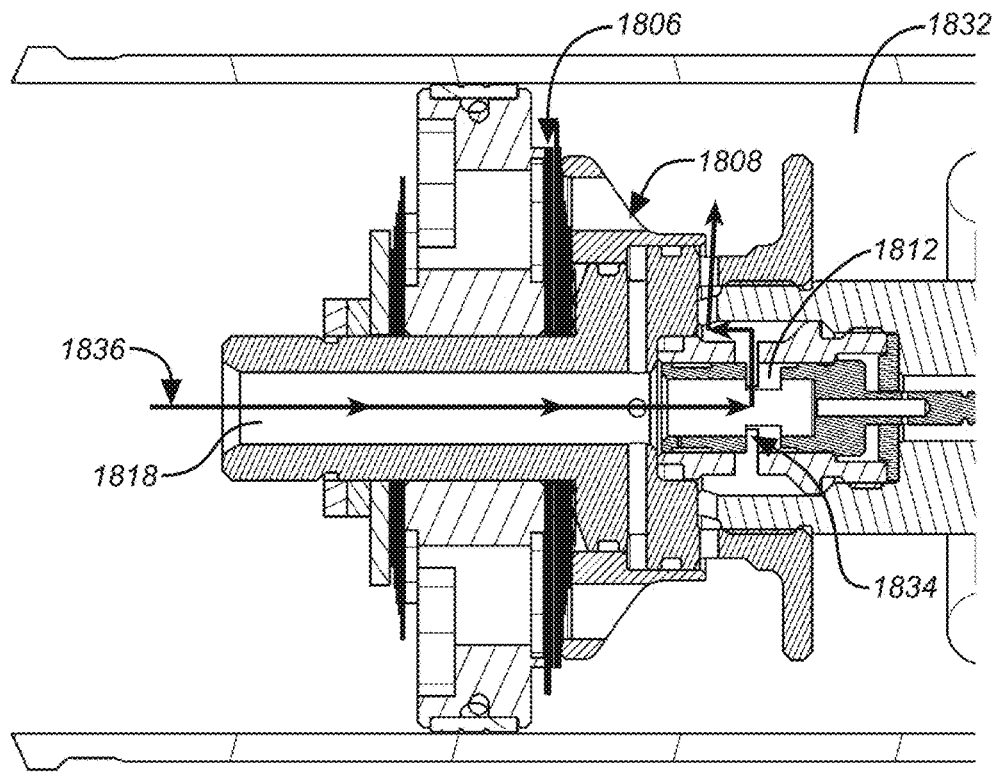
FIG. 18F is an enlarged cross-sectional side view of Detail A of FIG. 18A, in accordance with an embodiment.

FIG. 18F shows an enlarged cross-sectional side view of Detail A of FIG. 18A, during compression, in accordance with an embodiment. As seen, the electronic valve 460 is in soft position, such that the flow ports 1812 are open and fluid may flow there through. Thus, during compression, the fluid flow 1836 moves through the orifice 1818 and into the area of the second valve 1822, and then through the flow ports 1812. The fluid flow moves into the reservoir 1832 and then provides a force against the valve member 1808, which itself presses further against the shims 1806.

Figure 18G:
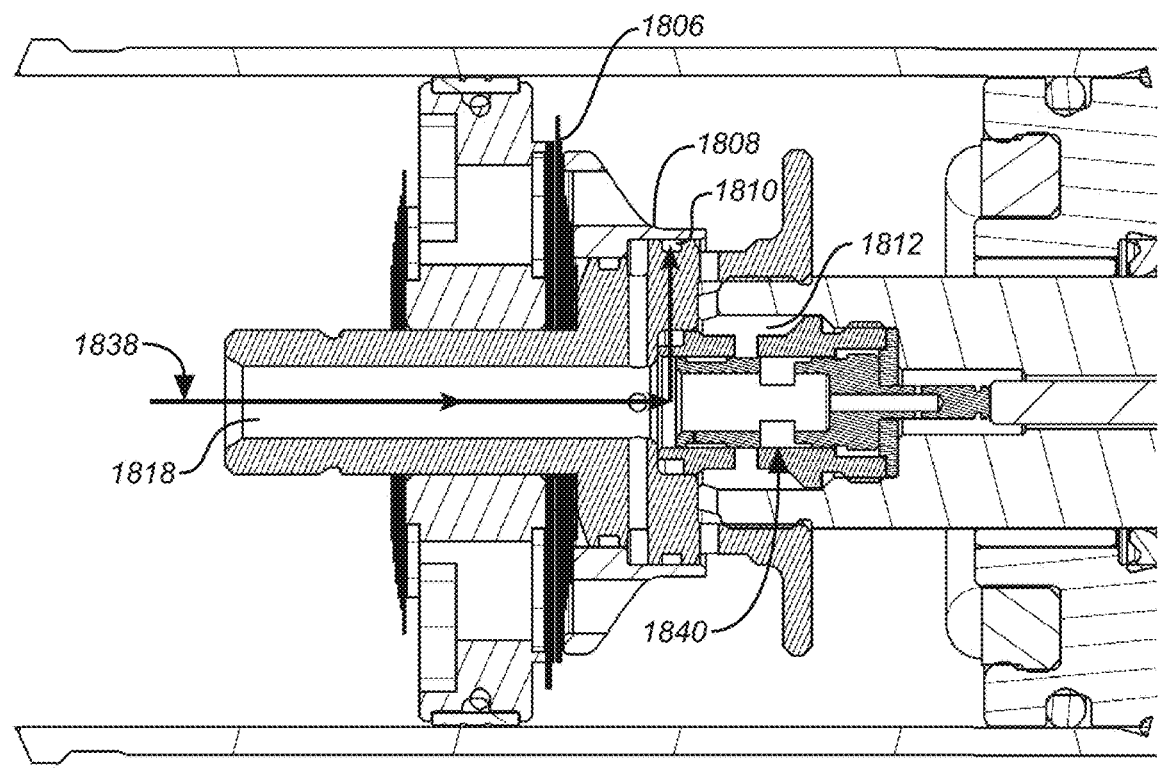
FIG. 18G is an enlarged cross-sectional side view of Detail A of FIG. 18A, in accordance with an embodiment.

FIG. 18G shows an enlarged cross-sectional side view of Detail A of FIG. 18A, during compression, in accordance with an embodiment. As seen, the electronic valve 460 is in firm position, in which the flow ports 1812 are blocked. Thus, the fluid flow 1838 moves through the orifice 1818 and into the primary valve 1810, thereby pushing the valve member 1808 further against the shims 1806, in one embodiment. It should be noted that the shims 1806, in one embodiment, are reed valves.

Figure 18H:
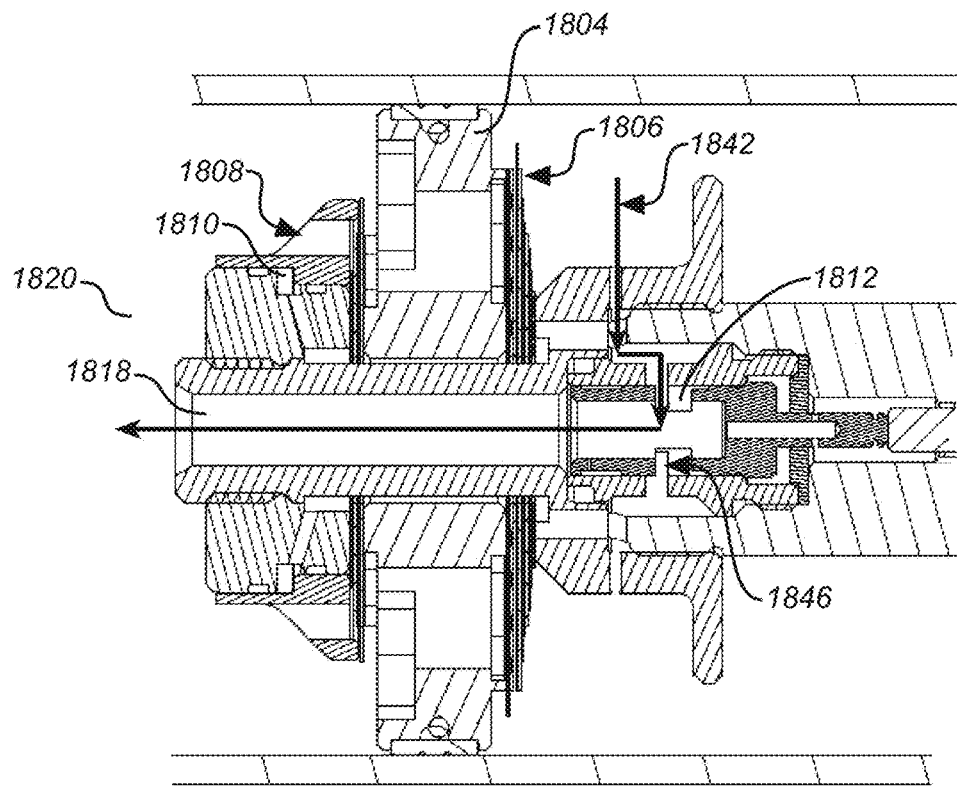
FIG. 18H is an enlarged cross-sectional side view of Detail A of FIG. 18A, in accordance with an embodiment.

FIG. 18H shows an enlarged cross-sectional side view of Detail A of FIG. 18A, during rebound, in accordance with an embodiment. As seen, the valve member 1808 is positioned on the compression side of the piston 1804. The fluid flow 1842 shows the flow of fluid moving through the flow ports 1812, into the orifice 1828, and out into the reservoir 1820.

Figure 18I:
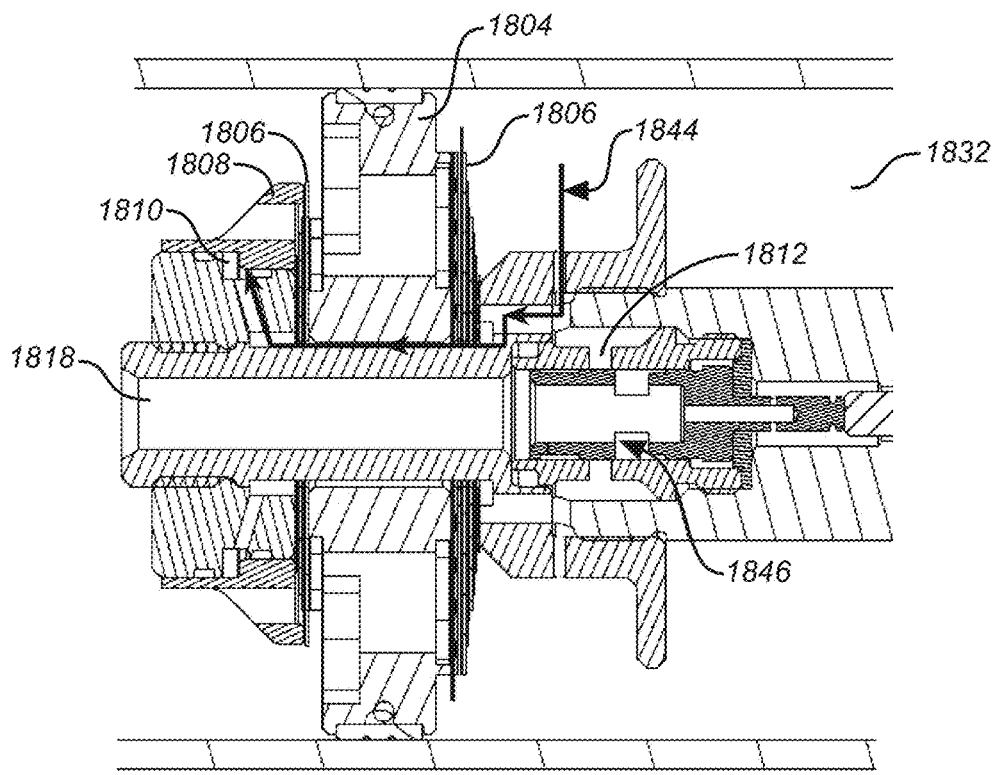
FIG. 18I is an enlarged cross-sectional side view of Detail A of FIG. 18A, in accordance with an embodiment.

FIG. 18I shows an enlarged cross-sectional side view of Detail A of FIG. 18A, during rebound, in accordance with an embodiment. As seen, the valve member 1808 is positioned on the compression side of the piston 1804. The fluid flow arrow 1844 shows the flow of fluid moving from the reservoir 1832, into and through the piston 1804, and into the primary valve 1810. Once the fluid is in the primary valve 1810, then the fluid presses against the valve member 1808, which in turn presses against the shims 1806.

Figure 18J:
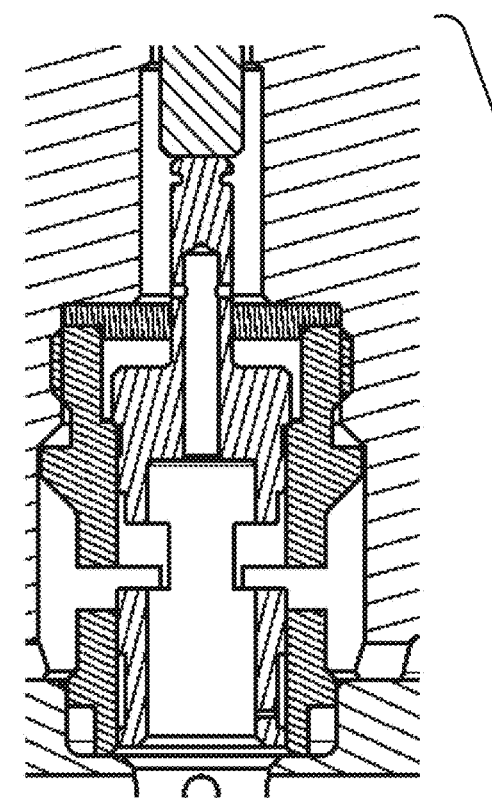
FIG. 18J is a side cross-sectional view of the electronic valve acting as the base valve assembly, in accordance with an embodiment.
Figure 18J:
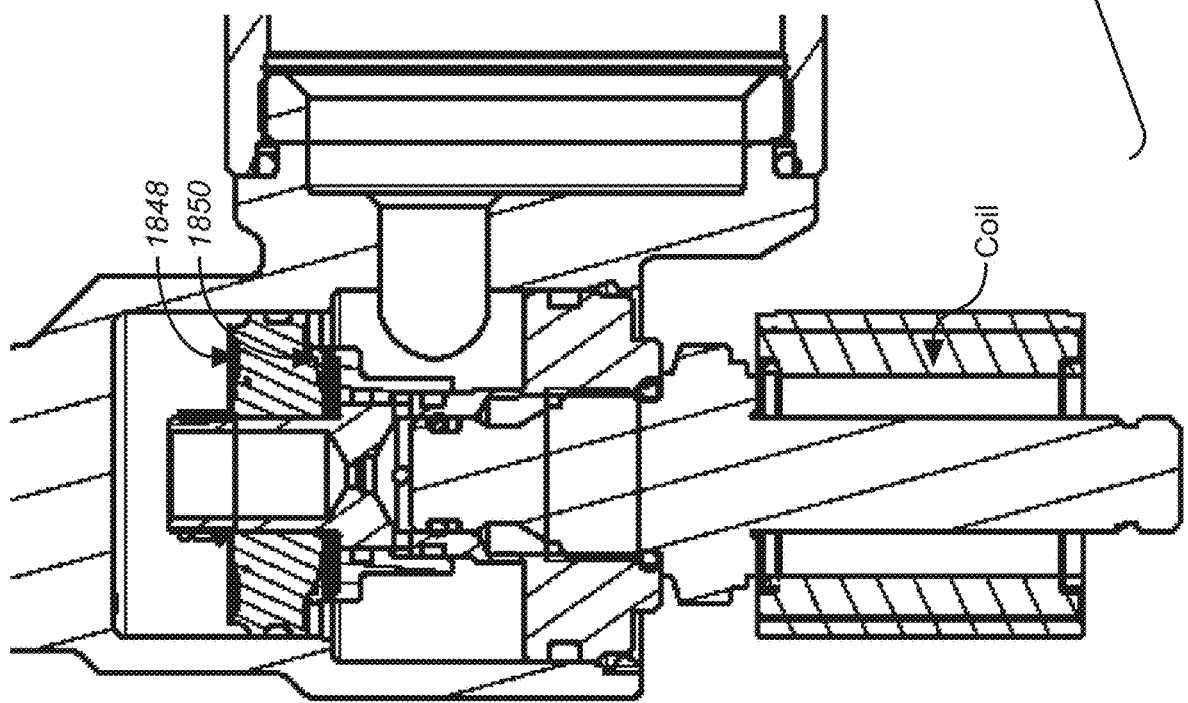

FIG. 18J is a side cross-sectional view of the electronic valve 460 acting as the base valve assembly. In various embodiments, the design of the electronic valve to be located next to the piston of the monotube by-pass shock absorber is the same design as that electronic valve to be located as the base valve design. Of note, the electronic valve of FIG. 18J also includes check valves 1848 and compression valves 1850.

As noted and as will be described below, embodiments of the new technology may be implemented at least in the following design types: 1) a monotube design; 102) a monotube internal bypass design; and 3) a twin-tube design.

1) Monotube Shock Absorber Design with Integrated Variable Pressure Valve: A brief description of a monotube shock absorber design is as follows. A monotube shock absorber has a single cylinder that is divided by a floating piston and seal into a fluid area section and a high pressure gas chamber section. The piston and the shaft move in the fluid portion. It uses a single fluid valve assembly in the piston. There is no need for an air or gas in the fluid area. This provides an expansion area for the excess fluid movement during the compression stroke. On more aggressive movement, the floating piston is pushed further into the gas chamber with increases gas pressure quickly and provides additional damping.

FIG. 18K shows an electronic valve 460 integrated into a monotube design of a shock absorber, with a piggy back chamber, in accordance with an embodiment. The electronic valve 460 operates as the base valve. (Of note, the monotube design may operate without a base valve.) FIG. 18L shows an enlarged cross-sectional view of the base valve electronic valve 460 of Detail A of FIG. 18K, in accordance with an embodiment. A general description of the monotube design in operation is as follows. The electronic valve 460 is utilized as the base valve, in this embodiment. The shaft 1853 is displaced into the chamber 1856 for shaft displacement (fluid chamber). This monotube design includes an internal floating piston (IFP) 1859 that moves backwards and forwards depending on the shaft's 1853 displacement and/or thermal expansion of the fluid. In this case, the IFP 1859 moves toward the side opposite that of the shaft 1853, making room for that fluid that is being displaced as a result of the shaft displacement. The fluid is displaced into the external shaft displacement reservoir 1858, shown to be on one side of the IFP 1859. Within this design, there are two pistons: the main damping piston 1855 affixed to the piston rod 1854; and the IFP 1859 which separates the gas charge (the spring) and the oil (fluid).

More particularly, during compression, the shaft 1853 along with the piston rod 1854 enters the chamber 1856, thereby also pushing the damping piston 1855 further into the chamber 1856. The damping piston 1855 takes up volume within the chamber 1856, and creates a fluid flow 1857 toward the electronic valve 460, acting as the base valve. As can be seen in the enlarged view of the electronic valve 460, the fluid flows into the passageway leading to the electronic valve 460. The check valve 1861 is found to be closed. Also shown in FIG. 18L is the primary valve 1814 that is pressed against the reed shims 1806. When the check valve 1861 is closed, the fluid flows through the reed shims 1806, which open upon receiving the force of the fluid flow (of note, this may be any sort of compression valve appropriate to regulate fluid flow there through), and into the external shaft displacement reservoir 1858. The fluid also flows, to some small degree, through the orifice 1818 and then through the pressure variable valve 1814 and into the external shaft displacement reservoir 1858. When enough fluid enters the external shaft displacement reservoir 1858, that fluid takes up its volume and then pushes against the IFP 1859. The IFP 1859, upon being pushed during compression of the shock absorber, further enters the gas chamber 1860, which acts as a spring, and hence another source of damping, in accordance with embodiments.

FIG. 18M shows the monotube design 1852 in a rebound position, in accordance with an embodiment.

FIG. 18N shows an enlarged view of the electronic valve 460 shown in Detail A of FIG. 18M, in accordance with an embodiment. During rebound of the shock absorber, the shaft 1853 and the piston rod 1854 move out of the chamber 1856, thereby also pulling the damping piston 1855 further toward the end of the chamber 1856 that is opposite the end with the electronic valve 460 coupled therewith. A vacuum of fluid flow 1863 is created, wherein the fluid flow 1863 is directed toward the damping piston 1855 that is moving in the same directions as the shaft 1853, in one embodiment. During rebound, the check valve 1861 is open. The fluid flow 1863 from the external shaft displacement reservoir 1858, through the channel connecting the chamber 1856 and the external shaft displacement reservoir 1858, and into the chamber 1856 is unimpeded. For example, the check valve 1861 is open during rebound. Fluid flow generally takes the path of least resistance. Thus, the fluid, during rebound, and in response to the vacuum of fluid that is created by the shaft 1853 being pulled out of the chamber 1856, does not flow back through the electronic valve 460 (such as through the pressure variable valve 1814 and then though the reed shims 1806). Instead, the path of least resistance is the gap left by the check valve 1861 while it is open during rebound movement. Thus, the fluid flows from the external shaft displacement reservoir 1858, through the check valve 1861, and into the chamber 1856, according to one embodiment. Additionally, the gas spring and/or the coil spring within the gas chamber 1860 facilitates the movement of the fluid flow from the external shaft displacement reservoir 1858 and into the chamber 1856 by pushing the IFP 1859 further into the external shaft displacement reservoir 1858, in accordance with embodiments.

102) Internal Bypass Monotube Shock Absorber Design with Integrated Variable Pressure Valve: FIG. 18O shows the electronic valve 460 integrated into an internal bypass monotube design 1863 for a shock absorber, in accordance with an embodiment. FIG. 18P shows an enlarged view of the electronic valve 460 of Detail A shown in FIG. 18O. With exception to the bypass holes 1864 located along the wall of the chamber 1856, during compression and rebound, the components of the internal bypass monotube design 1863 function in the same manner as those components described with respect to FIG. 18K, in accordance with an embodiment. The bypass holes 1864 function as follows. As the shaft 1853 moves more deeply into the chamber 1856, the damping piston 1855 creates a fluid flow 1857 toward the electronic valve 460. In so doing, the fluid flows past the bypass holes 1864. Some of the fluid enters the bypass holes 1864 and travels through an annular chamber 1865 and back to the rebound reservoir chamber 1866, in accordance with embodiments. Once the damping piston 1855 travels past the location of the bypass holes 1864, no more fluid from the compression side of the damping piston 1855 moves through the bypass holes 1864. During rebound, compression process is reversed and the check valve 1861, as was described with respect to the monotube design 1852 of FIG. 18K, is open. On note, the base valve circuitry is the same as the monotube design 1858 and the internal bypass monotube design 1863.

3) Twin Tube Shock Absorber Design with Integrated Variable Pressure Valve: A brief description of a twin tube shock absorber design is as follows. A twin tube shock absorber has an inner and outer cylinder. The inner cylinder is a working cylinder, in which a piston and shaft move up and down. The outer cylinder serves as a reservoir for a hydraulic fluid. There are fluid valves in the piston and in the stationary base valve. The base valve controls the fluid flow between both cylinders and provides some of the damping force. The valves in the piston control most of the damping.

Figure 18Q:
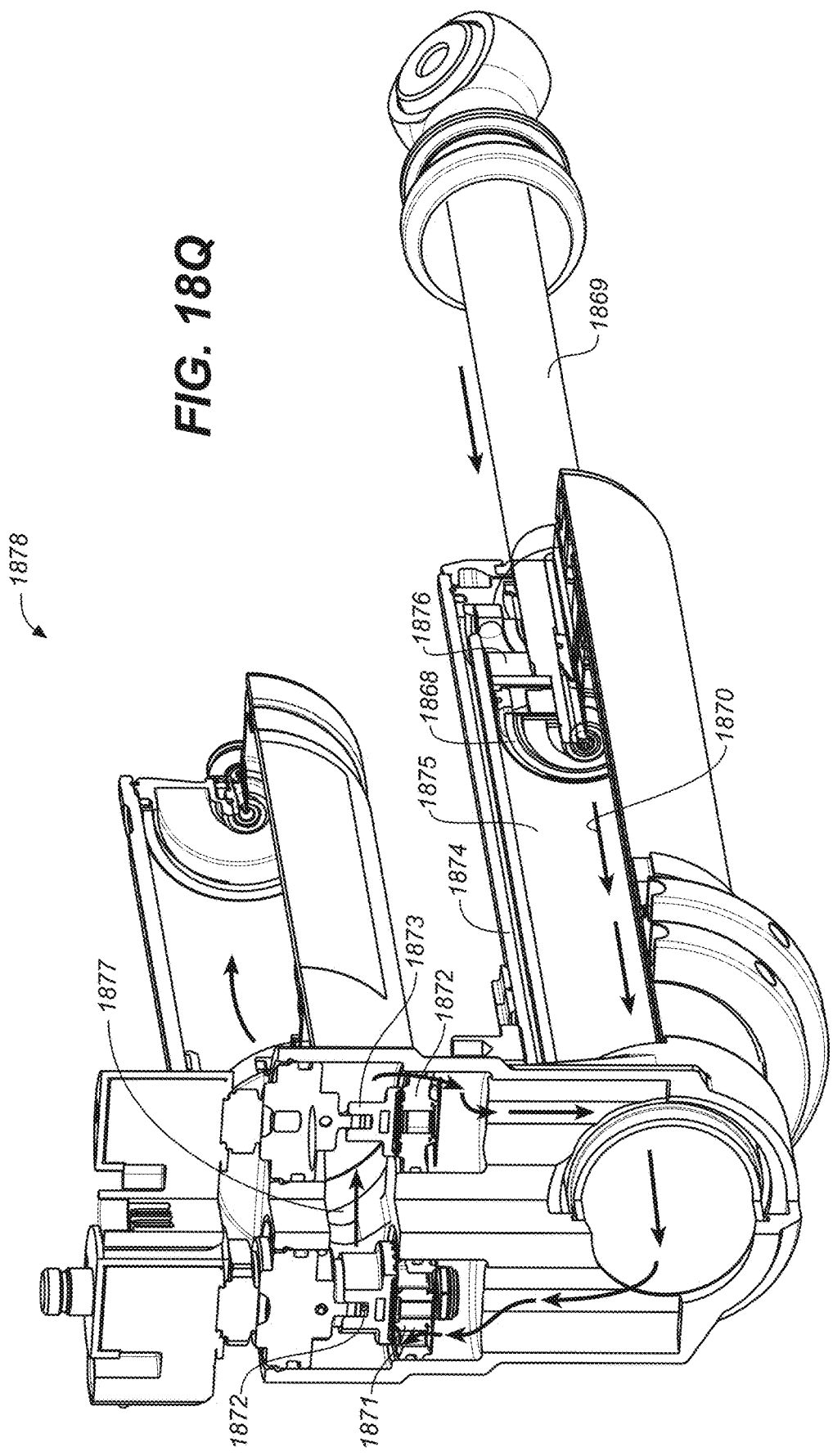
FIG. 18Q is a side section view of a twin tube 1878 in a compression state, in accordance with an embodiment.

FIG. 18Q is a side section view of a twin tube design 1878 in a compression state, in accordance with an embodiment. Of note, the damping piston 1868 does not have any valves there through, such that the movement of the shaft 1869, which pushes the damping piston 1868 into the reservoir 1875, causes the fluid flow 1870 toward the left valve 1872, in accordance with an embodiment. The check valve 1871 is closed. The fluid then moves through the left electronic valve 1872, turns a corner, flows around the right electronic valve 1873, and then flows through the open check valve 1872, and down into the outer part 1874 of the tube. Form the outer part 1874 of the tube, the fluid flows into the backside 1876 of the damping piston 1868. When the twin tube experiences a rebound positioning, the aforementioned fluid flow process is reversed. Of note, only the amount of fluid reflows that actually fits within the backside 1876 of the damping piston 1868.

Additionally, in between the two electronic valves 1872 and 1873 that are positioned in parallel with each other, is a cavity that connects to the IFP cavity 1877, in one embodiment. In this embodiment, one of the electronic valves works for compression and the other electronic valve works for rebound, while the damping piston is being used as a pump.

Figure 18R:
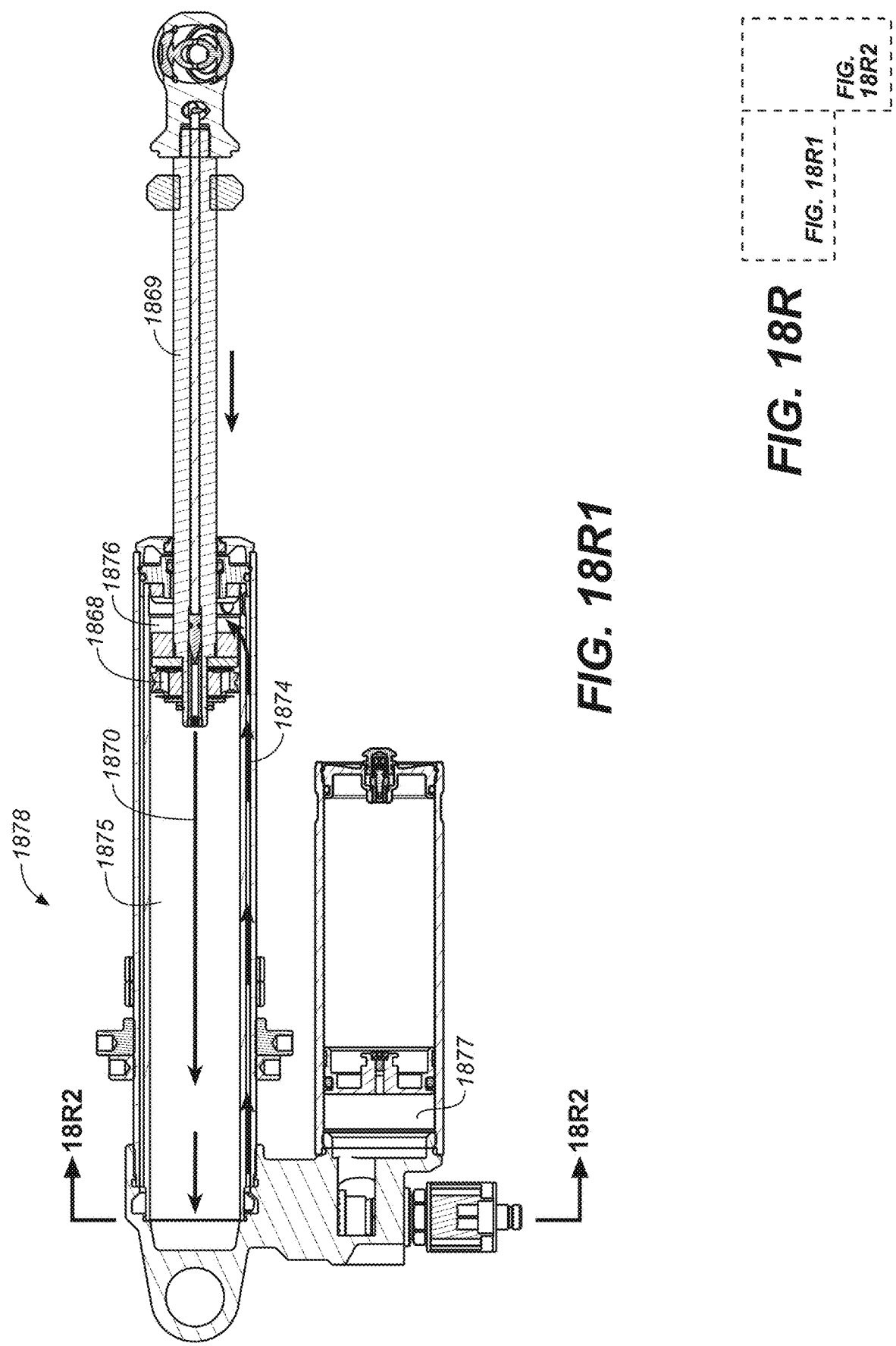
FIG. 18R is a block description of the relationship between the components shown in FIGS. 18R1 and 18R2, in accordance with an embodiment.

FIG. 18R is a side section view of the twin tube design 1878 in a compression state, including a section view from the two electronic valves positioned in parallel with each other, in accordance with an embodiment. Of note, the fluid flow 1870 shown in FIG. 18R is the same as that described with respect to FIG. 18Q.

Example Computer System Environment

Figure 3:
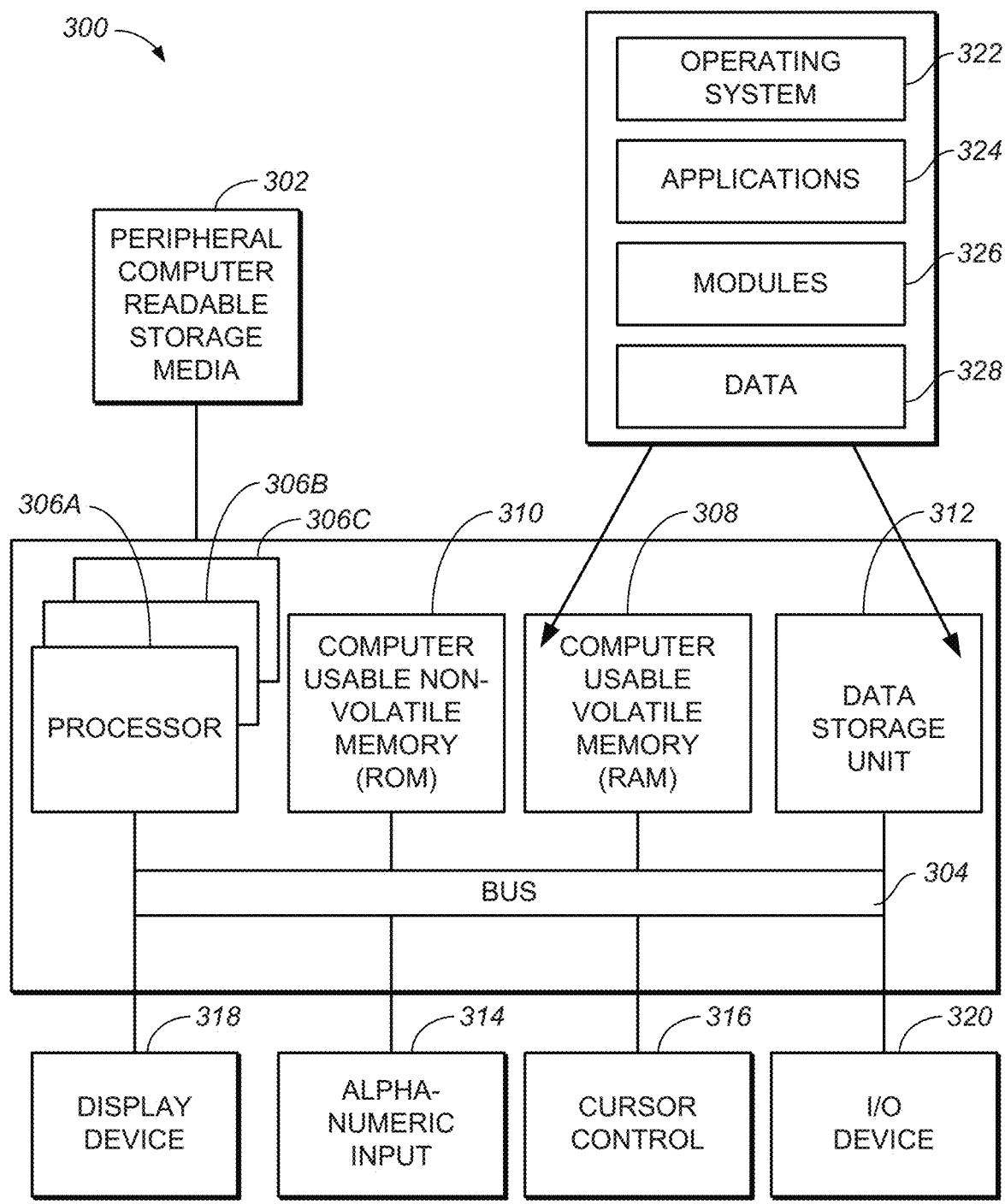
FIG. 3 is a block diagram of an example computer system with which or upon which various embodiments of the present invention may be implemented.

With reference now to FIG. 3, all or portions of some embodiments described herein are composed of computer-readable and computer-executable instructions that reside, for example, in computer-usable/computer-readable storage media of a computer system. That is, FIG. 3 illustrates one example of a type of computer (computer system 300) that can be used in accordance with or to implement various embodiments which are discussed herein. It is appreciated that computer system 300 of FIG. 3 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multi-media devices, and the like. Computer system 300 of FIG. 3 is well adapted to having peripheral non-transitory computer-readable storage media 302 such as, for example, a floppy disk, a compact disc, digital versatile disc, other disc based storage, universal serial bus "thumb" drive, removable memory card, and the like coupled thereto.

System 300 of FIG. 3 includes an address/data bus 304 for communicating information, and a processor 306A coupled with bus 304 for processing information and instructions. As depicted in FIG. 3, system 300 is also well suited to a multi-processor environment in which a plurality of processors 306A, 306B, and 306C are present. Conversely, system 300 is also well suited to having a single processor such as, for example, processor 306A. Processors 306A, 306B, and 306C may be any of various types of microprocessors. System 300 also includes data storage features such as a computer usable volatile memory 308, e.g., random access memory (RAM), coupled with bus 304 for storing information and instructions for processors 306A, 306B, and 306C.

System 300 also includes computer usable non-volatile memory 310, e.g., read only memory (ROM), coupled with bus 304 for storing static information and instructions for processors 306A, 306B, and 306C. Also present in system 300 is a data storage unit 312 (e.g., a magnetic or optical disk and disk drive) coupled with bus 304 for storing information and instructions. System 300 also includes an optional alphanumeric input device 314 including alphanumeric and function keys coupled with bus 304 for communicating information and command selections to processor 306A or processors 306A, 306B, and 306C. System 300 also includes an optional cursor control device 316 coupled with bus 304 for communicating user input information and command selections to processor 306A or processors 306A, 306B, and 306C. In one embodiment, system 300 also includes an optional display device 318 coupled with bus 304 for displaying information.

Referring still to FIG. 3, optional display device 318 of FIG. 3 may be a liquid crystal device, cathode ray tube, plasma display device or other display device suitable for creating graphic images and alphanumeric characters recognizable to a user. Optional cursor control device 316 allows the computer user to dynamically signal the movement of a visible symbol (cursor) on a display screen of display device 318 and indicate user selections of selectable items displayed on display device 318. Many implementations of cursor control device 316 are known in the art including a trackball, mouse, touch pad, joystick or special keys on alphanumeric input device 314 capable of signaling movement of a given direction or manner of displacement. Alternatively, it will be appreciated that a cursor can be directed and/or activated via input from alphanumeric input device 314 using special keys and key sequence commands. System 300 is also well suited to having a cursor directed by other means such as, for example, voice commands. System 300 also includes an I/O device 320 for coupling system 300 with external entities. For example, in one embodiment, I/O device 320 is a modem for enabling wired or wireless communications between system 300 and an external network such as, but not limited to, the Internet.

Referring still to FIG. 3, various other components are depicted for system 300. Specifically, when present, an operating system 322, applications 324, modules 326, and data 328 are shown as typically residing in one or some combination of computer usable volatile memory 308 (e.g., RAM), computer usable non-volatile memory 310 (e.g., ROM), and data storage unit 312. In some embodiments, all or portions of various embodiments described herein are stored, for example, as an application 324 and/or module 326 in memory locations within RAM 308, computer-readable storage media within data storage unit 312, peripheral computer-readable storage media 302, and/or other tangible computer-readable storage media.

Example System for Controlling Vehicle Motion of a Vehicle with More than Two Wheels (e.g., Truck, Car, Side-by-Side)

Figure 4A:
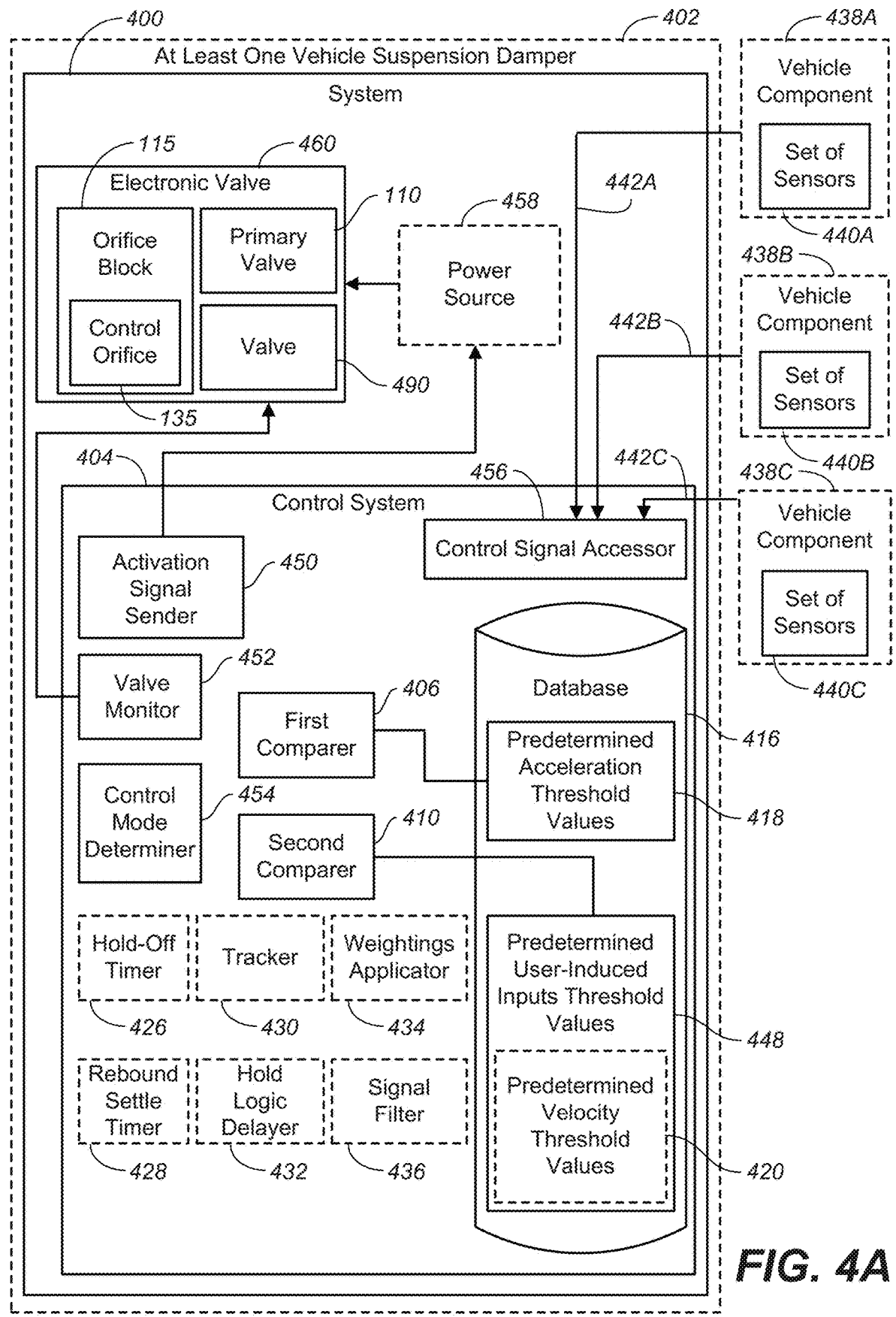
FIG. 4A is a block diagram of a system 400 for controlling vehicle motion, in accordance with an embodiment.

The system 400 (of FIG. 4A) for controlling vehicle motion is described in relation to controlling the operation of a multi-wheeled vehicle that has more than two wheels, such as, but not limited to, trucks, cars, and more specialized vehicles such as, but not limited to side-by-sides and snowmobiles, in accordance with embodiments. It should be appreciated that while the following discussion focuses on vehicles with four wheels, it should be appreciated that embodiments are not limited to controlling the operation upon vehicles with four wheels. For example, embodiments may be used with vehicles with three wheels, five wheels, six wheels, etc. Four-wheeled vehicles may have four vehicle suspension dampers attached therewith, one vehicle suspension damper attached to each wheel and to the vehicle's frame. In one embodiment, the system 400 includes an electronic valve 460, as shown in FIG. 4A. The electronic valve, in one embodiment, includes the orifice block 122, the primary valve 132 and a valve 490. The valve 490, in one embodiment, is the pilot valve assembly 112. In another embodiment, the valve 490 is a variable pressure valve 462.

The system 400 and method, as will be described, detects rolls, pitches, and heaves of four-wheeled vehicles. For example and with regard to detecting rolls, if a car turns a corner sharply left and begins to roll to the right, embodiments sense the velocity of the steering wheel as it is being turned, as well as the translational acceleration associated with the roll experienced by the vehicle. The translational acceleration (distance/time$^2$) associated with the roll measures side accelerations. In response to this sensing and in order to control the roll, a control system causes the outer right front and back vehicle suspension dampers to firm up, in some embodiments. Of note, in some embodiments, the vehicle's pitch is measured by sensing the velocity of the throttle pedal as it is being pressed and/or released. In other embodiments, the vehicle's pitch may also be measured by sensing the velocity and/or the position of the throttle pedal as it is being pressed and/or released. In yet other embodiments, the vehicle's pitch is measured by sensing the acceleration of the vehicle. Of further note, the control system does not utilize throttle pedal information to measure roll.

As noted, FIG. 4A is a block diagram of a system 400 for controlling vehicle motion, in accordance with an embodiment. In one embodiment, the system 400 includes the electronic valve 460 (that includes the same component as the electronic valve 100 shown in FIG. 1 or includes the same components as the electronic valve 460 shown in FIGS. 4A & 4B) and the control system 404. It should be appreciated that the orifice block 122 (including the orifice 124) and the primary valve 132 of the electronic valve 460 operate in a similar manner as is described herein in regard to the electronic valve 100 of FIG. 1, in accordance with embodiments.

In one embodiment, the control system 404 includes the following components: a control signal accessor 456; a first comparer 406; a second comparer 410; a valve monitor 452; a control mode determiner 454; and an activation signal sender 450. Of note, the control signal accessor 456, the first comparer 406, and the valve monitor 452 have similar features and functions as the control signal accessor 1730, the comparer 172, the valve monitor 1745, and the activation signal sender 1750, respectively. The second comparer 410 compares the accessed user-induced inputs to predetermined user-induced inputs threshold values 448 found at, in one embodiment, the database 416 (in another embodiment, a database residing external to the control system 404. Further, in various embodiments, the control system 404 optionally includes any of the following: a database 416, a hold-off timer 426; a tracker 430; a hold logic delayer 432; a rebound settle timer 428; a weightings applicator 434; and a signal filter 436. The database 416, according to various embodiments, optionally includes predetermined acceleration threshold values 418 and predetermined user-induced inputs threshold values 448. In various embodiments, the predetermined user-induced inputs threshold values 448 include predetermined velocity threshold values 420. In other embodiments, the predetermined user-induced inputs threshold values include any of the following values: steering velocity threshold value; shock absorber velocity threshold value; brake velocity threshold value; steering position threshold value; throttle position threshold value; shock absorber position threshold value; and brake threshold value.

In one embodiment, the control system 404 may be part of the vehicle suspension damper 402 (that is, for example, on a side-by-side), or it may be wire/wirelessly connected to the control system 404. As will be discussed below, the control system 404 of system 400 is further configured for comparing a set of values associated with at least one user-induced input (such as a user turning a steering wheel and the velocity resulting therefrom) with at least one user-induced input threshold value.

Figure 4B:
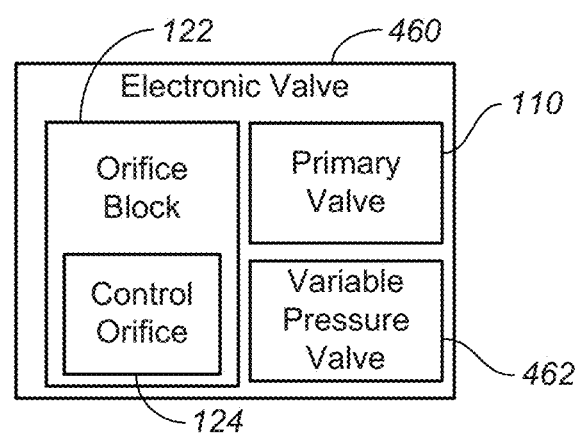
FIG. 4B is a block diagram of an electronic valve 460 which may be integrated into the system 400, in accordance with an embodiment.

In brief, and with reference to FIGS. 1, 4A and 4B, embodiments provide for a control system 404 that accesses a set of control signals 442 (control signal 442A, control signal 442B and control signal 442C; it should be appreciated that there may be any number of control signals, depending on the number of sensors coupled with vehicle components) that includes both acceleration values and a set of values associated with user-induced inputs (such as velocity values [of a steering wheel being turned and/or a throttle pedal being pressed upon and/or released] measured by a set of gyrometers). It should be appreciated that the set of sensors 440A, 440B and 440C (hereinafter, set of sensors 440, unless specifically noted otherwise) attached to the vehicle component 438A, 438B and 438C (hereinafter, vehicle component 438, unless specifically noted otherwise), respectively, may include one or more sensors, such as, but not limited to, accelerometers and gyrometers. In some embodiments, the acceleration values with respect to the four-wheeled vehicles are lateral (side-to-side motion) and longitudinal g's (forward and backwards motion). In other embodiments, the acceleration values with respect to four-wheeled vehicles are lateral g's, longitudinal g's and vertical g's (up and down motion). User-induced inputs, according to embodiments, are those inputs by a user that cause a movement to a vehicle component of the vehicle. For example, user-induced inputs may include, but are not limited to any of the following: turning a steering wheel; pressing a brake pedal (the ON/OFF resultant position of the brake pedal being pressed is measured); and pressing a throttle pedal (a velocity and/or position of the throttle pedal is measured). Thus, a set of values associated with the user-induced inputs may be, but are not limited to being, any of the following user-induced inputs: a measured velocity value of the turning of a steering wheel; a brake's on/off status; velocities associated with pressing down on the brake and/or the throttle pedal; and the difference in the positions of the throttle pedal before and after being pressed (or the absolute throttle position). Of note, the user-induced inputs that are measured are inputs received before acceleration is measured, yet relevant in quickly determining corrective damping forces required to control the roll, pitch and heave once experienced. Thus, the user-induced inputs are precursors to the sensed accelerations of various vehicle components (e.g., vehicle wheels).

Once these values (measured acceleration value and the set of values associated with the user-induced inputs) are accessed by the control signal accessor 456, the first comparer 406 and the second comparer 410 compare these values to threshold values, such as those found in the database 416 (a store of information). Further, according to embodiments, the activation signal sender 450 sends an activation signal to the power source 458 to deliver a current to the electronic valve 460, and more particularly, a valve (e.g., of the variable pressure valve 464), based upon the following: 1) the comparison made between the measured acceleration value and the predetermined acceleration threshold value 418 discussed herein; 2) the comparison made between the measured velocity of the steering wheel as it is being turned (the set of values associated with user-induced inputs) and the predetermined velocity threshold value 420 of the predetermined user-induced inputs threshold values 448; and 3) the monitoring of the state of the electronic valve 460.

It should be appreciated that embodiments may include, but are not limited to, other configurations having a control system in wire/wireless communication with the vehicle suspension damper to which it is controlling, such as: 1) a vehicle with only one control system that is wire and/or wirelessly connected to all vehicle suspension dampers attached thereto; 2) a vehicle with one control system attached to one vehicle suspension damper, wherein the one control system controls the other control systems attached to other vehicle suspension dampers (that are attached to different wheels) of the vehicle; and 3) a vehicle with one control system that is not attached to a vehicle suspension damper, wherein the one control system controls other control systems that are attached to vehicle suspension dampers on the vehicle.

In embodiments, the system has at least four user selectable modes: a soft mode; a firm mode; an auto mode; and a remote mode. Further, embodiments enable modes there between the at least four user selectable modes.

According to embodiments, in the soft mode, all the vehicle suspension dampers are soft for compression and rebound.

According to embodiments, in the firm mode, all rebound and/or compression are firm. The firmness of the rebound and/or compression is adjustable through system settings. In one embodiment, the adjustable system settings are factory set and are finite in number. In another embodiment, an infinite number of adjustable system settings are provided. In yet another embodiment, the user may customize and re-configure a finite number of system settings.

According to embodiments, in the auto mode, all vehicle suspension dampers are placed in the soft setting with the control system transiently setting various vehicle suspension dampers to be firm.

In the remote mode, a wireless browser interface enables the soft, firm and auto mode to be selected. In one embodiment, the control system 404 monitors the position setting of a mechanical switch positioned on the vehicle, wherein the position setting may be set at one of the following modes: soft; firm; auto; and remote (i.e., at least partially wireless). Compression and rebounds are used to reduce the tilt of the vehicle frame. Particular advantages associated with using rebound adjustments are at least the following: a vehicle suspension damper in a hard rebound mode lowers the vehicle's center gravity; and the suspension is allowed to compress and absorb bumps while performing a controlled turn, thereby reducing the feeling of a harsh ride.

When the vehicle suspension damper is in the auto mode, the control system 404 causes the damping force within the vehicle suspension dampers to be adjusted when the trigger logic described below is found to be accurate for the roll and pitch positive and negative modes. The desired state of the vehicle suspension damper that is achieved from this adjustment is considered to be a control mode. "Trigger Logic" is logic implemented by the control system 404 that determines whether or not the vehicle suspension damper is allowed to pass into one of the control modes when the vehicle suspension damper is in an auto mode. Operational examples of trigger logic implemented by the control system 404 are described below. "Hold Logic" is logic that is implemented by the control system 404 that holds the system in a given control mode even after the possibly transient trigger logic has become false (becomes inaccurate). Operational examples of hold logic implemented by the control system will be described below.

Embodiments also provide various damper control settings available to be implemented for each control mode. A damper control setting is one in which the damping force within the vehicle suspension damper is adjusted for one or more of the vehicle suspension dampers attached to the vehicle.

In embodiments, the vehicle's roll and pitch are ultimately determined from measuring the vehicle's acceleration and measuring the vehicle component movement caused by user-induced inputs. In measuring the vehicle's roll and pitch, both have defined positive and negative directions. For example, the vehicle axis is defined as having an x-axis, a z-axis, and a y-axis. The x-axis is defined as being out the front of the vehicle. The z-axis is defined as being up. The y-axis is defined as following the right hand rule, which means the y-axis is out the left side of the vehicle.

Thus, a roll positive mode is defined as a positive rotation about the x-axis of the vehicle associated with a left turn. A roll negative mode is defined as a negative rotation about the x-axis of the vehicle associated with a right turn.

A pitch positive mode, occurring during a dive, is defined as a positive rotation about the y-axis of the vehicle associated with braking. A pitch negative mode, occurring during a squat, is defined as a negative rotation about the y-axis of the vehicle associated with throttling.

Below is a description of the control modes: 1) roll positive and roll negative control modes; 2) pitch positive control mode—dive; and 3) pitch negative control mode—squat. Further, the trigger and hold logic associated with each control mode and the damper control setting options available for each control mode, is also described in accordance with various embodiments:

It should be appreciated that information associated with the control modes, the trigger and hold logic associated with each control mode and the damper control setting options available for each control mode are stored, in one embodiment, in the database 416. The information is accessible by the first comparer 406, the second comparer 410 and the control mode determiner 454.

1) Roll Positive and Roll Negative Control Modes—Trigger Logic, Hold Logic, and Damper Control Settings Available Upon exceeding a threshold (defined by the trigger logic below) while the vehicle experiences a roll positive or a roll negative, the control system 404 causes the variable pressure valve 464 to adjust to achieve a control state in which the roll positive and the roll negative are reduced or eliminated. Implementation options also available to achieve such a control state are listed below. With regard to the roll positive and roll negative controls that define circumstances when the roll positive and roll negative control modes are triggered or the control modes are held in place, the following definitions apply:

"ThreshSteerVelTrigger"—This is the threshold required for steering wheel velocity to trigger a roll control, subject to the side acceleration being above at least "threshSideAccelRollAllow". The main advantage of triggering a damping force change on steering wheel velocity over side acceleration is that the side acceleration signal lags that of the signal for the velocity value corresponding to the turning of the steering wheel. This threshold is adjustable and may be tuned for trigger and hold logic (tuned by the end user or hard coded).

"ThreshSideAccelRollAllow"—This is the threshold required for side acceleration to allow threshSteerVelTrigger to trigger roll control. The threshSideAccelRollAllow is nominally set less than zero given that it is used to ensure the steering wheel velocity signal is not inconsistent with the side acceleration signal which, for example, would be the case in a counter steer maneuver. Setting this threshold too high adversely affects the system response time by forcing it to wait for the side acceleration signal to build up. This threshold is adjustable and may be tuned for trigger and hold logic (tuned by the end user or hard coded).

"ThreshSideAccelRollTrigger"—This is the threshold required for side acceleration to trigger roll control, without the need for any other trigger. This allows the system to initiate roll control even if the steering wheel velocity signal does not. This is nominally set high on the order of 0.7 g or greater, values that are normally only reached in a sustained turn. This condition could be reached, for example, when coming out of a corner steer maneuver, or if the terrain were to help turn the vehicle sideways. This threshold is adjustable and may be tuned for trigger and hold logic (tuned by the end user or hard coded).

"ThreshSideAccelRollHold"—This threshold is required for side acceleration to keep the system in roll control after it's already triggered. The level of side acceleration required to stay in roll control should be lower than the value required to trigger it. This adds hysteresis to the system and reduces the tendency to bounce in and out of the control mode when the signals are near their thresholds. Nominally, this value is set between maybe 0.2-0.5 g's. This threshold is adjustable and may be tuned for trigger and hold logic (tuned by the end user or hard coded).

"ThreshSteerPosHold"—This threshold is required for the steering wheel angle to keep the system in roll control. This threshold is adjustable and may be tuned for trigger and hold logic (tuned by the end user or hard coded).

1) Roll Positive and Roll Negative Control Logic
A. Roll Positive Control and Roll Negative Control Trigger Logic
  i. Roll Positive Control Trigger Logic:
    a. ((steer velocity>threshSteerVelTrigger) AND (side acceleration>threshSideAccelRollAllow)); OR
    b. (side acceleration>threshSideAccelRollTrigger).
  ii. Roll Negative Control Trigger Logic:
    a. ((steer velocity←threshSteerVelTrigger) AND (side acceleration←threshSideAccelRollAllow)); OR
    b. (side acceleration←threshSideAccelRollTrigger).
B. Roll Positive Control and Roll Negative Control Hold Logic
  i. Roll Positive Control Hold Logic:
    a. (side acceleration>threshSideAccelRollHold); OR
    b. (steer position>threshSteerPosHold).
  ii. Roll Negative Control Hold Logic:
    a. (side acceleration←threshSideAccelRollHold); OR
    b. (steer position←threshSteerPosHold).
C. Roll Positive Control and Roll Negative Damper Control Settings Available
  Option 1: Firm inside rebound front and back.
  Option 2: Firm outside compression front and back.
  Option 3: (1) Firm inside rebound front and back; and (2) Firm outside compression front and back.
  Option 104: (1) Firm inside rebound front and back; (2) Firm outside compression front and back; and (3) Firm outside rebound front and back.

In discussion of embodiments comparing the measured values to the threshold values, the following example is given with regard to trigger logic. A driver of a vehicle turns a steering wheel to the left. The vehicle then turns left. As a result of these actions, the steering wheel has a velocity value associated with it, and the vehicle has a side acceleration associated with it.

A control signal accessor 456 of the vehicle accesses a set of control signals 442 that includes the measured side acceleration value and the measured steering wheel velocity value. The first comparer 406 compares the measured side acceleration value to the predetermined acceleration threshold values 418 (stored at the database 416). The first comparer 406 determines if the measured acceleration value is more or less than the predetermined acceleration threshold value. The first comparer 406 accesses the database 416 to find trigger logic that matches the statement in which the comparison between the measured acceleration value and the predetermined acceleration threshold value holds true.

The trigger logic is linked to a particular control mode that is pre-assigned to that particular trigger logic. If the trigger logic describes the comparison between the measured values and the predetermined threshold values accurately, then the trigger logic is determined to be true. The control system 404 will then actuate the valve within the electronic valve 100 according to the control mode assigned to the trigger logic statement.

Continuing with the example above, the first comparer 406 finds that the measured side acceleration value was greater than the predetermined side acceleration threshold value. The second comparer 410 finds that the measured steering wheel velocity value is greater than the predetermined user-induced input threshold value.

As described herein, one set of trigger logic that is linked to the roll positive control, is as follows:
a. ((steer velocity>threshSteerVelTrigger) AND (side acceleration>threshSideAccelRollAllow)); OR
b. (side acceleration>threshSideAccelRollTrigger).

Accordingly, if either of the statements "a" or "b" above is found to be accurate, then the control mode determiner 454 determines which control mode is linked to these logic statements. Once the control mode is determined, the control system 404 actuates a valve (e.g., pilot valve assembly 132) within the electronic valve 100 to adjust the vehicle suspension damper. In this example, the first comparer 406 found that the following statement is accurate: (side acceleration>threshSideAccelRollTrigger). The control mode determiner 454 determines that the accurate statement is linked to the roll positive control. Knowing under what control mode the vehicle suspension damper should operate (e.g., roll positive control, roll negative control), the control system 404 actuates the electronic valve 100, and more particularly, the pilot valve assembly 132 therein. Thus, in this embodiment, the control system 404 is enabled to implement the roll positive control mode, according to at least the options discussed herein with regard to the roll positive control mode.

Further, in this situation, the second comparer 410 finds that the steer velocity value is greater than the predetermined steer velocity threshold value (of the predetermined velocity threshold values 420). Thus, the second comparer 410 finds the following first portion of a statement to be accurate: ((steer velocity>threshSteerVelTrigger). The second portion of the statement, (side acceleration>threshSideAccelRollTrigger), has already been compared and determined to be accurate.

Thus, in one embodiment, the control mode determiner 454 may determine a control mode for a vehicle suspension damper in which trigger logic that includes only acceleration comparisons are used. However, in another embodiment, the control mode determiner 454 may determine a control mode for a vehicle suspension damper in which trigger logic includes both acceleration comparisons and user-induced inputs comparisons.

The control mode determiner 454 operates in a similar manner in interpreting the trigger logic and hold logic linked to other control modes. Thus, in one embodiment, should the trigger logic (a.k.a. control logic) be determined to be accurate, the control mode determiner 454 follows the link from the trigger logic to find the control mode setting.

In discussion of embodiments comparing the measured values to the threshold values, the following examples are given with regard to hold logic. There are at least several situations that occur in which the system is held in a given control mode even after the trigger logic has become false. Below, examples are given of a few of these cases. For the three example scenarios described below, the following threshold values are set in the control system: the steering velocity threshold ("threshSteerVelTrigger") value is 10 rad./sec.; the acceleration trigger threshold ("threshSideAccelRollTrigger") value is 0.7 g's; the acceleration hold threshold ("threshSideAccelRollHold") value is 0.2 g's; and the acceleration allow threshold ("threshSideAccelRollAllow") value is −0.1 g's.

With reference to FIG. 4A, a first example scenario involves the triggering of an adjustment of the vehicle suspension dampers upon receiving a steering wheel velocity measurement, but the holding of the control mode as to the vehicle suspension damper upon receiving a particular side acceleration value. For example, a vehicle rider turns a steering wheel while the vehicle is directed into a turn. The set of sensors 440 (could be set of sensors 440A, 440B and/or 440C; it should be appreciated that there could be more or less sets of sensors, depending on the quantity of vehicle components to which the sets of sensors may be attached) send a velocity signal to the control signal accessor 456. The second comparer 410 compares the measured velocity value of 15 rad/sec. to the predetermined velocity threshold values 420 and to the trigger logic also stored at the database 416 and determines that the measured velocity value of 15 rad/sec. is higher than the predetermined velocity threshold value of 10 rad/sec. The set of sensors 440 also sends to the control signal accessor 456 a side acceleration value of 0.4 g's. The first comparer 406 compares the measured side acceleration value of 0.4 g's to the predetermined acceleration trigger threshold value of the predetermined acceleration threshold values 418 and to the trigger logic also stored at the database 416 and determines that the measured side acceleration value of 0.4 g's is lower than the predetermined acceleration trigger threshold value for side acceleration of 0.7 g's. Since at least one of the trigger logics, namely, the steering wheel velocity, is true, then the control system 404 is triggered to cause the power source 458 to be actuated such that the electronic valve 100 receives a current. The current causes the electronic valve to close into the firm mode.

However, after a small amount of time (e.g., a fraction of a second) during the turn, since the steering wheel is no longer being moved into a sharper or less sharp turning position, the steering wheel velocity value lessens to a value close to zero. Thus, the trigger logic has become false, even though, the vehicle is still experiencing g's and is still turning. Without "hold logic" ("threshSideAccelRollHold" of 0.2 g's), the control system 404 would be triggered to cause the vehicle suspension damper to return to the soft mode (by causing the electronic valve 100 to open). In this example, the logic requires the side acceleration value to fall below 0.7 g's before the control system 404 is possibly triggered to adjust the damping of the vehicle suspension damper. However, the side acceleration g's that the vehicle is experiencing remains close to 0.4 g's throughout the turn, which is greater than 0.2 g's (the acceleration hold threshold value), the control system 404 does not cause the vehicle suspension damper to be adjusted throughout the turn. When the vehicle then begins moving in a straight path, the side acceleration values fall below 0.2 g's and thus below the "threshSideAccelRollHold" value, and the control system 404 is triggered to cause the vehicle suspension damper to adjust to the soft mode.

With continued reference to FIGS. 4A and 4B, a second example scenario involves the triggering of an adjustment of the vehicle suspension dampers upon receiving a first side acceleration value, and the holding of the control mode as to the vehicle suspension damper upon receiving a second side acceleration value. For example, if a vehicle is traveling down a straight path that has various obstacles causing the vehicle to jump and dip, then the vehicle is caused to rattle back and forth (i.e., from side-to-side). If the side acceleration trigger threshold value was set at 0.2 g's and there was no hold logic, then due to the measured side acceleration from the side-to-side movement, the control system would be constantly triggered to cause the vehicle suspension damper to switch in and out of the hard mode, as if the vehicle were in fact repeatedly turning. Additionally, if "hold logic" was not available to be programmed, then one would either have to program the trigger logic to have low acceleration trigger threshold values of about 0.2 g's and suffer the system constantly falsely triggering on bumps (due to the side-to-side rocking movement) that it perceives as turns, or set the trigger logic to have high acceleration trigger threshold values of about 0.7 g's and suffer the system not staying in the hard mode through an entire turn.

However, since the side acceleration trigger threshold value is set at 0.7 g's, it is not until the vehicle actually moves into a turn that the vehicle experiences g's above 0.7 g's. If the vehicle's side acceleration value is measured at 0.8 g's, then the control system causes the vehicle suspension to adjust to be in the hard mode. The hold logic ensures that the vehicle suspension damper will remain in the hard mode until the side acceleration g's are measured below the acceleration hold threshold value of 0.2 g·s.

With continued reference to FIGS. 4A and 4B, a third example scenario involves counter steering. For instance, suppose that a driver turns a steering wheel to the left as he heads into a turn. The steering wheel velocity is measured at 25 rad/sec. and the side acceleration g's are measured at 0.6 g's. Since the steering wheel velocity measured at 25 rad/sec. and the side acceleration g's measured at 0.6 g's are above the steering wheel threshold velocity ("threshSteerVelTrigger") of 10 rad./sec. and the side allow acceleration threshold ("threshSideAccelRollAllow") value of −0.1 g's, respectively, the control system causes the vehicle suspension damper to adjust to the firm mode. Next, while the vehicle is still turning to the left and the vehicle is still experiencing a side acceleration of 0.6 g's, the vehicle driver turns the steering wheel to the right with a velocity of 20 rad./sec. in the right direction. However, even though the steering wheel is being turned to the right at the velocity of 20 rad./sec. and above the steering wheel velocity threshold value of 10 rad./sec., the vehicle is still turning to the left and still experiencing side acceleration g's consistent with turning to the left, namely, positive 0.6 g's. This type of steering wheel action is termed "counter steering". In this example, counter steering is counter to that which is expected, such as when a driver turns a steering wheel to the right, it is expected that the resulting side acceleration g's will be directed to the right (negative Y-axis). However, in counter steering, such as in the foregoing example, the resulting side acceleration g's are directed to the left (positive). In this example scenario, since the side acceleration allow threshold value is at −0.1 g's; the measured side acceleration for a right turn must be below—(−0.1) g's (which is equal to +0.1 g's) (according to the "Roll Negative Control Trigger Logic" described above) for the acceleration allow threshold to be accurate. However, since 0.6 is greater than +0.1 g's, the measured side acceleration as compared to the side acceleration allow threshold value denotes that the trigger allow logic is inaccurate. Therefore, even though the steering velocity value of 20 rad./sec. is measured to be above the steering velocity threshold value of 10 rad./sec., based on the determination of inaccurate trigger acceleration allow logic, the control system will cause the vehicle suspension damper to remain in its current firm mode (will not cause the vehicle suspension dampers to adjust to a soft mode). Of note, following is an example which further explains the relationship between the vehicle, the vehicle's driver, the turning of the vehicle and the experienced acceleration during such a vehicle turn. When a vehicle's driver turns the vehicle to the right, the driver feels as if he is being pushed out the left of the vehicle. However, the vehicle is really being pushed to the right and is pushing the driver to the right also; the driver's inertia is resisting this acceleration. Similarly, when a vehicle's driver applies the brakes to the vehicle, the driver feels as if he is being pushed forward.

Pitch Positive Control Mode

Upon exceeding a threshold (defined by the trigger logic below) while the vehicle is experiencing a pitch positive (e.g., dive), the control system 404 causes the variable pressure valve 464 to adjust to achieve a control state in which the pitch positive is reduced or eliminated. Implementation options also available to achieve such a control state are listed below. With regard to the pitch positive controls that define circumstances when the pitch positive control modes are triggered or the control modes are held in place, the following definitions apply:

"ThreshForwardAccelBrakeAllow"—The forward acceleration is required to be below this threshold in order that the brake-on-signal is allowed to trigger the pitch positive control mode. Note that the forward acceleration is negative during braking. Therefore, this control signal is nominally set greater than zero; given that it is used to ensure that the brake signal is not inconsistent with the forward acceleration. This can be used to detect a driver just touching the brake, or possibly driving with the left foot is pressing on the brake while the right foot is pressing on the throttle pedal. This threshold is adjustable and may be tuned for trigger and hold logic (tuned by the end user or hard coded).

"ThreshForwardAccelBrakeTrigger"—The forward acceleration is required to be below this threshold in order that the pitch positive control may be triggered, even without the brake being engaged. This allows the control system 404 to initiate a pitch positive control mode even if the brake is not detected. This threshold is nominally set below 1 g, effectively negating it. This threshold is adjustable and may be tuned for trigger and hold logic (tuned by the end user or hard coded).

2) Pitch Positive Control Mode—Trigger Logic and Hold Logic
  A. Pitch Positive Control—Dive—Trigger Logic
  i. ((brake on) AND
    (forward
      acceleration<threshForwardAccelBrakeAllow)); OR ii. (forward acceleration<threshForwardAccelBrakeTrigger)
B. Pitch Positive Control—Dive—Hold Logic
i. Forward acceleration<threshForwardAccelBrakeHold.
C. Pitch Positive Control Damper Control Settings Available
Option 1: (1) Firm rear rebound left and right.
Option 2: (1) Firm front compression left and right.
Option 3: (1) Firm rear rebound left and right; and (2) Firm front compression left and right.
Option 4: (1) Firm rear rebound left and right; (2) Soft front rebound left and right; and (3) Soft front compression left and right.

Pitch Negative Control Mode

Upon exceeding a threshold (defined by the trigger logic below) while the vehicle is experiencing a pitch negative (e.g., squat), the control system 404 causes the variable pressure valve 464 to adjust to achieve a control state in which the pitch negative is reduced or eliminated. Implementation options also available to achieve such a control state are listed below. With regard to the pitch negative controls defining circumstances when the pitch negative control modes are triggered or the control modes are held in place, the following definitions apply:

"ThreshThrottle"—This is the threshold required for the derivative of the throttle position to be above in order to trigger the pitch negative control mode, subject to the forward acceleration being above threshForwardAccelThrottleAllow. Pressing down on the throttle and giving the engine more gas is defined as positive throttle. The main advantage of triggering on the time derivative of the throttle position as opposed to simply the forward acceleration is that the acceleration signal lags that of the throttle. The derivative of the throttle is used because, in general, the steady state position of the throttle is related to velocity and not to the acceleration of the vehicle. This threshold is adjustable and may be tuned for trigger and hold logic (tuned by the end user or hard coded).

"ThreshForwardAccelThrottleAllow"—This is the threshold required for forward acceleration to be above in order to allow the derivative of the throttle position signal to trigger pitch negative control. This is used to ensure that the derivative of the throttle position is not inconsistent with the forward acceleration. This can be used to detect when one is driving with the left foot on the brake and the right foot is on the throttle. This threshold value is nominally set below 0 g. This threshold is adjustable and may be tuned for trigger and hold logic (tuned by the end user or hard coded).

"ThreshForwardAccelThrottleTrigger"—This is the threshold required for forward acceleration to be above in order to trigger negative pitch control, even without the changes in the throttle position. This allows the system to initiate negative pitch control even if the throttle is not being pressed. This threshold value is nominally set above 1 g, effectively negating it. This threshold is adjustable and may be tuned for trigger and hold logic (tuned by the end user or hard coded).

"ThreshForwardAccelThrottleHold"—Forward acceleration is required to be above this threshold value in order for the negative pitch control mode to remain in place after its trigger logic has already been triggered. This is necessary given that the derivative of the throttle is used, and there can be relatively long delays in engine response and this signal. This threshold is adjustable and may be tuned for trigger and hold logic (tuned by the end user or hard coded).

3) Pitch Negative Control Mode—Trigger Logic and Hold Logic
A. Pitch Negative Control—Squat—Trigger Logic
i. ((throttle pedal velocity>threshThrottle) AND (forward acceleration>threshForwardAccelThrottleAllow));
OR
ii. (forward acceleration>threshForwardAccelThrottleTrigger)
B. Pitch Negative Control—Squat—Hold Logic
i. Forward acceleration>threshForwardAccelThrottleHold
C. Pitch Negative Control Damper—Squat—Control Settings Available
Option 1: (1) Firm front rebound left and right.
Option 2: (1) Firm rear compression left and right.
Option 3: (1) Firm front rebound left and right; and (2) Firm rear compression left and right.
Option 104: (1) Firm front rebound left and right; (2) Soft rear rebound left and right; and (3) Soft rear compression left and right.

4) Zero Gravity Control Mode

In one embodiment, a zero gravity control mode is attained, at which vehicle suspension dampers that were operating in a "soft" mode, upon a detection of a zero gravity situation, are made to operate in the "firm" mode. For example, a vehicle that is operating in a "soft" mode is traveling in a straight line along a path that initially contains small bumps, but graduates into large rollers. The vehicle initially is placed in the "soft" mode in order to mitigate and/or nullify the effect (upon the vehicle rider) of the vehicle traveling over small bumps along the pathway. At a particular velocity, when the vehicle then moves up one side and over the top of the large roller, on the way down to the bottom of the other side of the roller, the vehicle experiences a free fall.

The vehicle is considered to be in freefall when the resultant magnitude of the X, Y, and Z accelerations is less than a predetermined threshold. The end of the freefall condition will be when the resultant acceleration has exceeded the threshold for a pre-determined amount of time. For example, suppose the pre-determined freefall acceleration threshold is 0.4 g, the calculated resultant acceleration has a magnitude of 0.3 g, and the end-of-freefall timer is 1 second. Since the resultant acceleration is less than the threshold, this is a freefall condition, and the vehicle dampers will be set to the "firm" state. The vehicle will revert to the "soft" state 1 second after the resultant acceleration exceeds 0.4 g.

In explanation of the above described zero gravity control mode example, the following description is proffered. The resultant acceleration is taken by squaring the acceleration at each axis, adding them together, and then taking the square root (the equation is: $\sqrt{(x^2+y^2+z^2)}$). The resultant acceleration is always positive. This equation gives just the magnitude of the resultant acceleration, and does not give information regarding the direction of the resultant acceleration.

1) Take the following example scenarios to illustrate the above concept: Vehicle sitting flat on level ground: X,Y,Z accelerations are 0 g, 0 g, 1.0 g. Resultant acceleration is 1.0 g.
2) Vehicle sitting upside down on flat level ground: X,Y,Z accelerations are 0 g, 0 g, −1.0 g. Resultant acceleration is 1.0 g.

3) Vehicle sitting on flat ground, but on a slope of 'n' degrees: X,Y,Z accelerations are 0 g sin(n)g, cos(n)g. Resultant acceleration is 1 g due to trig identity: $\sin^2(x)+\cos^2(x)=1.0$ 4) Vehicle on flat ground, accelerating forward at 0.5 g: X,Y,Z accelerations are 0 g, 0.5 g, 1.0 g. Resultant acceleration is 1.12 g 5) Vehicle on flat ground, driving at constant velocity, but turning so lateral acceleration of 0.5 g: X,Y,Z are seen, and accelerations are 0.5 g, 0 g, 1 g. Resultant acceleration is 1.12 g.

In the first three examples above, the vehicle is in completely different orientations, but the resultant is the same. Likewise, in the last two examples, the components are different, but the resultant is the same. Thus, only the magnitude is calculated (the direction of the resultant acceleration does not matter for the purposes of detecting a freefall condition).

Additionally, as long as the vehicle is touching the ground, the accelerometer will always measure the 1 g acceleration due to gravity. This could be measured all in one axis, or distributed across all three axis. But when the vehicle is not moving, the resultant will always be 1 g as long as the vehicle is on the ground. When the vehicle comes off the ground (like when going off a jump), the 1 g acceleration due to gravity goes away, and the resultant acceleration is 0 g. The only way to have a resultant acceleration of less than 1 g is to go into a freefall.

The freefall mode isn't triggered either when the resultant equals 0 g, or when the resultant is less than 1.0 g. This is due to at least the following four circumstances that occur when measuring actual motion, rather than doing paper calculations:

1) The vehicle's engine causes high-frequency vibrations of a fairly high magnitude. Measurements may be as high as 2.0 g and as low as 0 g (so noise of +/−1.0 g of the actual value). Since the vibrations of the engine are generally going to be fairly high (at least 30 Hz with the engine at 2000 RPM) and the actual motion of the vehicle fairly low (usually 1-2 Hz), a low-pass filter may be used to ignore the vibrations from the engine such that only the acceleration of the vehicle is seen. Since filtering the acceleration takes some time, if the threshold is set at 0 g, a freefall scenario may not be noticed in time for a proper response, or the freefall scenario may be completely missed.

2) An accelerometer chip is built, there will always be some internal stresses that make it output a non-zero value even when it should. This means that the minimum acceleration the accelerometer might output is 0.05 g. This could be calibrated out, but to avoid a complicated calibration routine, a non-zero threshold is selected for implementation.

3) Due to the same stresses mentioned in number "2" above, the output when sitting on the ground might be 0.95 g rather than 1.0 g. So, to be effective, a threshold between 0 g and 1.0 g is needed.

4) Since an accelerometer cannot easily be placed at the vehicle's center of mass, the acceleration is measured when the vehicle rotates in the air. Thus, a truly 0 g situation is never seen.

As stated herein, FIG. 4A is a block diagram that includes the control system 404, in accordance with an embodiment. Embodiments of the control system 404 of FIG. 4A further include: a hold-off timer 426; a tracker 430; a hold logic delayer 432; a rebound settle timer 428; a weighting applicator 434; and a signal filter 436.

The hold-off timer 426 may be used when the vehicle suspension damper 402 is in any of the roll and pitch positive and negative control modes. The hold-off timer 426 enables a time to be set between the time that a first trigger logic is passed and the time that a second trigger logic is allowed to be passed. The implementation of the hold-off timer 426 limits the amount of cycling the vehicle suspension damper 402 will experience between passive damper settings. ("Cycling" refers to the vehicle suspension damper rapidly cycling between the soft and damper firm settings of the dampers. This may or may not be a significant problem for the rider of vehicle performance. Cycling is more wearing on the solenoids and power circuitry of the vehicle suspension damper. If the transients are much faster than the time constants of the vehicle dynamics, then the rider should not directly notice the effects of cycling.) To this end, the control system 404 further optionally includes, in one embodiment, a tracker 430 for tracking the times at which a trigger logic is passed. For example, the tracker 430 tracks the time at which the trigger logic is passed and the hold-off timer 426 is configured to disallow another pass until a minimum hold-off time is reached. If the trigger logic goes false before the hold-off time is reached, the trigger will not pass, and the hold-off timer 426 is not reset. There is only a hold-off timer 426 for going into the damper firm setting, and not coming out of it. This still limits cycling, without increasing the system minimum reaction response time to short stimulus.

In one embodiment, the hold logic delayer 432 is programmed to provide a delay that gives time for the hold logic to become true after the trigger logic goes true. However, this has the disadvantage of increasing the minimum reaction response time of the vehicle suspension damper to even short stimulus (e.g., cycling). An example of where this delay may be useful is if the steering wheel is turned so fast that the side acceleration signals do not build up before the steering velocity signal drops back off again. Theoretically, the side accelerations values should present themselves to the control system as the wheels turn, but this is not necessarily true. For example, there are situations in which the front tires are not getting great traction at an exact moment. Another example in which this delay may be useful is when the gas pedal is slammed down faster than the engine has time to respond.

In one embodiment, the rebound settle timer 428 establishes a period of time for the vehicle suspension to settle down before the compression is set firmed. This is a method for controlling the height of the vehicle's center of gravity in firm mode. This method can be reversed through user settings so that the vehicle has increased clearance.

In one embodiment, the weightings applicator 434 resolves the situation in which different system control modes make conflicting requests to the same vehicle suspension damper. The weightings applicator 434 provides weightings associated with each control mode for each of the vehicle suspension dampers that system control mode can affect. Then the weightings applicator 434 implements the request with the highest weighting.

In one embodiment, the signal filter 436 filters the control signals that are accessed by the control system 404. In one embodiment, the control system 404 includes the signal filter 436. In another embodiment, the signal filter 436 is external to the control system 404. The signal filter 436 reduces signal noise levels and helps filter extremely transient signals or glitches. The signal filter 436, in one embodiment, also adds signal latency, which can have various effects on the control system 404 and hence the vehicle suspension damper 402, including reducing the need for system delays and dampers.

Figure 4C:
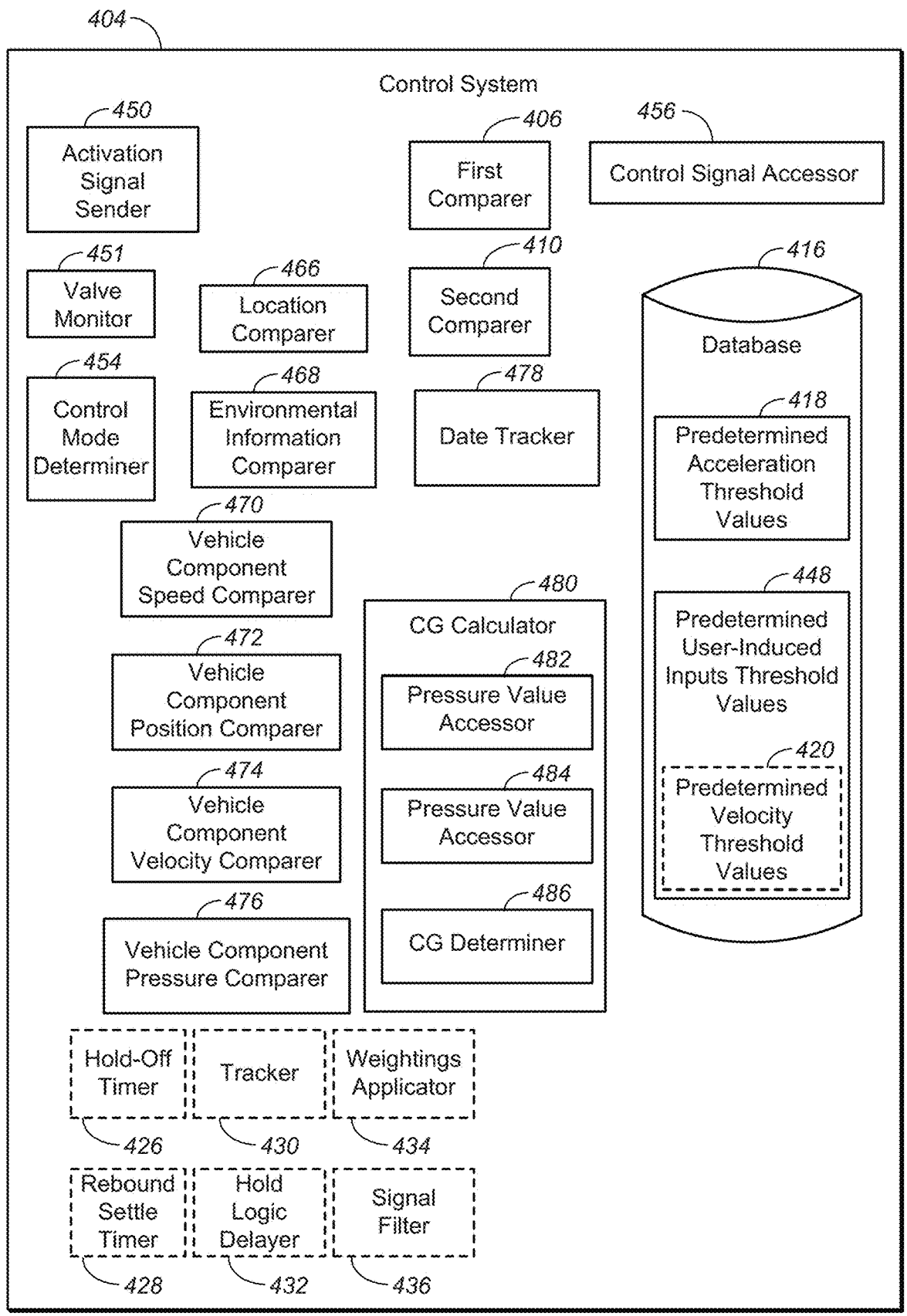
FIG. 4C is a block diagram of the control system 404 of FIG. 4A, in accordance with an embodiment.

With reference now to FIG. 4C, in various embodiments, in addition to that which the control system 404 is described to include, the control system 404 further optionally includes any of the following (each of which will be described below): a location comparer 466; an environmental information comparer 468; a vehicle component speed comparer 470; a vehicle component position comparer 472; a vehicle component velocity comparer 474; a vehicle component pressure comparer 476; a date tracker 478; and a center of gravity (CG) calculator 480. Further, the CG calculator 480 includes the following: a pressure value accessor 482; a pressure value comparer 484; and a CG determiner 486.

Figure 4D:
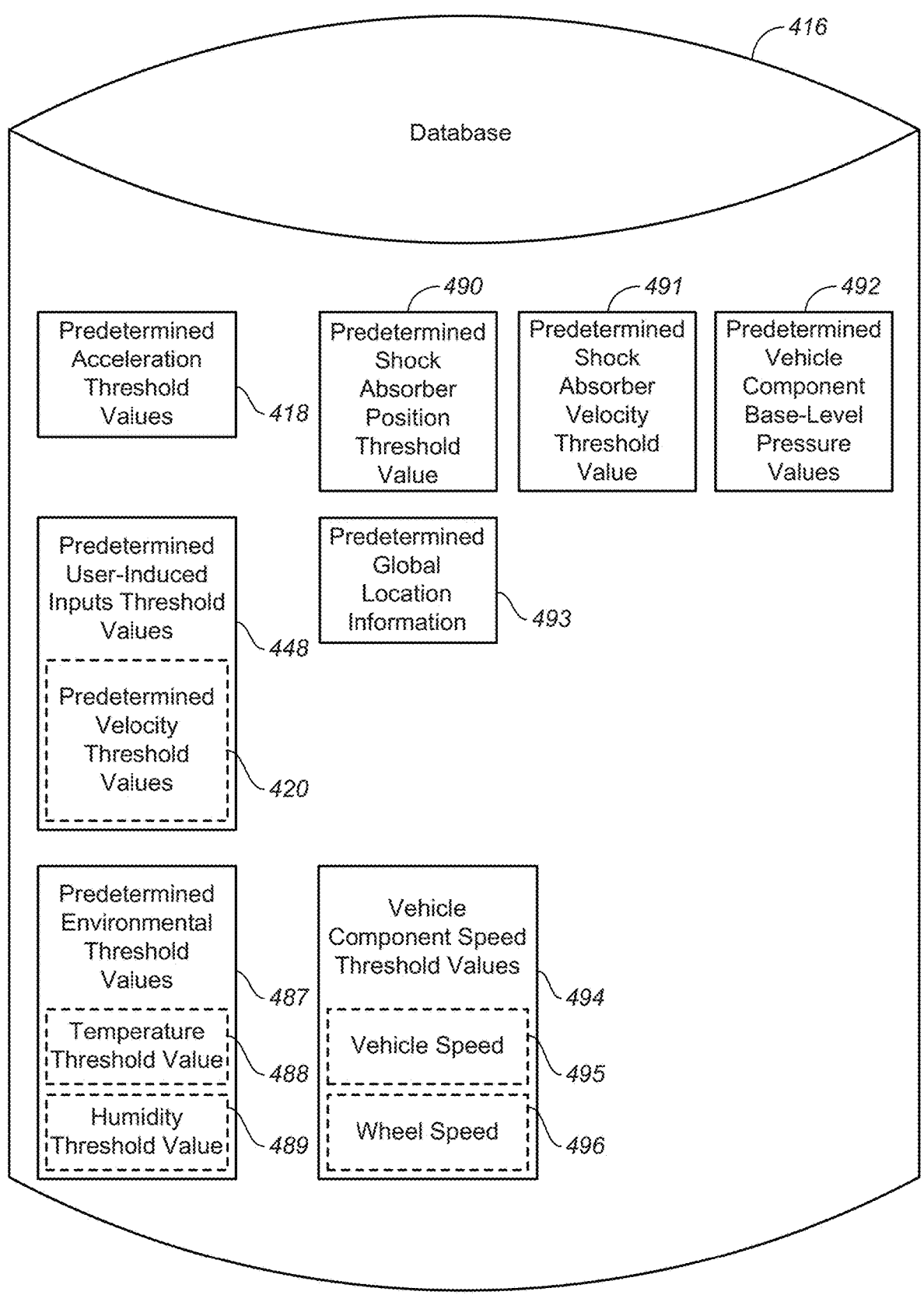
FIG. 4D is a block diagram of the database 416 of FIG. 4A, in accordance with an embodiment.

With reference to FIG. 4D, in various embodiments, in addition to that which the database 416 is described to includes, the database 416 further optionally includes any of the following (each of which will be described below): predetermined global location information 493; predetermined environmental threshold values 487 which include predetermined environmental temperature threshold values 488 and predetermined humidity threshold values 489; predetermined vehicle component speed threshold values 494 which include predetermined vehicle speed threshold values 495 and predetermined wheel speed threshold values 496; predetermined shock absorber position threshold values 490; predetermined shock absorber velocity threshold values 491; and predetermined vehicle component base-level pressure values 492.

With reference to FIGS. 4A-4D, the following components are described. The location comparer 466, in one embodiment, is configured to compare a vehicle global position (that was determined by a GPS sensor attached to a vehicle) with predetermined global location information 493.

The environmental information comparer 468, in one embodiment, is configured to compare environment information (that was determined by temperature sensors and humidity sensors) with predetermined environmental threshold values 487 (and more particularly, in one embodiment, predetermined temperature threshold values 488 and predetermined humidity threshold values 489).

The vehicle component speed comparer 470, in one embodiment, is configured to compare the speed of a component of a vehicle (that a vehicle speed sensor measured) with the predetermined vehicle component speed threshold values 494 (and more particularly, in one embodiment, the predetermined vehicle [the entire vehicle being a component onto itself] speed threshold values 495 and the wheel speed threshold values 496).

The vehicle component position comparer 472, in one embodiment, is configured to compare the position of a component of a vehicle (that a vehicle position sensor measured) with the predetermined shock absorber position threshold values 490.

The vehicle component velocity comparer 474, in one embodiment, is configured to compare the velocity of a component of a vehicle (that a vehicle velocity sensor measured) with the predetermined shock absorber velocity threshold values 490.

The vehicle component velocity comparer 474, in one embodiment, is configured to compare the pressure applied to a component of a vehicle (that a pressure sensor measured) with the predetermined vehicle component base level pressure values 492.

Example Methods for Controlling Vehicle Motion in Vehicles (e.g., Side-by-Side) with More than Two Wheels Utilizing a Variable Pressure Valve of an Electronic Valve and Novel Control System With reference to FIGS. 4A-4D, 10A-16B and 18A-18R, the flow diagrams thereof illustrate example methods 500, 600, 800, 1000, 1050, 1000, 1050, 1200, 1250, 1300, 1350, 1400, 1450, 1500, 1550, 1600 and 1650 used by various embodiments. The flow diagrams include methods 500, 600, 800, 1000, 1050, 1000, 1050, 1200, 1250, 1300, 1350, 1400, 1450, 1500, 1550, 1600 and 1650 and operations thereof that, in various embodiments, are carried out by one or more processors (e.g., processor(s) 306A-306C of FIG. 3) under the control of computer-readable and computer-executable instructions. It is appreciated that in some embodiments, the one or more processors may be in physically separate locations or electronic devices/computing systems. The computer-readable and computer-executable instructions reside, for example, in tangible data storage features such as volatile memory, non-volatile memory, and/or a data storage unit (see e.g., 308, 310, 312 of FIG. 3). The computer-readable and computer-executable instructions can also reside on any tangible computer-readable media such as a hard disk drive, floppy disk, magnetic tape, Compact Disc, Digital versatile Disc, and the like. In some embodiments, the computer-readable storage media is non-transitory. The computer-readable and computer-executable instructions, which may reside on computer-readable storage media, are used to control or operate in conjunction with, for example, one or more components of a control system 404, a user's electronic computing device or user interface thereof, and/or one or more of processors 306. When executed by one or more computer systems or portion(s) thereof, such as a processor, the computer-readable instructions cause the computer system(s) to perform operations described by the methods 500, 600, 800, 1000, 1050, 1000, 1050, 1200, 1250, 1300, 1350, 1400, 1450, 1500, 1550, 1600 and 1650 of the flow diagrams.

Although specific operations are disclosed in methods 500, 600, 800, 1000, 1050, 1000, 1050, 1200, 1250, 1300, 1350, 1400, 1450, 1500, 1550, 1600 and 1650 of the flow diagrams, such operations are examples. That is, embodiments are well suited to performing various other operations or variations of the operations recited in the processes of flow diagrams. Likewise, in some embodiments, the operations of the methods 500, 600, 800, 1000, 1050, 1000, 1050, 1200, 1250, 1300, 1350, 1400, 1450, 1500, 1550, 1600 and 1650 in the flow diagrams may be performed in an order different than presented, not all of the operations described in one or more of these flow diagrams may be performed, and/or more additional operations may be added. It is further appreciated that steps described in the 500, 600, 800, 1000, 1050, 1000, 1050, 1200, 1250, 1300, 1350, 1400, 1450, 1500, 1550, 1600 and 1650 may be implemented in hardware, or a combination of hardware with firmware and/or software.

Figure 5:
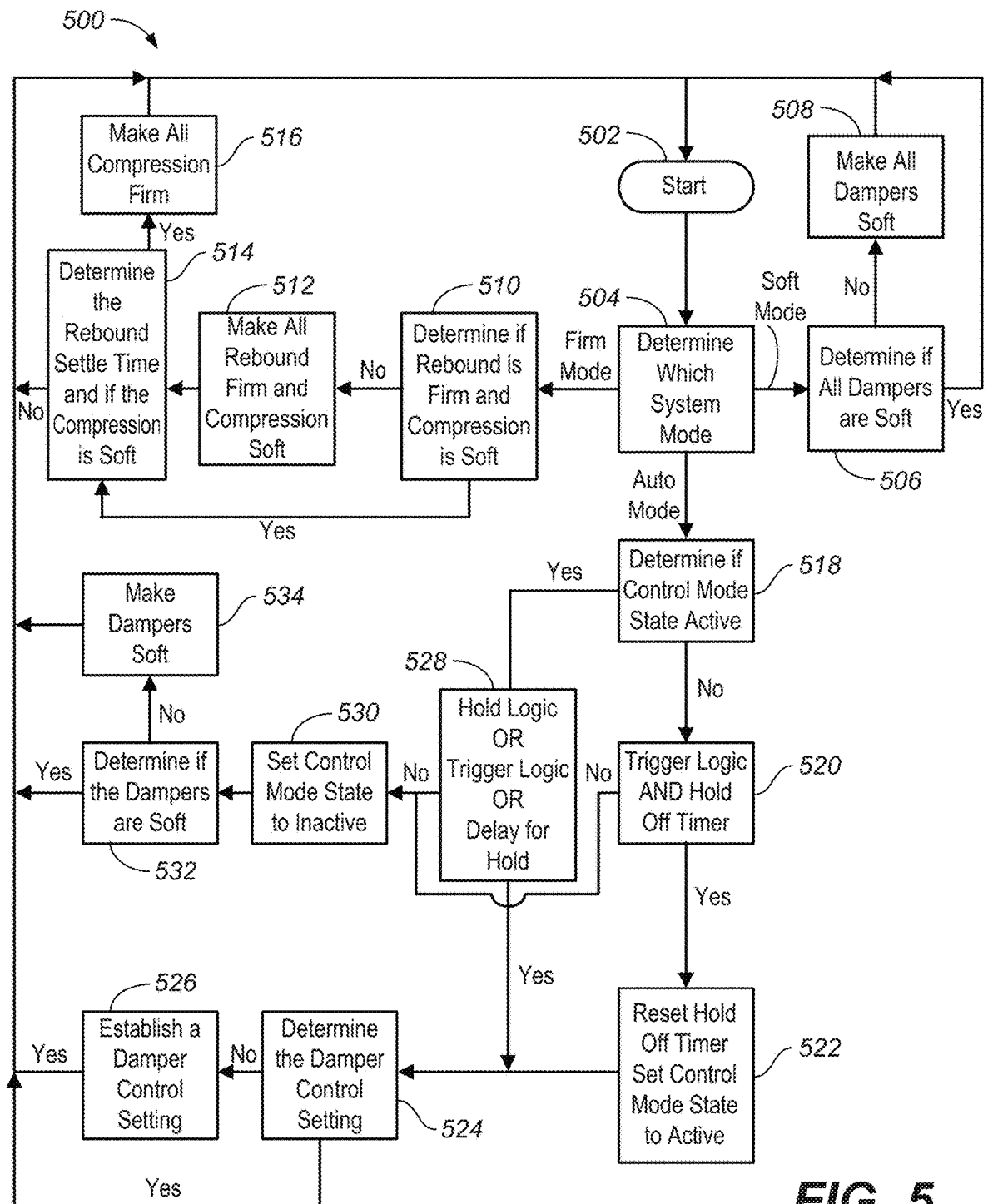
FIG. 5 is a flow diagram of a method 500 for controlling vehicle motion, in accordance with an embodiment.
Figure 6:
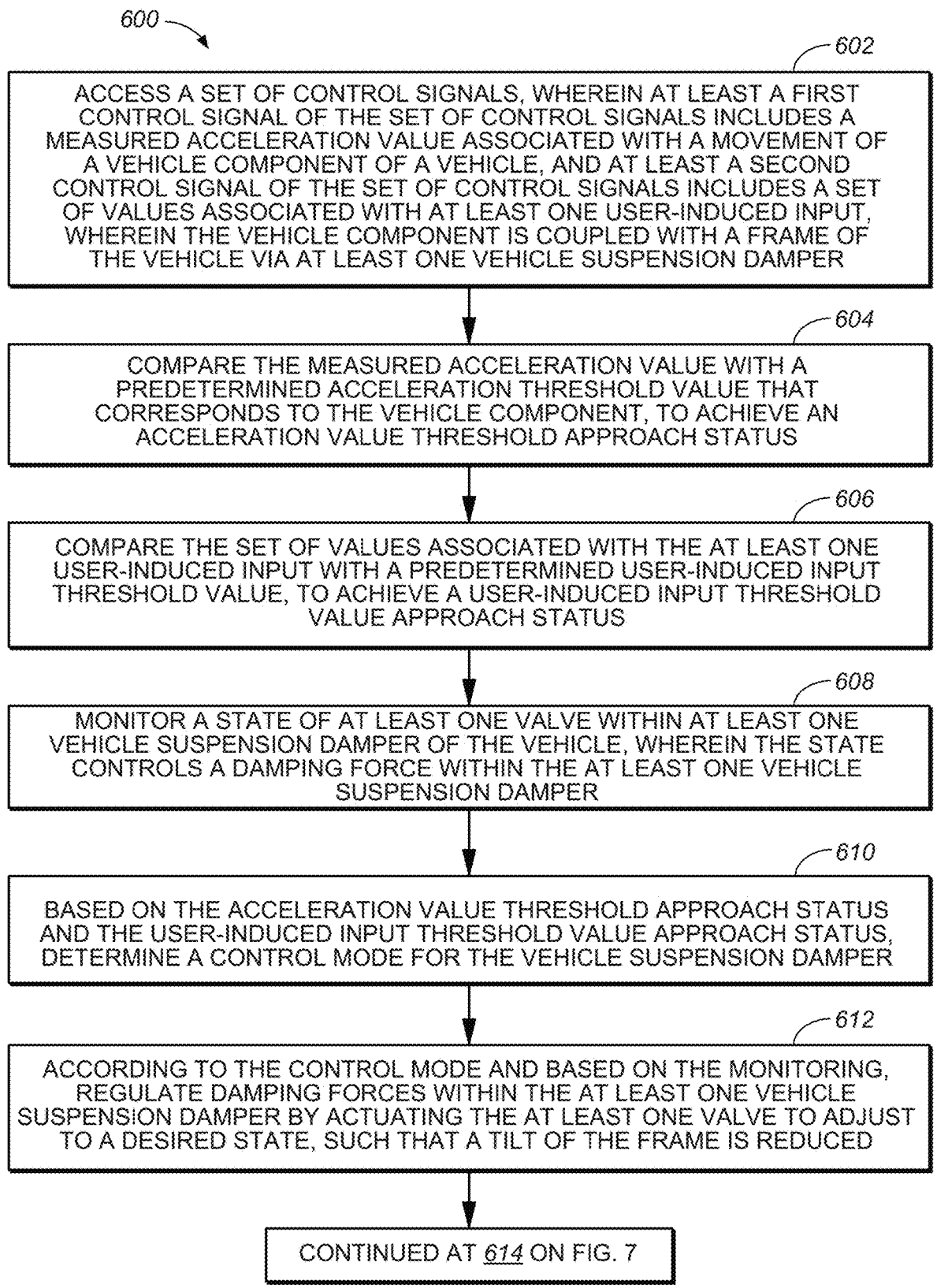
FIG. 6, followed by FIG. 7, is a flow diagram of a method 600 for controlling vehicle motion, in accordance with embodiments.
Figure 7:
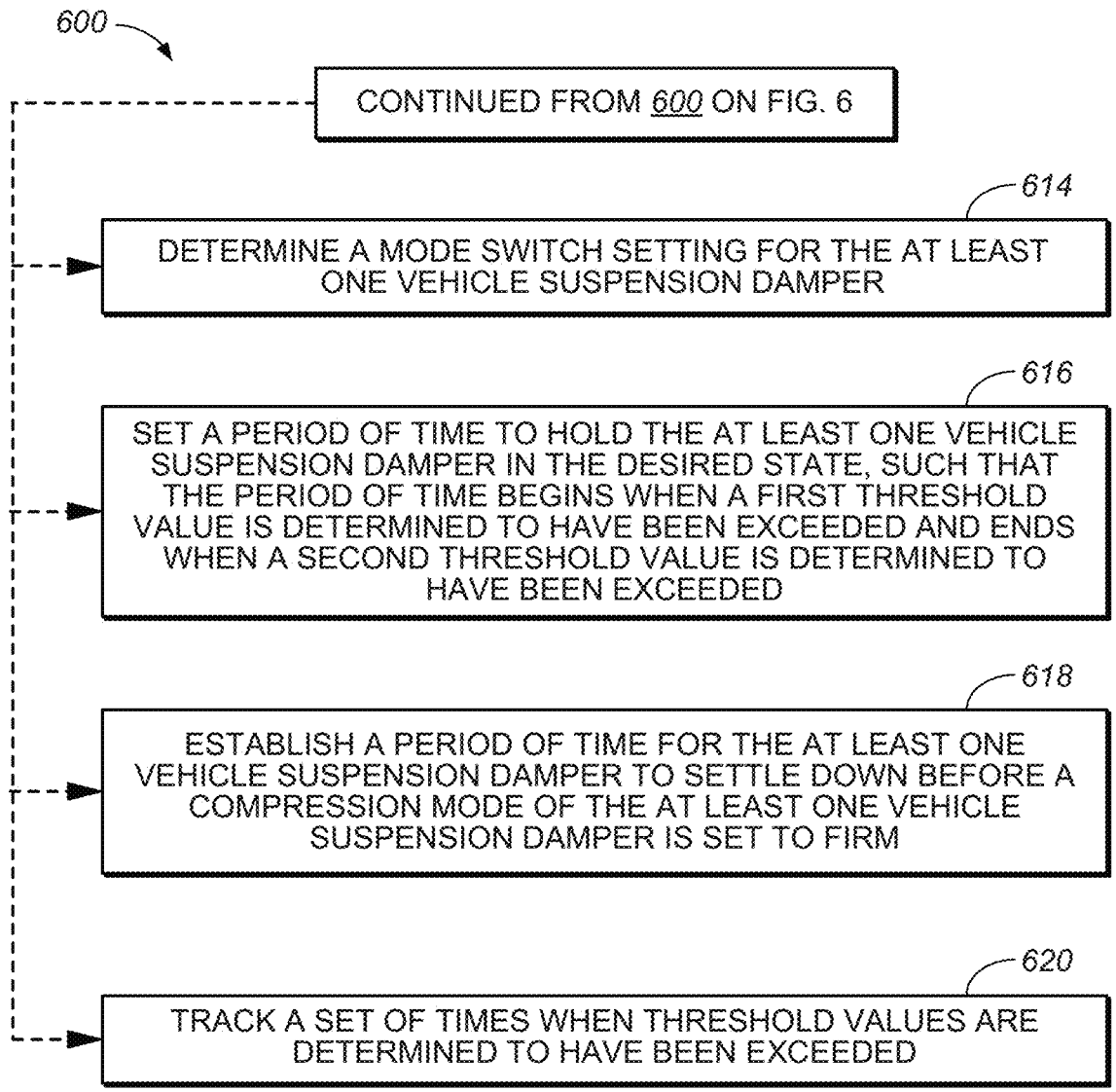

The following is a discussion of FIGS. 5-8, 10A-16B, flow diagrams for methods 500, 600, 800, 1000, 1050, 1000, 1050, 1200, 1250, 1300, 1350, 1400, 1450, 1500, 1550, 1600 and 1650 for controlling vehicle motion, in accordance with embodiments, and relating to side-by-side roll and/or pitch control. FIG. 5 describes a method 500 of an operation of control system 404 detecting and responding to a detection of roll and/or pitch of a vehicle component. FIGS. 6 and 7 follow with a description of a method 600 of controlling vehicle motion, wherein both translational acceleration (roll/ pitch) and user-induced inputs are taken into consideration when determining a response to sensed acceleration.

Reference will be made to elements of FIGS. 1A-2C and 4A-4D to facilitate the explanation of the operations of the methods of flow diagrams 500, 600, 800, 1000, 1050, 1000, 1050, 1200, 1250, 1300, 1350, 1400, 1450, 1500, 1550, 1600 and 1650. In some embodiments, the methods 500, 600, 800, 1000, 1050, 1000, 1050, 1200, 1250, 1300, 1350, 1400, 1450, 1500, 1550, 1600 and 1650 of the flow diagrams describe a use of or instructions for operation of control system 404. With regard to FIGS. 5-8, it should be appreciated that the method described herein may be performed by the electronic valve 460 that includes the variable pressure valve 462, instead of the pilot valve assembly 132 shown in FIGS. 1 and 2A-2C.

With reference now FIG. 5, the method 500 starts at operation 502. The method 500 moves to operation 504.

At operation 504, in one embodiment, the control system 404 determines under which system mode the vehicle suspension damper is operating, the soft mode, the firm mode or the auto mode. It should be appreciated that the system mode, in one embodiment, is selected by a user of the vehicle suspension damper. In another embodiment, the system mode is preprogrammed to default to a particular mode, unless overridden by a user.

If the control system 404 determines that the vehicle suspension damper is operating under the soft mode, then the method 500 moves to operation 506. At operation 506, in one embodiment, the control system 404 determines if all the vehicle suspension dampers on the vehicle are in the soft mode. If the control system 404 determines that all of the vehicle suspension dampers are in the soft mode, then the method 500 returns to start 502. If the control system 404 determines that all of the vehicle suspension dampers are not in the soft mode, then the method 500 moves to operation 508.

At operation 508, in one embodiment, the control system 404 causes any vehicle suspension damper that is not in the soft mode to adjust to become in the soft mode. After all vehicle suspension dampers are found to be in the soft mode according to the system setting, then the method 500 returns to start 502.

At operation 504, in one embodiment, if the control system 404 determines that the vehicle suspension damper is operating in the firm mode, then the method 500 moves to operation 510. At operation 510, in one embodiment, the control system 404 determines if the rebound is firm and the compression is soft. If the control system 404 determines that the rebound of the vehicle suspension damper is firm and the compression of the vehicle suspension dampers is soft, then the method 500 moves to operation 514.

At operation 514, in one embodiment, if the control system 404 determines that the rebound of the vehicle suspension dampers is not firm OR the compression of the vehicle suspension dampers is not soft, then the method 500 moves to operation 512. At operation 512, in one embodiment, the control system 404 causes all rebound of the vehicle suspension dampers to become firm and all compression of the vehicle suspension dampers to become soft. The method 500 then moves to operation 514.

At operation 514, in one embodiment, the control system 404 determines if there is a rebound settle time remaining and if the compression of the vehicle suspension dampers is still soft. If the control system 404 determines that there is rebound settle time remaining and the compression of the vehicle dampers is soft, then the method 500 moves to operation 516. At operation 516, in one embodiment, the control system 404 causes all of the compression in the vehicle suspension dampers to be firm. The method 500 then returns to the start 502.

At operation 514, in one embodiment, if the control system 404 determines that there is no rebound settle time remaining and the compression of the vehicle suspension dampers is soft, then the method 500 moves to start 502.

At operation 504, in one embodiment, if the control system 404 determines that the vehicle suspension damper 402 is operating in the auto mode, then the method 500 moves to operation 518. At operation 518, in one embodiment, the control system 404 determines if the control mode state is active. If the control system 404 determines that the control mode state is not active, then the method 500 moves to operation 520. At operation 520, in one embodiment, the control system 404 determines whether a trigger logic is passed AND if a time applied by a hold-off timer 426 is in place. If the control system 404 determines both conditions have occurred, then the method 500 moves to operation 522. At operation 522, the control system 404 resets the hold-off time and sets the control mode state to active.

At operation 520, in one embodiment, if the control system 404 determines that either a trigger logic has not passed OR a time has not been applied by the hold-off timer 426, then the method 500 moves to operation 530. At operation 530, in one embodiment, the control system 404 sets the control mode state to inactive. The method 500 then moves to operation 532.

At operation 518, in one embodiment, if the control system 404 determines that the control mode state is active, then the method 500 moves to operation 528. At operation 528, in one embodiment, the control system 404 determines if the hold logic has passed OR if the trigger logic is passed OR if the delay for hold has passed.

At operation 528, in one embodiment, if the control system 404 determines that either a hold logic has passed OR a trigger logic has passed OR a delay for hold has passed, then the method 500 moves to operation 524. At operation 524, in one embodiment, the control system 404 determines under what damping control setting the vehicle suspension damper 402 is operating.

At operation 524, in one embodiment, if the control system 404 determines that the vehicle suspension damper 402 is operating under a particular damper control setting, then the method 500 returns to the start 502. At operation 524, in one embodiment, if the control system 404 determines that the vehicle suspension damper 402 is operating under a different damper control setting then desired, the control system 404 adjusts the vehicle suspension damper 402 so that it operates under the desired damper control setting. The method 500 then returns to start 502.

At operation 528, in one embodiment, if the control system 404 determines that either a hold logic has not passed OR a trigger logic has not passed OR a delay for hold has not passed, then the method 500 moves to operation 530. At operation 530, in one embodiment, the control system 404 sets the control mode state to inactive. Then, the method 500 moves to operation 532. At operation 532, in one embodiment, the control system 404 determines if the vehicle suspension dampers are soft.

At operation 532, in one embodiment, if the control system 404 determines that the vehicle suspension dampers are soft, then the method 500 returns to the start 502. At operation 532, in one embodiment, if the control system 404 determines that the vehicle suspension dampers are not soft, then the method 500 moves to operation 534.

At operation 534, in one embodiment, the control system 404 functions, as described herein, to cause the vehicle suspension dampers to become soft. The method 500 then returns to the start 502.

Of note, the checks for whether or not a vehicle suspension damper is already set according to the method 500 need to be done individually for each vehicle suspension damper.

FIGS. 6 and 7 is a flow diagram of a method 600 for controlling vehicle motion, in accordance with embodiments. The method 600, in embodiments, may be performed using the pilot valve assembly 132 or the novel electronic valve 460 that includes the variable pressure valve 462.

With reference to FIGS. 4A-4D, 6 and 7, at operation 602 of method 600, in one embodiment, a set of control signals are accessed, wherein at least a first control signal of the set of control signals includes a measured acceleration value associated with a movement of a vehicle component of a vehicle, and at least a second control signal of the set of control signals comprises a set of values associated with user-induced inputs, wherein the vehicle component is coupled with a frame of the vehicle via at least one vehicle suspension damper.

At operation 604 of method 600, in one embodiment and as described herein, the measured acceleration value is compared with a predetermined acceleration threshold value that corresponds to the vehicle component to achieve an acceleration value threshold approach status. In various embodiments, the predetermined acceleration threshold values are located at the database 416 and include the trigger logic, the hold logic, and the damper control setting options described herein. The control system 404 compares the measured acceleration values with the acceleration threshold values expressed in the trigger logic and hold logic. The comparing, at operation 604, includes determining if the measured acceleration values do or do not exceed the predetermined acceleration threshold values corresponding to the relevant vehicle component. Further, the control system 404 will pass into the appropriate control mode based on the comparisons made at operation 604 and 606.

For example, and with reference to the trigger logic #1(A)(i) above relating to the "Roll Positive Control". If it is found that ((steer velocity>threshSteerVelTrigger) AND (side acceleration>threshSideAccelRollAllow)) is a true statement, OR (side acceleration>threshSideAccelRollTrigger) is a true statement, then the vehicle suspension damper, and the control system 404 operating thereon, switches/passes into the roll positive control mode. Upon passing into the roll positive control mode, the control system 404 selects which option to implement on the vehicle suspension dampers (e.g., setting individual dampers to firm or soft, etc.) of the options available and described herein for the Roll Positive Control Mode. It should be appreciated that the control system 404 is preprogrammed to select a particular control mode implementation option. These implementation decisions may be factory settings or individually customized by the rider/user. Additionally, it should also be appreciated that in one embodiment, the rider may override the control system 404's selection.

At operation 606 of method 600, in one embodiment and as described herein, the set of values associated with the user-induced inputs (already described herein) are compared to predetermined user-induced inputs threshold values to achieve a user-induced input threshold value approach status. In various embodiments, the predetermined user-induced inputs threshold values are located at the database 416. Further, in various embodiments, the database 416 includes at least one of, optionally the following which is described herein: the trigger logic; the hold logic; and the damper control setting options. The comparing, at operation 606 includes determining if the measured user-induced inputs (represented as values) does or does not exceed the user-induced inputs threshold values corresponding to the relevant vehicle component. Further, the control system 404 will pass into the appropriate control mode based on the comparisons made at operation 604 and 606.

At operation 608 of method 600, in one embodiment and as described herein, a state of at least one valve within at least one vehicle suspension damper of the vehicle is monitored, wherein the state controls a damping force within the at least one vehicle suspension damper.

At operation 610 of method 600, in one embodiment and as described herein, based on the acceleration value threshold approach status and the user-induced input threshold value approach status, determining a control mode for the vehicle suspension damper.

At operation 612 of method 600, in one embodiment and as described herein, according to the control mode and based on the monitoring, damping forces are regulated within the at least one vehicle suspension damper by actuating the at least one valve to adjust to a desired state, such that a tilt of the vehicle's frame is reduced.

At operation 614 of method 600, in one embodiment and as described herein, before the regulating at operation 610, a mode switch setting for the at least one vehicle suspension damper is determined.

At operation 616 of method 600, in one embodiment and as described herein, a period of time to hold the at least one vehicle suspension damper in the desired state is set, such that the period of time begins when a first threshold value is determined to have been exceeded and ends when a second threshold value is determined to have been exceeded.

At operation 618 of method 600, in one embodiment and as described herein, a period of time for the at least one vehicle suspension damper to settle down before a compression mode of the at least one vehicle suspension damper is set to firm is established.

At operation 620 of method 600, in one embodiment and as described herein, a set of times when threshold values are determined to have been exceeded is tracked.

Figure 8:
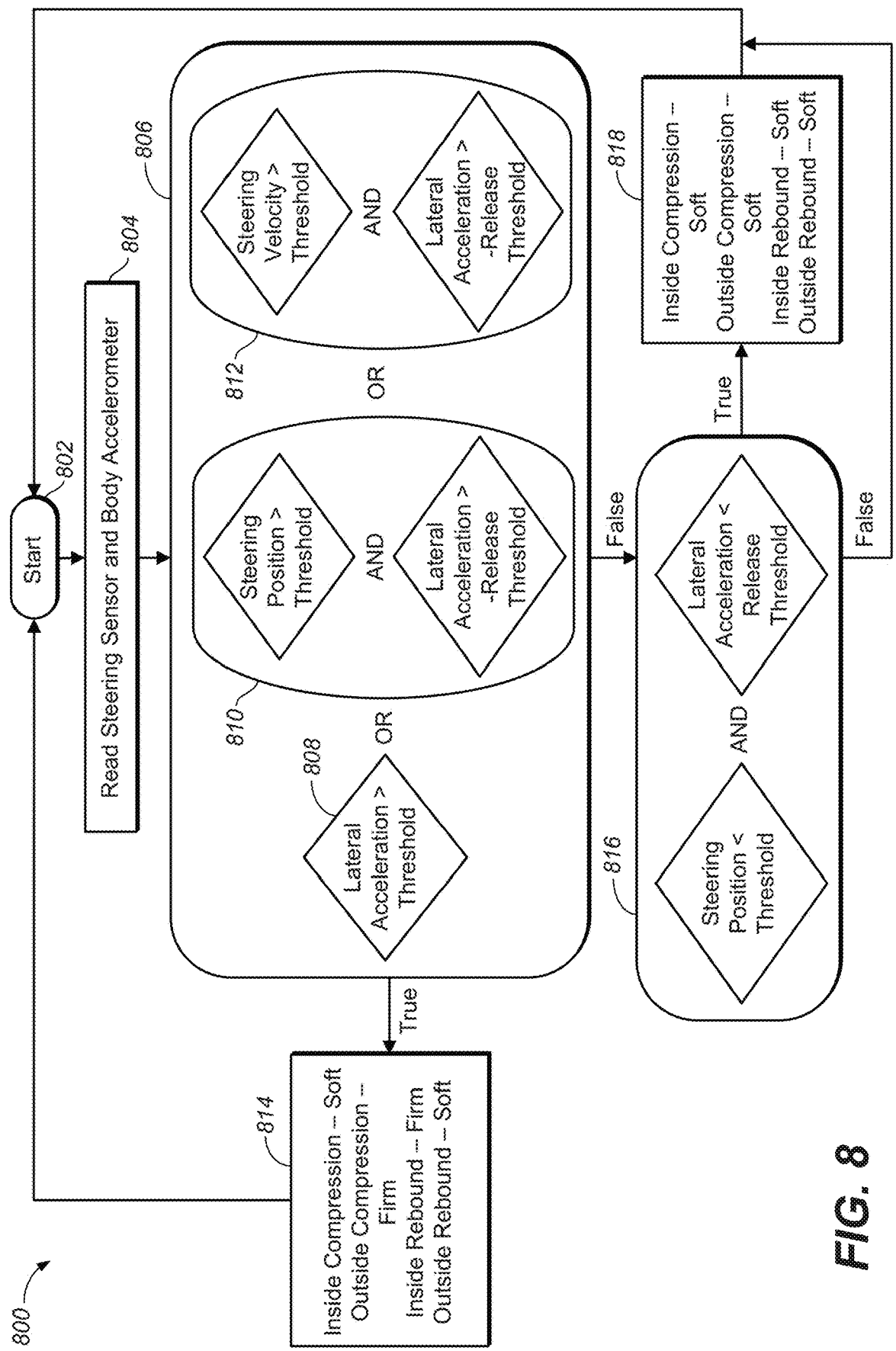
FIG. 8 shows a method for controlling vehicle motion, in accordance with an embodiment.

Of note with regard to method 600, the acceleration values that are measured may include lateral acceleration of the vehicle as is described with respect to method 800 of FIG. 8. Further, the user-induced inputs that are measured may include the velocity with which a steering wheel is being turned and the absolute value of the difference between the steering wheel's initial position before it was turned and its final position after it was turned, as is described with respect to method 800 of FIG. 8.

FIG. 8 is a flow diagram of a method 800 for controlling vehicle motion, in accordance with an embodiment. The method 800 starts at operation 802. The method 800 moves from operation 802 to operation 804.

At operation 804, in one embodiment, the control system 404 receives signals from at least one sensor of the set of sensors 440 that gives information regarding a particular vehicle component. For example, a steering wheel sensor and an accelerometer send signals 442 to the control system 404 regarding the velocity and position of the steering wheel having been turned, and the acceleration that the vehicle is experiencing. The control signal accessor 456 of the control system 404 accessing these signals 442. The first comparer 406 compares the measured acceleration of the vehicle with the predetermined acceleration threshold value 418. The second comparer 410 compares the measured steering wheel velocity and position to the predetermined user-induced inputs threshold values 448. The control mode determiner 454 determines if any of the following scenarios at step 806 are met: 1) at 808, the measured lateral acceleration of the vehicle is greater than the predetermine acceleration threshold value; 2) at 810, the measured steering position is greater than the predetermined user-induced input threshold value for that steering wheel position AND the measured lateral acceleration of the vehicle is greater than the predetermined acceleration release threshold value; and 3) at 812, the measured steering velocity is greater than the predetermined user-induced input threshold value for that steering wheel velocity AND the measured lateral acceleration of the vehicle is greater than the predetermined acceleration release threshold value.

If any of the foregoing three conditions are found to be met, then the control system 404 allows a control mode to be activated. The control mode to be activated is determined by the control mode determiner 454. In this situation, the control mode includes: the inside compression to be "soft"; the outside compression to be "firm"; the inside rebound to be "firm"; and the outside rebound to be "soft".

However, if all of the foregoing conditions are not met, then the control mode determiner 454, at operation 816, determines if both of the following conditions are met: 1) the measured steering wheel position is less than the predetermined velocity user-induced input threshold value for the steering wheel position; AND 2) the measured lateral acceleration is less than the predetermined acceleration threshold value for release. If both of the foregoing two conditions are found to be met, then the control system 404 allows a control mode to be activated. The control mode to be activated is determined by the control mode determiner 454. In this situation, the control mode includes, at operation 818: the inside compression to be "medium" (at some point in between "soft" and "hard"); the outside compression to be "medium"; the inside rebound to be "medium"; and the outside rebound to be "medium".

However, if the foregoing two conditions are not met, then a control mode adjustment is not allowed, and the process moves back to start at operation 802.

Of note, the method 800 may be implemented with a single direction semi-active shock (in which the shock is only semi-active in rebound or compression) on any combination of shock absorbers (i.e., the front shock has semi-active rebound and compression, whereas the rear shocks has semi-active only for compression). The steering wheel sensor may be an absolute or incremental encoder, a potentiometer, a gyro, a hall effect sensor, etc. Additionally, for vehicles with a pair of inline wheels/skis/tracks in the rear, the following logic is used: (a) Front wheel/ski/track: Treat as inside for purposes of assigning firm/soft control mode; and (b) Rear wheel/ski/track: Treat as outside for purposes of assigning firm/soft control mode.

Additionally, method 800 may be implemented in shock absorbers using springs. For example, method 800 may be implemented in a shock absorber having an air spring with a concentric cylinder bypass damper therein, shown in FIG. 9.

Figure 9:
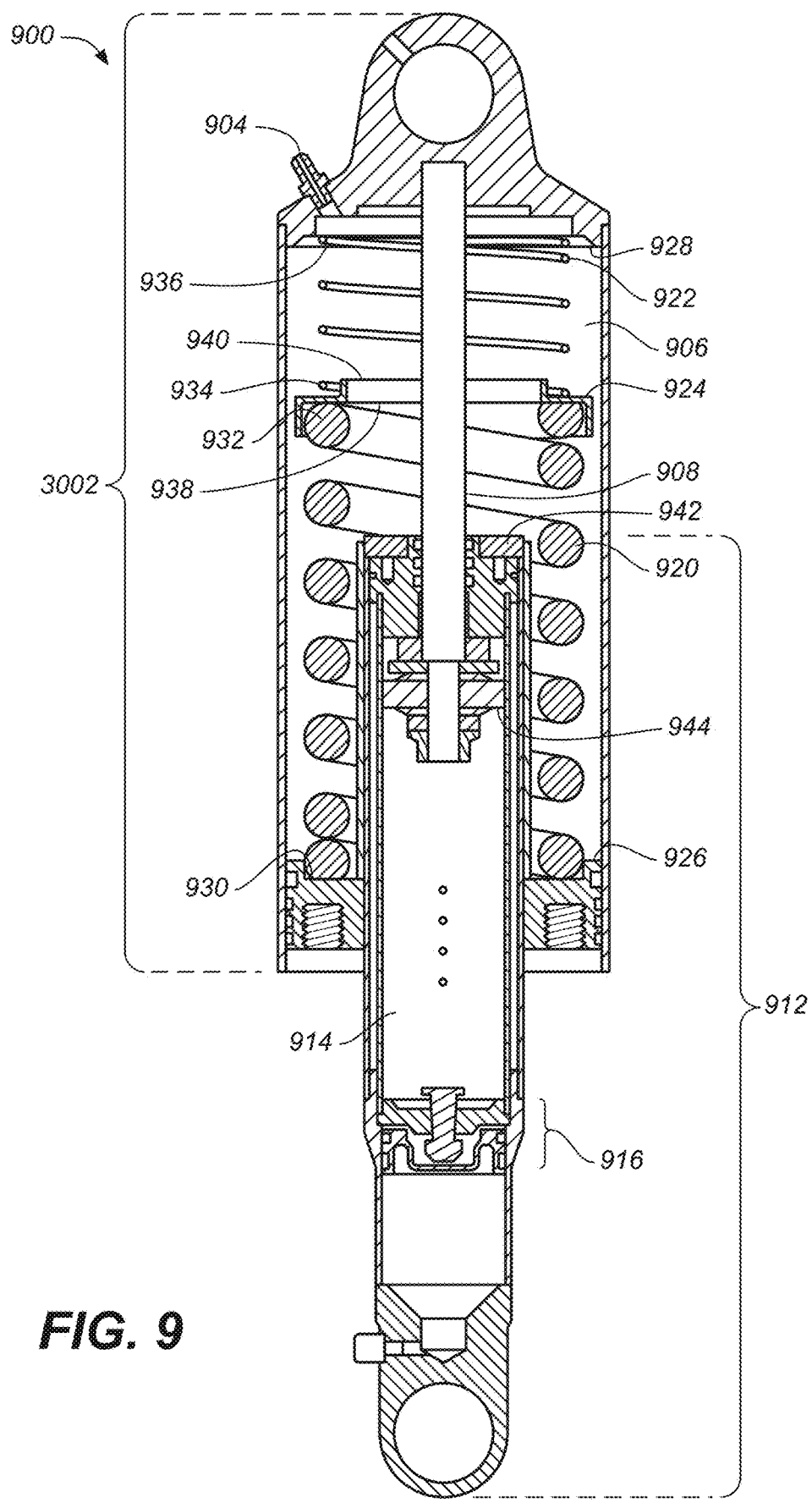
FIG. 9 depicts a side cross-sectional view of a shock absorber 900 upon which embodiments may be implemented.

FIG. 9 depicts a side cross-sectional view of a shock absorber 900 upon which embodiments may be implemented. More specifically, the shock absorber 900 includes an air spring integrated with a concentric cylinder bypass damper.

The shock absorber 900 includes the air spring 902 with a concentric cylinder bypass damper 912 slidably engaged therein. As shown, the air spring 902 includes the air spring chamber 906 and the shaft 908. A fitting 904 is disposed at the top of the air spring 902. The fitting 904 is enables an entry of air into the air spring chamber 906.

The air spring chamber 906 has only air within, in one embodiment. As compression of the shock absorber 900 occurs, the concentric cylinder bypass damper 912 moves further into the air spring chamber 906 of the air spring 902. As the concentric cylinder bypass damper 912 moves further into the air spring chamber 906, the shaft 908 moves further into the damping fluid chamber 914 of the concentric cylinder bypass damper 912.

Upon the movement of the concentric cylinder bypass damper 912 into the air spring chamber 906, a damping effect occurs. The strength of the damping effect is determined by the amount of air pressure that is within the air spring chamber 906. As the concentric cylinder bypass damper 912 enters the air spring chamber 906 the volume of the air spring chamber 906 is increased. The air within the air spring chamber 906 provides resistance to the movement of the concentric cylinder bypass damper 912 therein.

Additionally, in one embodiment, the electronic valve 460 is integrated within the concentric cylinder bypass damper 912. In one embodiment, for example, the electronic valve 460 is integrated with the main piston attached to the shaft 944. However, it should be noted that the electronic valve 460 may be implemented elsewhere in or on the shock absorber 918, as described herein with regard to other types of shock absorber structures. See FIGS. 18A-18R for a description of the integration of the electronic valve 460 onto various shock absorber designs.

Figure 10A:
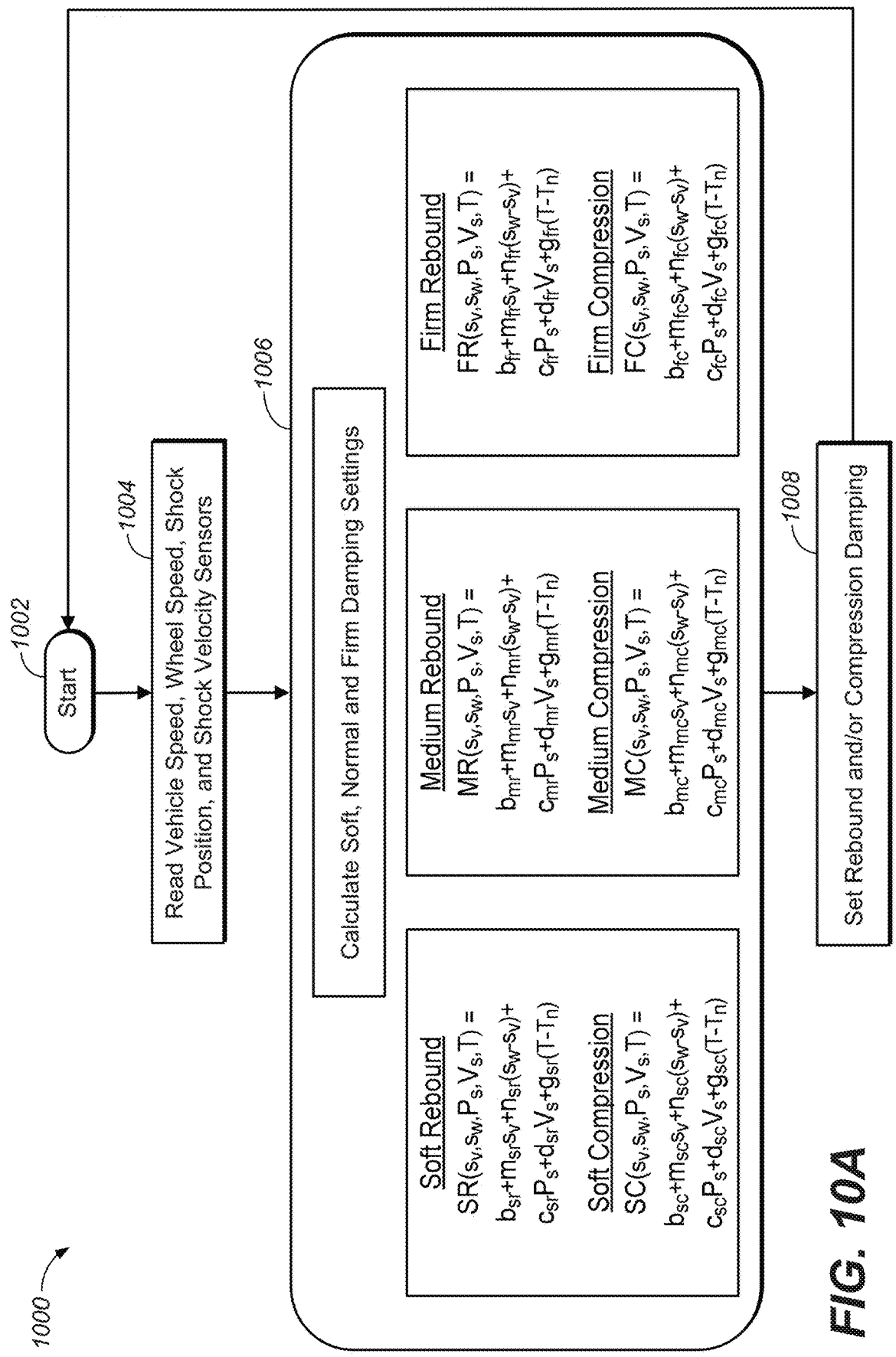
FIGS. 10A-16B depict methods for controlling vehicle motion, in accordance with various embodiments.

FIG. 10A is a flow diagram of a method 1000 for controlling vehicle motion, in accordance with an embodiment. The method 1000 starts at operation 1002. The method 1000 moves from operation 1002 to operation 1004.

At operation 1004, in one embodiment, the set of sensors 440 of the vehicle components 438 sense the vehicle speed, the wheel speed, the shock absorber position and the shock absorber velocity. At operation 1006, after the control system 404 received the control signals from the set of sensors 440 including the information regarding the vehicle speed, the wheel speed, the shock absorber position and the shock absorber velocity, the control system 404 calculates the "soft" (some position less than "medium"), "medium" (some position between "soft" and "firm"), and "firm" (some position more than "medium") damping settings.

The following is a key for the equations detailed below:
SR: soft rebound damping setting;
SC: soft compression damping setting;
NR: medium rebound damping setting;
NC: medium compression damping setting;
FR: firm rebound damping setting;
FC: firm compression damping setting;
$S_V$: speed of the vehicle;
$S_W$: speed of the individual wheels;
$P_S$: position shock;
$V_S$: velocity shock;
T: temperature of shock;
Tn: nominal temperature of shock;
$b_{xx}$: nominal damping setting;
$m_{xx}$: how damping setting changes based on vehicle speed, could be any relationship;
$n_{xx}$: how the damping setting changes based on difference in vehicle speed and individual wheel speed, this could be any relationship;
$c_{xx}$: how the damping setting changes based on shock position, this could be any relationship;

$d_{xx}$: how the damping setting changes based on shock velocity, this could be any relationship; and $g_{xx}$: how damping setting changes based on temperature, could be any relationship.

Regarding the "soft" setting control mode, the control system 404, in one embodiment, calculates the soft rebound and the soft compression control mode setting using the following equations:

Soft Rebound Control Mode Setting:

$$SR(S_V, S_W, P_S, V_S, T) = b_{sr} + m_{sr}s_v + n_{sr}(S_W - S_V) + c_{sr}P_S + d_{sr}V_s + g_{sr}(T - T_n)$$

Soft Compression Control Mode Setting:

$$SC(S_V, S_W, P_S, V_S, T) = b_{sc} + m_{sc}s_v + n_{sc}(S_W - S_V) + c_{sc}P_S + d_{sc}V_s + g_{sc}(T - T_n)$$

Regarding the "medium" setting control mode, the control system 404, in one embodiment, calculates the medium rebound and the medium compression control mode setting using the following equations:

Medium Rebound Control Mode Setting:

$$MR(S_V, S_W, P_S, V_S, T) = b_{mr} + m_{mr}s_v + n_{mr}(S_W - S_V) + c_{mr}P_S + d_{mr}V_s + m_{mr}(T - T_n)$$

Medium Compression Control Mode Setting:

$$MC(S_V, S_W, P_S, V_S, T) = b_{mc} + m_{mc}s_v + n_{mc}(S_W - S_V) + c_{mc}P_S + d_{mc}V_s + g_{mc}(T - T_n)$$

Regarding the "firm" setting control mode, the control system 404, in one embodiment, calculates the firm rebound and the firm compression control mode setting using the following equations:

Firm Rebound Control Mode Setting:

$$FR(S_V, S_W, P_S, V_S, T) = b_{fr} + m_{fr}s_v + n_{fr}(S_W - S_V) + c_{fr}P_S + d_{fr}V_s + g_{fr}(T - T_n)$$

Firm Compression Control Mode Setting:

$$FC(S_V, S_W, P_S, V_S, T) = b_{fc} + m_{fc}s_v + n_{fc}(S_W - S_V) + c_{fc}P_S + d_{fc}V_s + g_{fc}(T - T_n)$$

At operation 1008, in one embodiment, based on the calculated "soft", "medium" and "firm" damping settings, the control system 404 sends an actuation signal to the power source 458, causing each of the shock absorbers to adjust according to the calculated damping setting at operation 1006; the rebound and/or compression damping control modes are actuated.

Of note, according to various embodiments, the vehicle speed sensor may be a GPS, a wheel speed sensor, an inertial sensor, etc., or any combination thereof. The wheel speed sensor may be a rotary/absolute encoder, a gear tooth sensor, etc.

According to various embodiments, the shock position sensor may be a LVDT, a string pot, a double integral of an accelerometer or any appropriate sensor.

According to various embodiments, the shock velocity sensor may be a derivative of a position sensor, an integral of an accelerometer or any appropriate sensor.

According to various embodiments, the shock heat sensor may be a thermocouple, a thermistor or any appropriate technology. The shock heat sensor may be internal or external to the chock body.

According to various embodiments, the decision between the firm and the soft damping setting may be manual (e.g., the rider's choice) or automatic based on a desired roll control determination, a desired anti-squat control determination, driving history, etc.

According to various embodiments, the different firm and soft damping settings may be calculated for each wheel/track/etc. on the vehicle (i.e., this method is performed independently on each wheel/track/etc.).

Figure 10B:
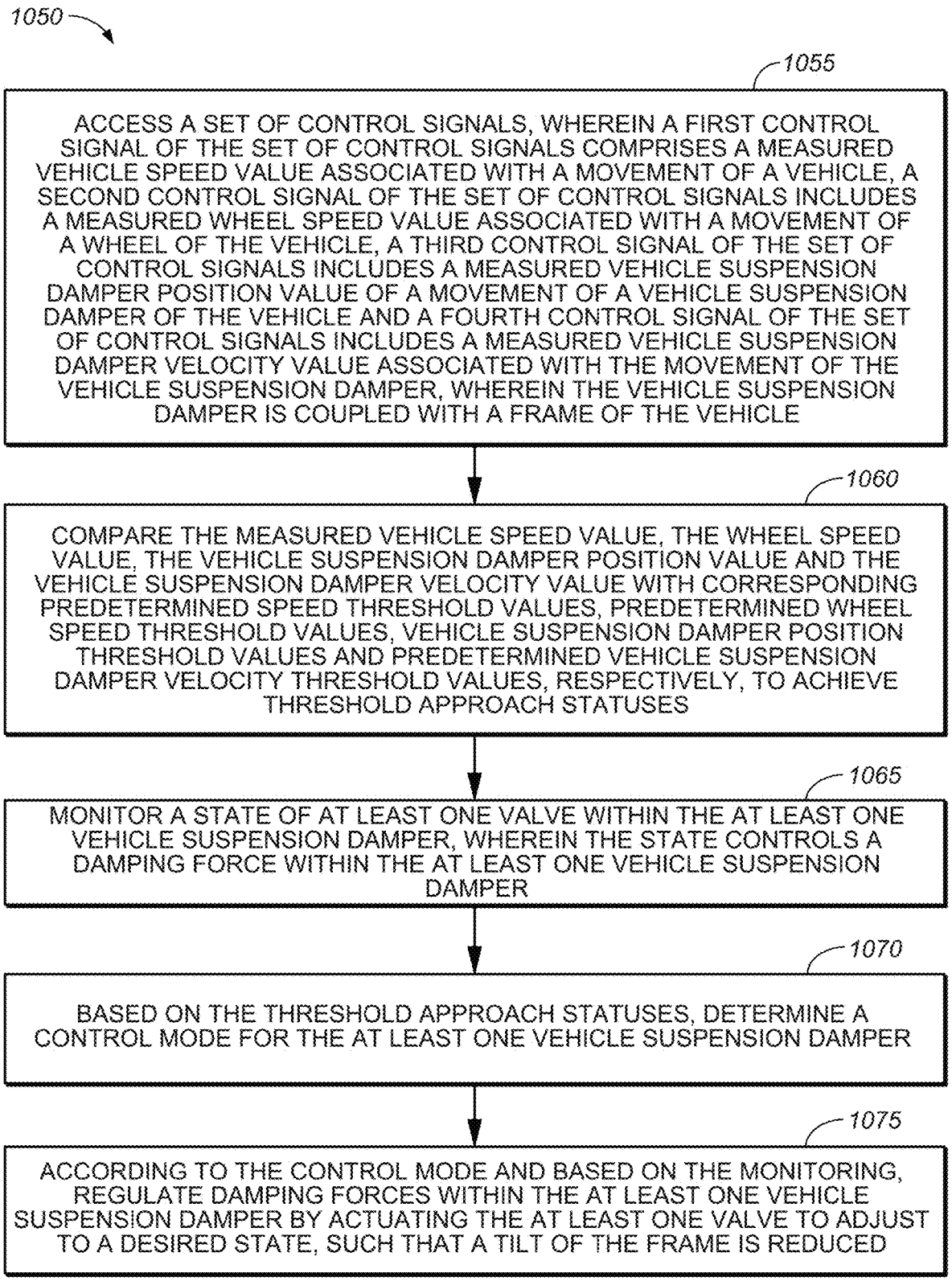

FIG. 10B is a flow diagram of a method 1050 for controlling vehicle motion, in accordance with an embodiment. With reference to FIGS. 4A-4C and 10B, the method 1050 is described.

At operation 1055, in one embodiment, the set of control signals 442 are accessed, wherein a first control signal of the set of control signals 442 includes a measured vehicle speed value associated with a movement of a vehicle, a second control signal of the set of control signals 442 includes a measured wheel speed value associated with a movement of a wheel of the vehicle, a third control signal of the set of control signals 442 includes a measured vehicle suspension damper position value of a movement of a vehicle suspension damper of the vehicle and a fourth control signal of the set of control signals 442 includes a measured vehicle suspension damper velocity value associated with the movement of the vehicle suspension damper, wherein the vehicle suspension damper is coupled with a frame of the vehicle.

At operation 1060, in one embodiment, the measured vehicle speed value, the wheel speed value, the vehicle suspension damper position value and the vehicle suspension damper velocity value with corresponding predetermined vehicle speed threshold values 495, predetermined wheel speed threshold values 496, vehicle suspension damper position threshold values 490 and predetermined vehicle suspension damper velocity threshold values 491, respectively, to achieve a threshold approach status.

At operation 1065, in one embodiment, a state of at least one valve within the at least one vehicle suspension damper is monitored, wherein the state controls a damping force within the at least one vehicle suspension damper.

At operation 1070, in one embodiment, based on the threshold approach statuses, a control mode for the at least one vehicle suspension damper is determined.

At operation 1075, in one embodiment, according to the control mode determined at operation 1070 and based on the monitoring performed at operation 1075, damping forces are regulated within the at least one vehicle suspension damper by actuating the at least one valve to adjust to a desired state, such that a tilt of the frame is reduced.

Figure 11A:
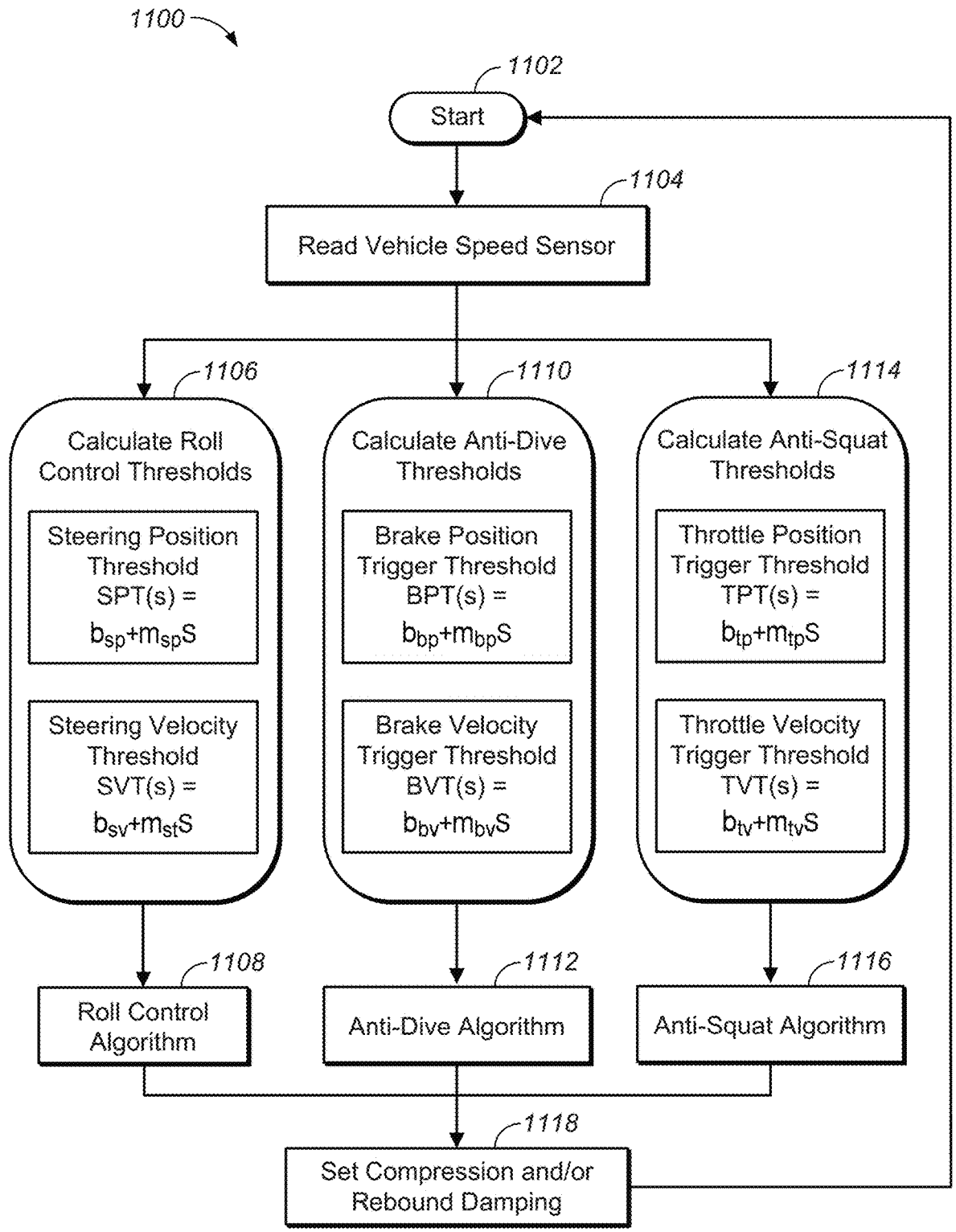

FIG. 11A is a flow diagram of a method 1100 for controlling vehicle motion, in accordance with an embodiment. The method 1100 starts at operation 1102. The method 1100, in one embodiment, moves from operation 1102 to operation 1104.

At operation 1104, in one embodiment, at least one set of sensors of the set of sensors 440 senses the vehicle speed.

After receiving the vehicle speed measurements having been sensed by the set of sensors 440, the control system 404 performs at least one of three operations 1106, 1110 and 1114.

At operation 1106, in one embodiment, the roll control thresholds, such as the steering position threshold and the steering velocity threshold, are calculated. The steering position threshold, in one embodiment, is calculated using the following equation:

$$SPT(s) = b_{sp} + m_{sp}s$$

The steering velocity threshold is calculated using the following equation:

$$SVT(s) = b_{sv} + m_{sv}s$$

At operation 1108, in one embodiment, the calculations performed at operation 1106 are used to perform the roll control method 800 shown in FIG. 8.

At operation 1110, in one embodiment, the anti-dive thresholds, such as the brake position trigger threshold and the brake velocity trigger threshold, are calculated.

The brake position trigger threshold, in one embodiment, is calculated using the following equation:

$$BPT(s)=b_{bp}+m_{bp}s$$

The brake velocity trigger threshold, in one embodiment, is calculated using the following equation:

$$BVT(s)=b_{bv}+m_{bv}s$$

At operation 1112, in one embodiment, the calculations performed at operation 1110 are used to perform the anti-dive method that will be explained with respect to method 1200 of FIG. 12A.

At operation 1114, in one embodiment, the anti-squat thresholds, such as the throttle position trigger threshold and the throttle velocity trigger threshold, are calculated.

The throttle position trigger threshold, in one embodiment, is calculated using the following equation:

$$TPT(s)=b_{tp}+m_{tp}s$$

The throttle velocity trigger threshold, in one embodiment, is calculated using the following equation:

$$TVT(s)=b_{tv}m_{tv}s$$

At operation 1116, in one embodiment, the calculations performed at operation 1114 are used to perform the anti-squat method that will be explained with respect to method 1300 of FIG. 13.

At operation 1118, in one embodiment, once the roll control method at 1108, the anti-dive method at 1112 and/or the anti-squat method at 1116 are calculated, the control system 404 sends an actuation signal to the power source 458 to activate the electronic valve 100 or 460 to achieve the control modes determined based on the methods performed at operation 1108, 1112 and/or 1116.

After the operation 1118 is complete, in one embodiment, the method 1100 moves to the start at operation 1102.

Of note, in one embodiment, the vehicle speed sensor may be a GPS, a wheel speed sensor, an inertial sensor, etc., or any combination thereof. The operations performed at 1106, 1110 and 1115, in one embodiment, may be enabled/disabled independently of each other.

Figure 11B:
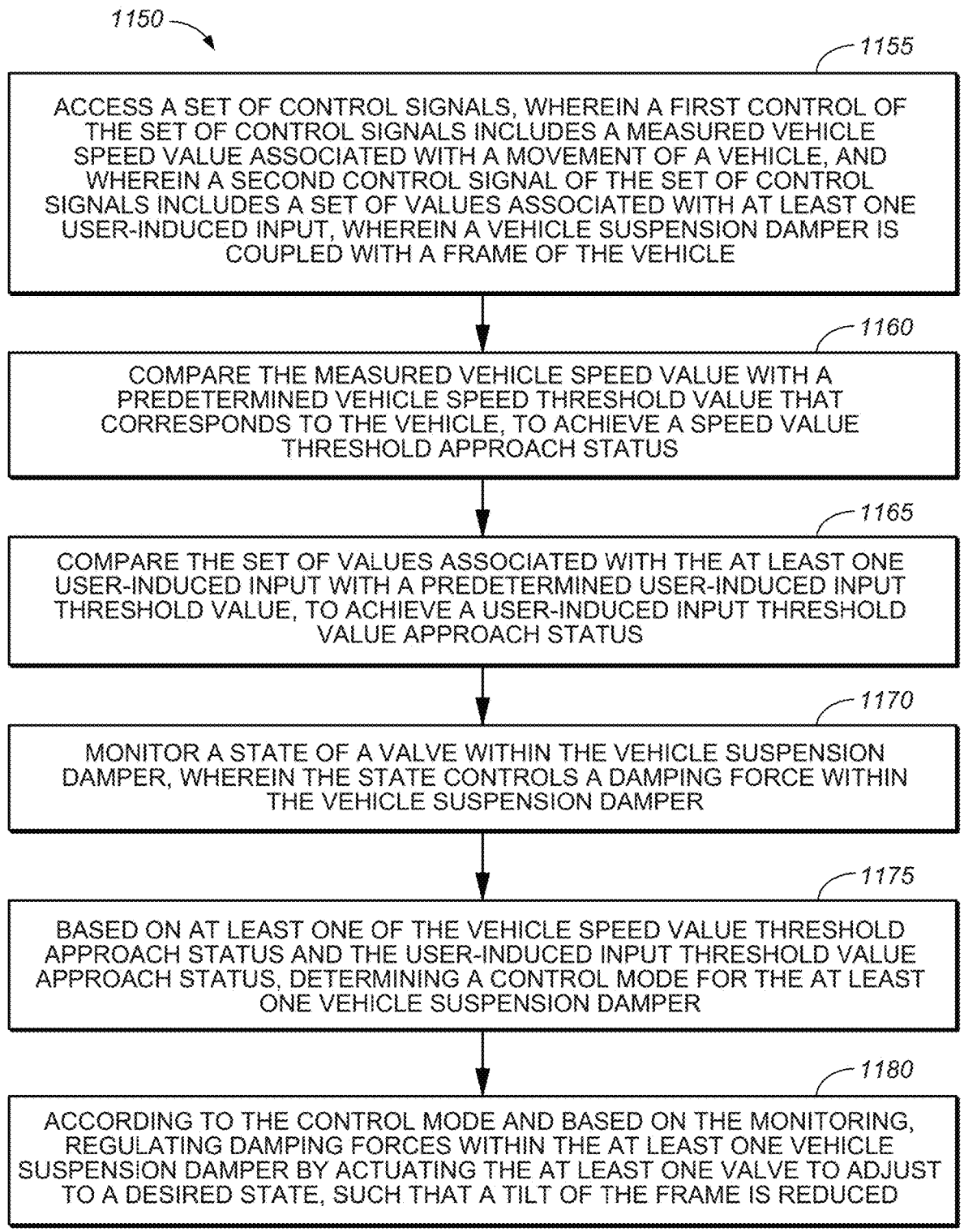

FIG. 11B is a flow diagram of a method 1150 for controlling vehicle motion, in accordance with an embodiment. With reference to FIGS. 4A-4C and FIGS. 11A and 11B, the method 1150 is described.

At operation 1155, in one embodiment, a set of control signals 442, wherein a first control signal of said set of control signals 442 includes a measured vehicle speed value associated with a movement of a vehicle, and wherein a second control signal of the set of control signals 442 includes a set of values associated with at least one user-induced input, wherein a vehicle suspension damper is coupled with a frame of the vehicle.

At operation 1160, in one embodiment, the measured vehicle speed value is compared with a predetermined vehicle speed threshold value 495 that corresponds to the vehicle, to achieve a speed value threshold approach status.

At operation 1165, in one embodiment, the set of values associated with the at least one user-induced input is compared with a predetermined user-induced input threshold value 448, to achieve a user-induced input threshold value approach status.

At operation 1170, in one embodiment, a state of a valve within the vehicle suspension damper is monitored, wherein the state controls a damping force within the vehicle suspension damper.

At operation 1175, in one embodiment, based on at least one of the vehicle speed value threshold approach status and the user-induced input threshold value approach status, a control mode for the at least one vehicle suspension damper is determined.

At operation 1180, in one embodiment, according to the control mode and based on the monitoring, damping forces within the at least one vehicle suspension damper are regulated by actuating the at least one valve to adjust to a desired state, such that a tilt of the frame is reduced.

Figure 12A:
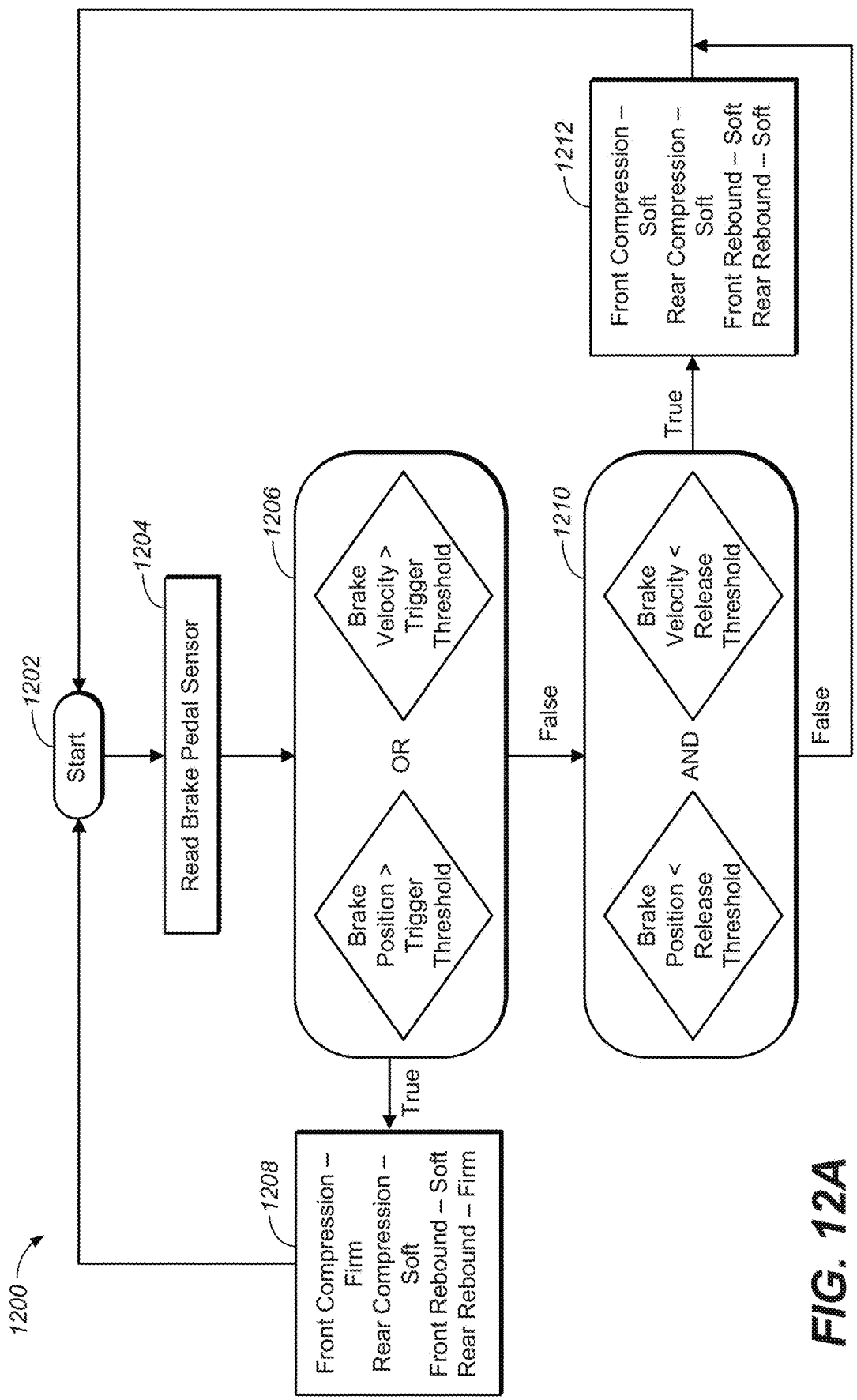

FIG. 12A is a flow diagram of a method 1200 for controlling vehicle motion, in accordance with an embodiment. The method 1200 provides for "anti-diving" control mode determinations. The method 1200 starts at operation 1202. The method 1200 moves from operation 1202 to operation 1204.

At operation 1204, in one embodiment, the set of sensors 440 sense the brake pedal information, such as the position of the brake pedal and the velocity at which the brake pedal moves in response to being pressed.

At operation 1206, in one embodiment, the control system 404 accesses (retrieves from the set of sensors 440 or receives from the set of sensors 440) the sensed information from the set of sensors 440, such as the brake position and the brake velocity. The control system 404, in one embodiment, compares the measured brake position and the measured brake velocity to the predetermined user-induced inputs threshold values. More specifically, the measured brake position is compared to the predetermined brake position trigger threshold value and the measured brake velocity is compared to the predetermined brake velocity trigger threshold value. In one embodiment, if the control mode determiner 454 determines whether or not the following conditions are met: the measured brake position is found to be greater than the predetermined brake position trigger threshold; OR the measured brake velocity is found to be greater than the predetermined brake velocity trigger threshold. If the foregoing conditions of operation 1206 are met, then the method 1200 moves to operation 1208.

At operation 1208, in one embodiment, the control mode determiner 454 determines the following control modes: the control mode for the front compression is to be "firm"; the control mode for the rear compression is to be "soft"; the control mode for the front rebound is to be "soft"; and the control mode for the rear rebound is to be "firm". The control system 404 sends an actuation signal to the power source 458 to cause the electronic valve 100 to adjust to achieve these control modes.

However, in one embodiment, if the foregoing conditions of operation 1206 are not met, then the method 1200 moves from operation 1206 to operation 1210. At operation 1210, in one embodiment, the control mode determiner 454 determines if the following conditions are met: the measured brake position is less than the predetermined brake position release threshold; AND the measured brake velocity is less than the predetermined brake velocity release threshold.

If it is determined that the foregoing conditions of operation 1210 are met, in one embodiment, then the control mode determiner 454 determines, at operation 1212, the following control modes: the control mode for the front compression is to be "medium"; the control mode for the rear compression is to be "medium"; the control mode for the front rebound is to be "medium"; and the control mode for the rear rebound is to be "medium". The control system 404 sends an actuation signal to the power source 458 to cause the electronic valve 100 to adjust to achieve these control modes.

However, in one embodiment, if the foregoing conditions of operation 1210 are not met, then the method 1200 moves from operation 1210 to the start at operation 1202.

Of note, the method 1200, in one embodiment, may be implemented with a single direction semi-active shock (only semi-active in rebound or compression) on any combination of shock absorbers (i.e., the front shock absorbers have semi-active rebound and compression, while the rear shock absorbers have semi-active only for compression). Of further note, the thresholds for the soft/medium/firm damping settings are configured according to the methods 1000 and 1100. Additionally, the brake sensor of the set of sensors 440 may be a hardware sensor (e.g., potentiometer, LVDT, encoder, etc.) or a parameter read from the vehicle's computer.

Figure 12B:
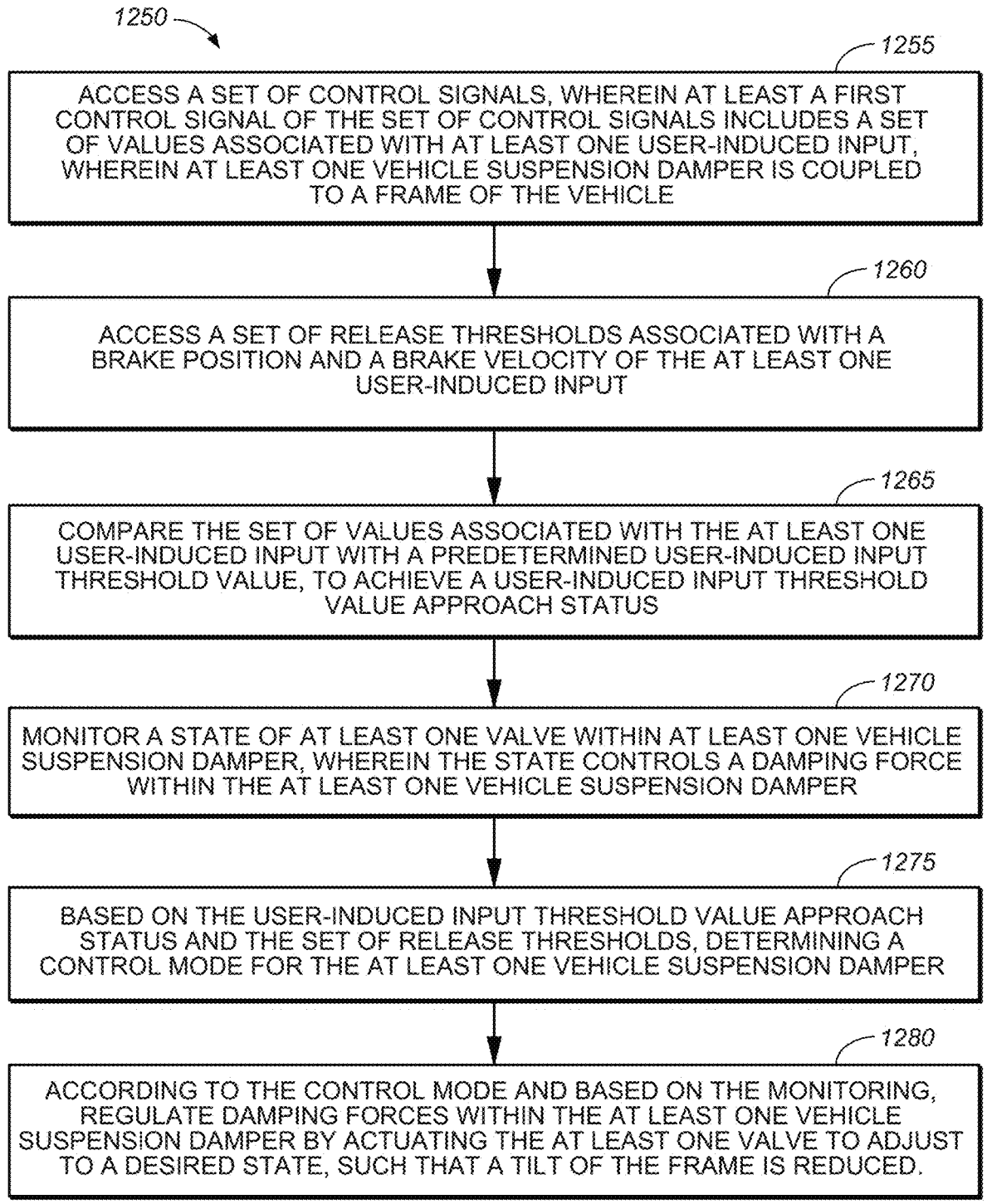

FIG. 12B is a flow diagram of a method 1250 for controlling vehicle motion, in accordance with an embodiment. With reference to FIGS. 4A-4C, 12A and 12B, the method 1250 is described.

At operation 1255, in one embodiment, a set of control signals 442 are accessed, wherein at least a first control signal of the set of control signals 442 includes a set of values associated with at least one user-induced input, wherein at least one vehicle suspension damper is coupled to a frame of the vehicle.

At operation 1260, in one embodiment, a set of release thresholds associated with a brake position and a brake velocity of the at least one user-induced input is accessed.

At operation 1265, in one embodiment, the set of values associated with the at least one user-induced input is compared with the predetermined user-induced input threshold values 448, to achieve a user-induced input threshold value approach status.

At operation 1270, in one embodiment, a state of at least one valve within the at least one vehicle suspension damper is monitored, wherein the state controls a damping force within the at least one vehicle suspension damper.

At operation 1275, in one embodiment, based on the user-induced input threshold value approach status and the set of release thresholds, a control mode for the at least one vehicle suspension damper is determined.

At operation 1280, in one embodiment, according to the control mode and based on the monitoring, damping forces within the at least one vehicle suspension damper are regulated by actuating the at least one valve to adjust to a desired state, such that a tilt of the frame is reduced.

Figure 13A:
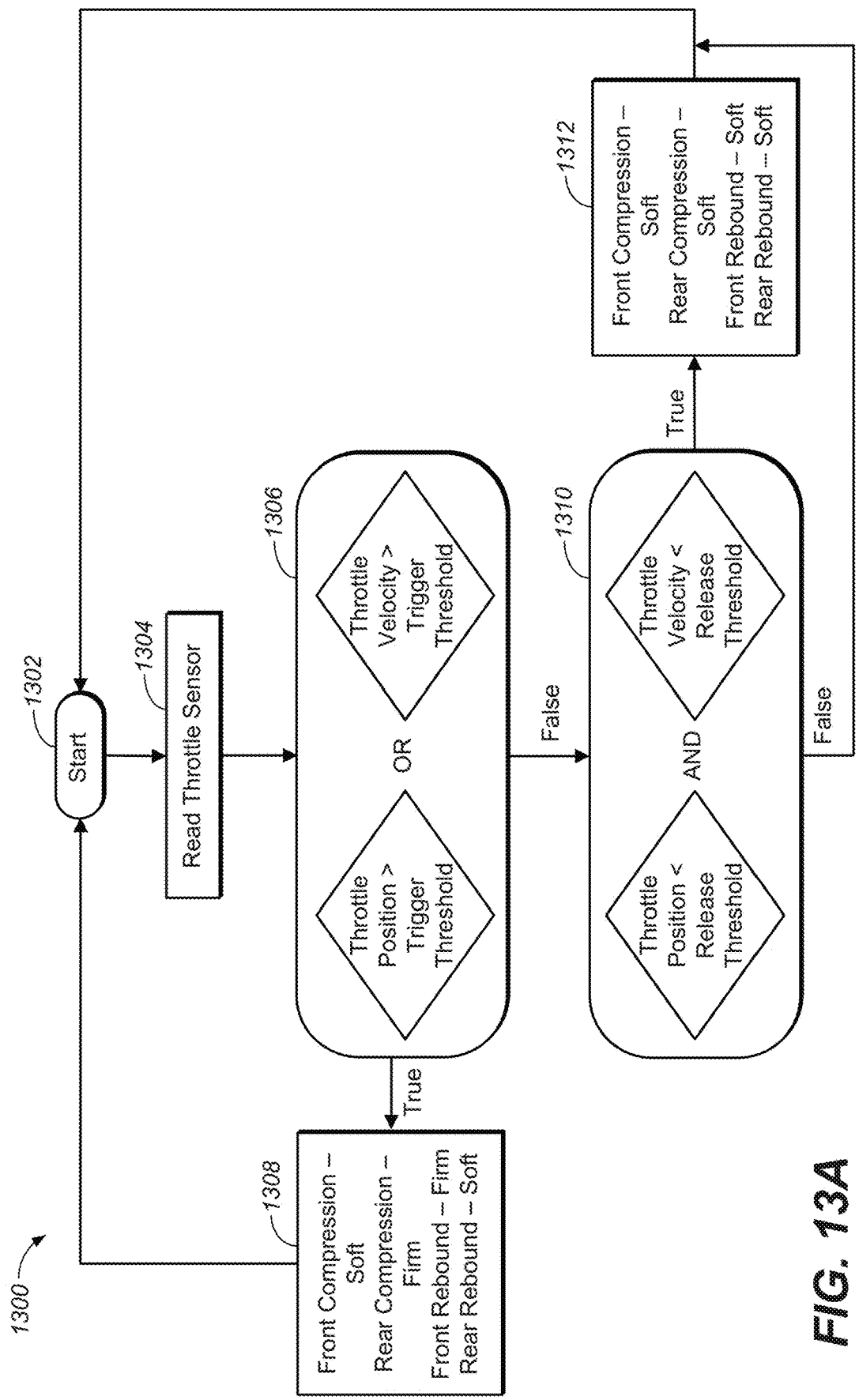

FIG. 13A is a flow diagram of a method 1300 for controlling vehicle motion, in accordance with an embodiment. The method 1300 provides for "anti-squatting" control mode determinations. The method 1300 starts at operation 1302. The method 1300 moves from operation 1302 to operation 1304.

At operation 1304, in one embodiment, the set of sensors 440 sense the throttle information, such as the position of the throttle and the velocity at which the throttle moves in response to being pressed.

At operation 1306, in one embodiment, the control system 404 accesses (retrieves from the set of sensors 440 or receives from the set of sensors 440) the sensed information from the set of sensors 440, such as the throttle position and the throttle velocity. The control system 404, in one embodiment, compares the measured throttle position and the measured throttle velocity to the predetermined user-induced inputs threshold values. More specifically, the measured throttle position is compared to the predetermined throttle position trigger threshold value and the measured throttle velocity is compared to the predetermined throttle velocity trigger threshold value. In one embodiment, if the control mode determiner 454 determines whether or not the following conditions are met: the measured throttle position is found to be greater than the predetermined throttle position trigger threshold; OR the measured throttle velocity is found to be greater than the predetermined throttle velocity trigger threshold. If the foregoing conditions of operation 1306 are met, then the method 1300 moves to operation 1308.

At operation 1308, in one embodiment, the control mode determiner 454 determines the following control modes: the control mode for the front compression is to be "soft"; the control mode for the rear compression is to be "firm"; the control mode for the front rebound is to be "firm"; and the control mode for the rear rebound is to be "soft". The control system 404 sends an actuation signal to the power source 458 to cause the electronic valve 460 to adjust to achieve these control modes.

However, in one embodiment, if the foregoing conditions of operation 1306 are not met, then the method 1300 moves from operation 1306 to operation 1310. At operation 1310, in one embodiment, the control mode determiner 454 determines if the following conditions are met: the measured throttle position is less than the predetermined throttle position release threshold; AND the measured throttle velocity is less than the predetermined throttle velocity release threshold.

If it is determined that the foregoing conditions of operation 1310 are met, in one embodiment, then the control mode determiner 454 determines, at operation 1312, the following control modes: the control mode for the front compression is to be "soft"; the control mode for the rear compression is to be "soft"; the control mode for the front rebound is to be "soft"; and the control mode for the rear rebound is to be "soft". The control system 404 sends an actuation signal to the power source 458 to cause the electronic valve 460 to adjust to achieve these control modes.

However, in one embodiment, if the foregoing conditions of operation 1310 are not met, then the method 1300 moves from operation 1310 to the start at operation 1302.

Of note, the method 1300, in one embodiment, may be implemented with a single direction semi-active shock (only semi-active in rebound or compression) on any combination of shock absorbers (i.e., the front shock absorbers have semi-active rebound and compression, while the rear shock absorbers have semi-active only for compression). Of further note, the thresholds for the soft/medium/firm damping settings are configured according to the methods 1000 and 1100. Additionally, the throttle sensor of the set of sensors 440 may be a hardware sensor (e.g., potentiometer, LVDT, encoder, etc.) or a parameter read from the vehicle's computer.

Figure 13B:
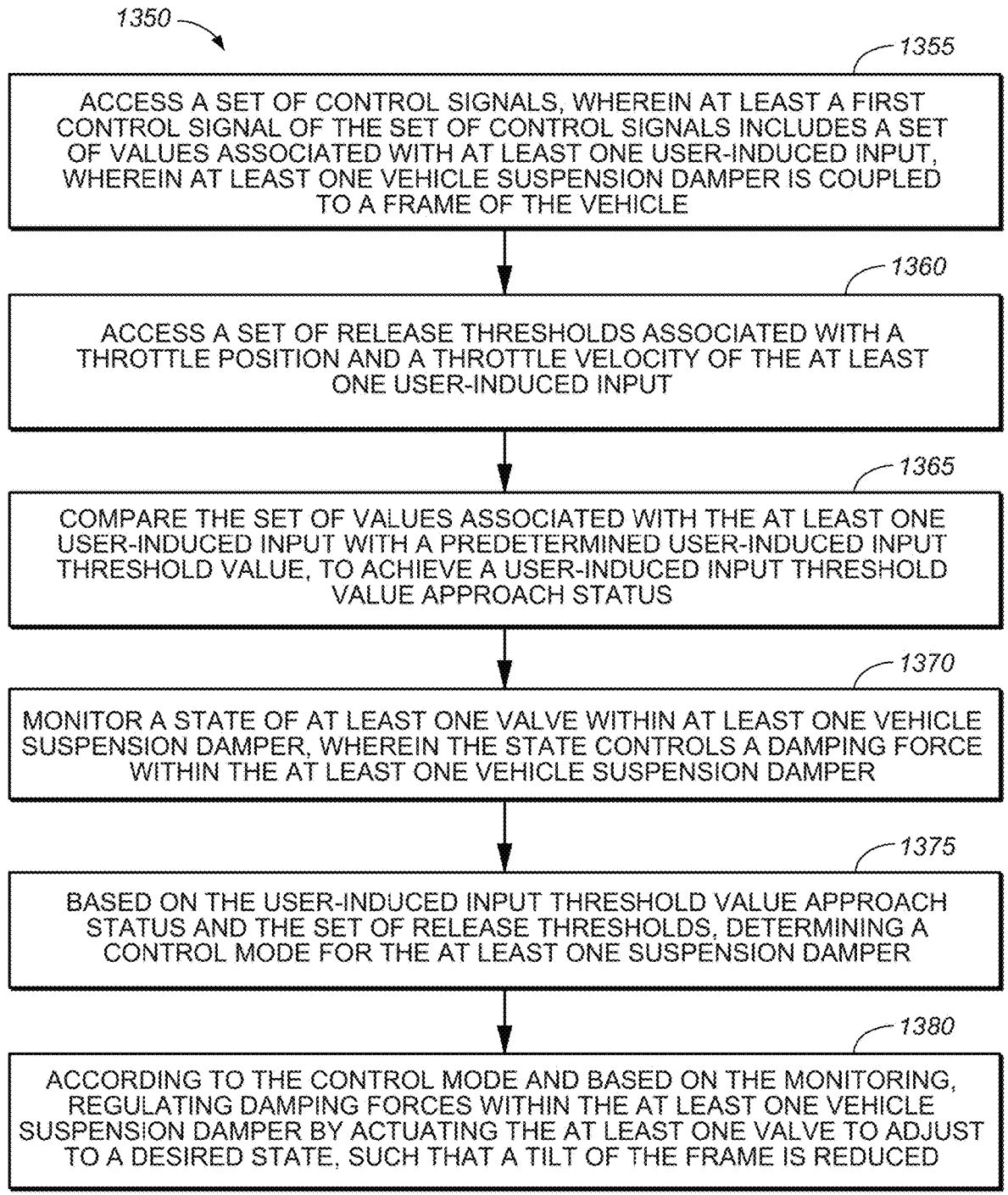

FIG. 13B is a flow diagram of a method 1350 for controlling vehicle motion, in accordance with an embodiment. With reference to FIGS. 4A-4C, 34A and 34B, the method 1350 is described.

At operation 1355, in one embodiment, a set of control signals 442 are accessed, wherein at least a first control signal of the set of control signals 442 includes a set of values associated with at least one user-induced input, wherein at least one vehicle suspension damper is coupled to a frame of the vehicle.

At operation 1360, in one embodiment, a set of release thresholds associated with a throttle position and a throttle velocity of the at least one user-induced input is accessed.

At operation 1365, in one embodiment, the set of values associated with the at least one user-induced input is compared with the predetermined user-induced input threshold values 448, to achieve a user-induced input threshold value approach status.

At operation 1370, in one embodiment, a state of at least one valve within the at least one vehicle suspension damper is monitored, wherein the state controls a damping force within the at least one vehicle suspension damper.

At operation 1375, in one embodiment, based on the user-induced input threshold value approach status and the set of release thresholds, a control mode for the at least one vehicle suspension damper is determined.

At operation 1380, in one embodiment, according to the control mode and based on the monitoring, damping forces within the at least one vehicle suspension damper are regulated by actuating the at least one valve to adjust to a desired state, such that a tilt of the frame is reduced.

Figure 14A:
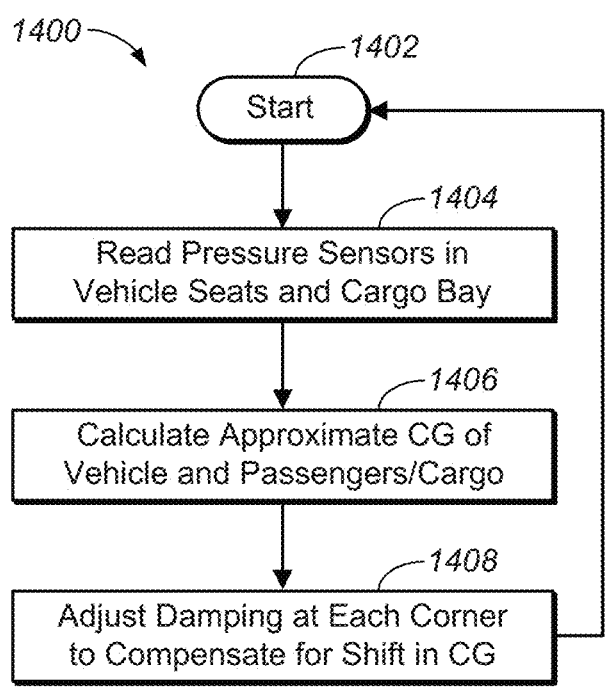

FIG. 14A is a flow diagram of a method 1400 for controlling vehicle motion, in accordance with an embodiment. The method 1400 provides for center of gravity restoration control mode determinations. The method 1400 starts at operation 1402. The method 1400 moves from operation 1402 to operation 1404.

At operation 1404, in one embodiment, the set of sensors 440 sense the center of gravity information, such as the pressure applied to the vehicle seats and the pressure applied to the vehicle's cargo bay (due to transporting items [e.g., luggage, fuel, etc.]).

At operation 1406, in one embodiment, the control system 404 accesses (retrieves from the set of sensors 440 or receives from the set of sensors 440) the sensed information from the set of sensors 440, such as the sensed pressure applied to the vehicle's seats and the sensed pressure applied to the vehicle's cargo bay. The control system 404, in one embodiment, at operation 1406, calculates the approximate center of gravity of the vehicle and the passengers/cargo based on the pressures measured at operation 1404.

At operation 1408, in one embodiment, the damping is adjusted at each corner of the vehicle, via the shock absorbers, to compensate for the shift, if any, in the vehicle's center of gravity.

Of note, the method 1400, in one embodiment, may be implemented with a single direction semi-active shock (only semi-active in rebound or compression) on any combination of shock absorbers (i.e., the front shock absorbers have semi-active rebound and compression, while the rear shock absorbers have semi-active only for compression).

Figure 14B:
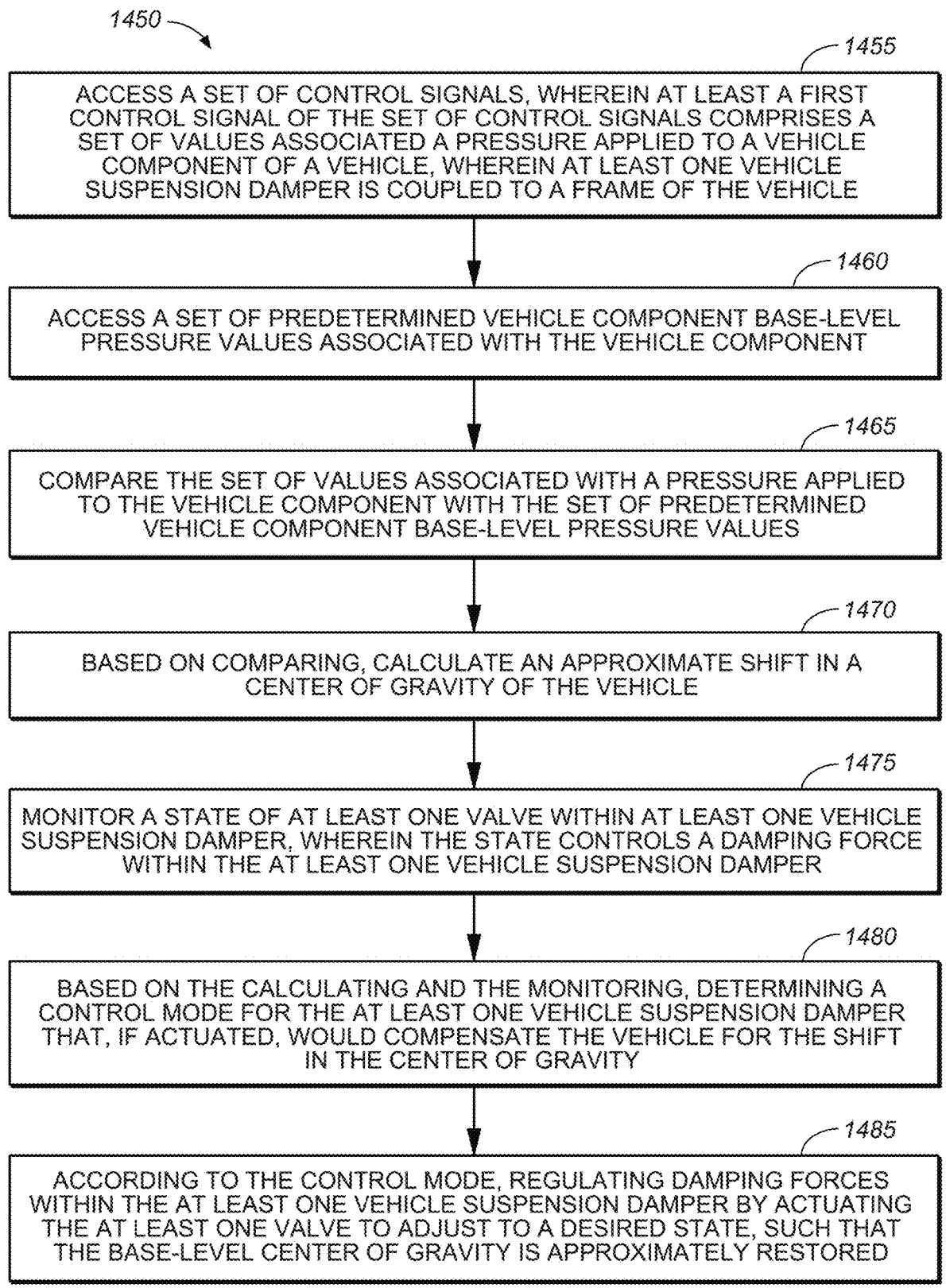

FIG. 14B is a flow diagram of a method 1450 for controlling vehicle motion, in accordance with an embodiment. With reference to FIGS. 4A-4C, 14A and 14B, the method 1450 is described.

At operation 1455, in one embodiment, a set of control signals 442 are accessed, wherein at least a first control signal of the set of control signals includes a set of values associated a pressure applied to a vehicle component of a vehicle, wherein at least one vehicle suspension damper is coupled to a frame of the vehicle.

At operation 1460, in one embodiment, a set of predetermined vehicle component base-level pressure values associated with the vehicle component is accessed.

At operation 1465, in one embodiment, the set of values associated with a pressure applied to the vehicle component are compared with the set of predetermined vehicle component base-level pressure values.

At operation 1470, in one embodiment, based on the comparing, an approximate shift in a center of gravity of the vehicle is calculated.

At operation 1475, in one embodiment, a state of at least one valve within the at least one vehicle suspension damper is monitored, wherein the state controls a damping force within the at least one vehicle suspension damper.

At operation 1480, in one embodiment, based on the calculating and the monitoring, a control mode for the at least one vehicle suspension damper is determined, that, if actuated, would compensate the vehicle for the shift in the center of gravity.

At operation 1485, in one embodiment, according to the control mode, damping forces are regulated within the at least one vehicle suspension damper by actuating the at least one valve to adjust to a desired state, such that the base-level center of gravity is approximately restored.

Figure 15A:
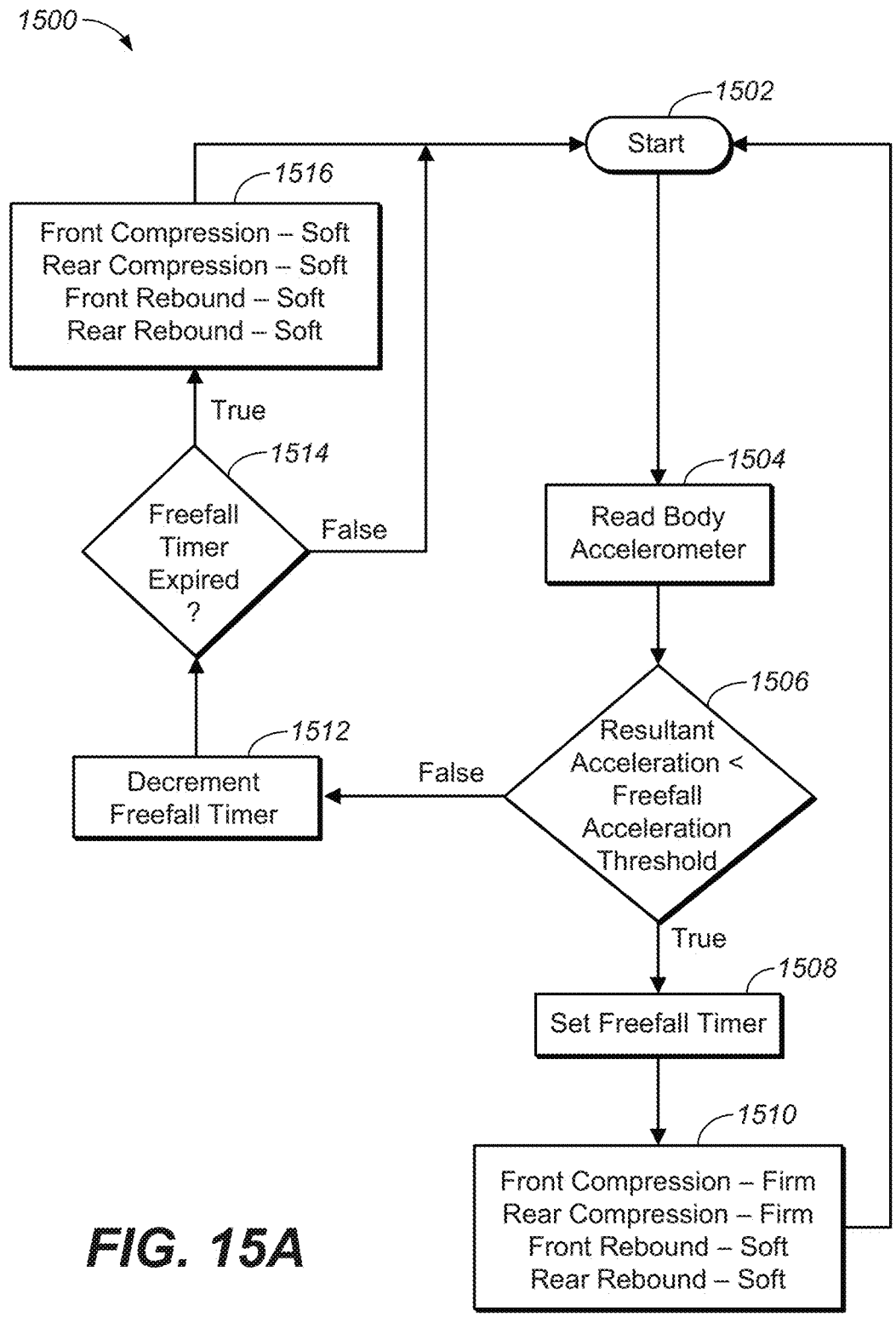

FIG. 15A is a flow diagram of a method 1500 for controlling vehicle motion, in accordance with an embodiment. The method 1500 provides for freefall control mode determinations. The method 500 starts at operation 1502. The method 1500 moves from operation 1502 to operation 1504.

At operation 1504, in one embodiment, the set of sensors 440 sense acceleration information, such as the acceleration information associated with a vehicle component.

At operation 1506, in one embodiment, the control system 404 accesses (retrieves from the set of sensors 440 or receives from the set of sensors 440) the sensed information from the set of sensors 440, such as the acceleration information. The control system 404, in one embodiment, compares the measured vehicle component acceleration with a freefall acceleration threshold. If the measured vehicle component acceleration is found to be less than the freefall acceleration threshold, then at operation 1508, in one embodiment, a freefall timer is set.

At operation 1510, in one embodiment, subsequent to the freefall timer being set, the front compression control mode is set to "firm", the rear compression control mode is set to "firm", the front rebound control mode is set to "soft" and the rear rebound control mode is set to "soft".

However, if at operation 1506, the measured vehicle body acceleration is more than the freefall acceleration threshold, then at operation 1512, in one embodiment, a freefall timer is decremented.

At operation 1514, in one embodiment, after the freefall timer is decremented at operation 1512, it is determined whether or not the freefall time has expired.

If the freefall timer is found to have expired, then at operation 1516, in one embodiment, the front compression control mode is set to "soft", the rear compression control mode is set to "soft", the front rebound control mode is set to "soft" and the rear rebound control mode is set to "soft".

However, in one embodiment, if at operation 1514, it is found that the freefall timer has not expired, then the method 1500 moves to the start at operation 1502.

Of note, the above method 1500 may be implemented with a single direction semi-active shock (only semi-active in rebound or compression) on any combination of shock absorbers (i.e., the front shock absorber has semi-active rebound and compression, whereas the rear shock absorber has semi-active only for compression). The thresholds and the soft/firm damping settings are configured in methods described herein. The intent of the freefall timer is to keep the compression firm for a short time after freefall ends (approximately 1 s in testing, but configurable in software).

Figure 15B:
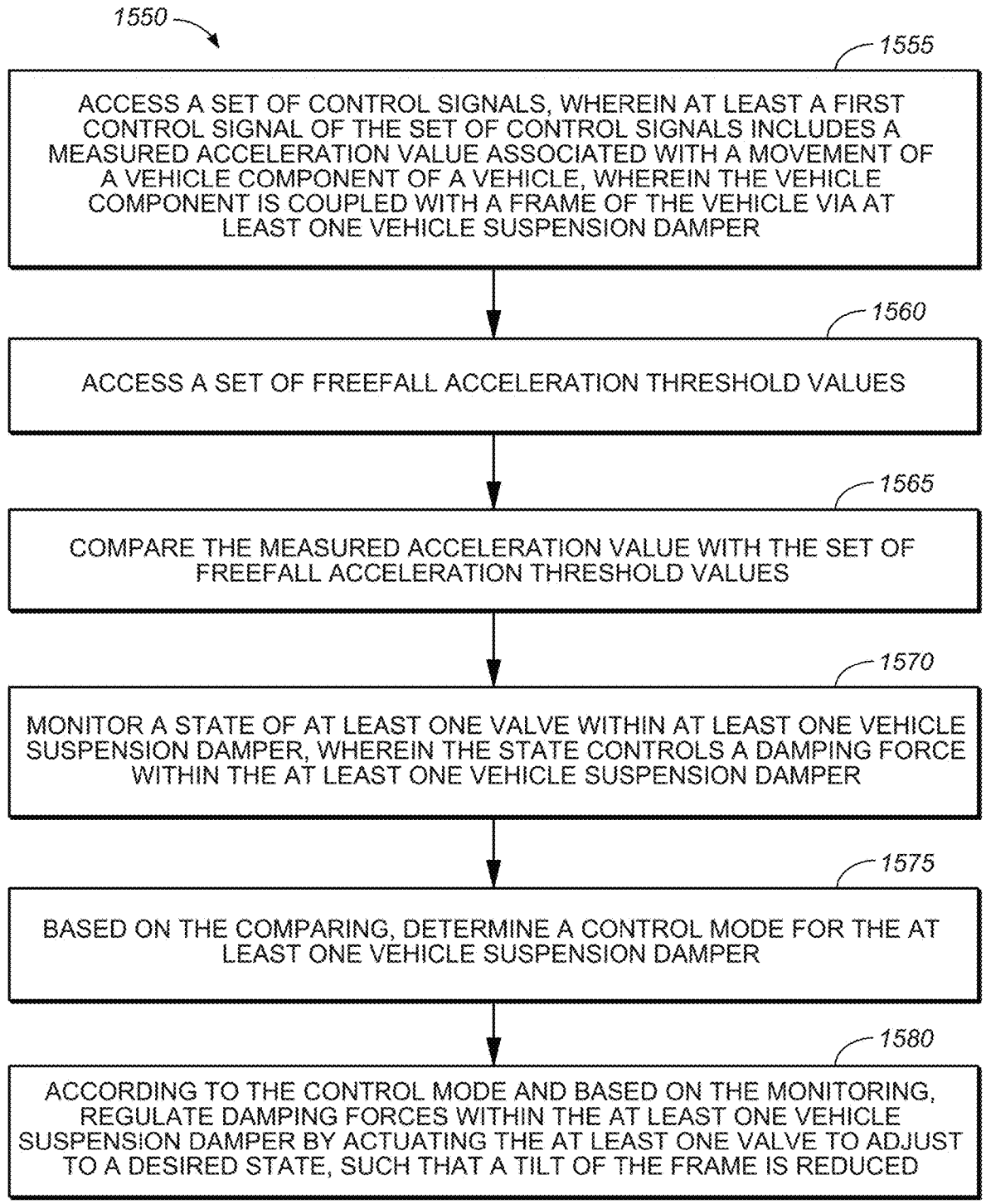

FIG. 15B is a flow diagram of a method 1550 for controlling vehicle motion, in accordance with an embodiment. With reference to FIG. 15B and FIGS. 4A-4C, the method 1550 is described.

At operation 1555, in one embodiment, a set of control signals are accessed, wherein at least a first control signal of the set of control signals includes a measured acceleration value associated with a movement of a vehicle component of a vehicle, wherein the vehicle component is coupled with a frame of the vehicle via at least one vehicle suspension damper.

At operation 1560, in one embodiment, a set of freefall acceleration threshold values is accessed.

At operation 1565, in one embodiment, the measured acceleration value is compared with the set of freefall acceleration threshold values.

At operation 1570, in one embodiment, a state of at least one valve within the at least one vehicle suspension damper is monitored, wherein the state controls a damping force within the at least one vehicle suspension damper.

At operation 1575, in one embodiment, based on the comparing, a control mode is determined for the at least one vehicle suspension damper.

At operation 1580, in one embodiment, according to the control mode and based on the monitoring, damping forces are regulated within the at least one vehicle suspension damper by actuating the at least one valve to adjust to a desired state, such that a tilt of the frame is reduced.

Figure 16A:
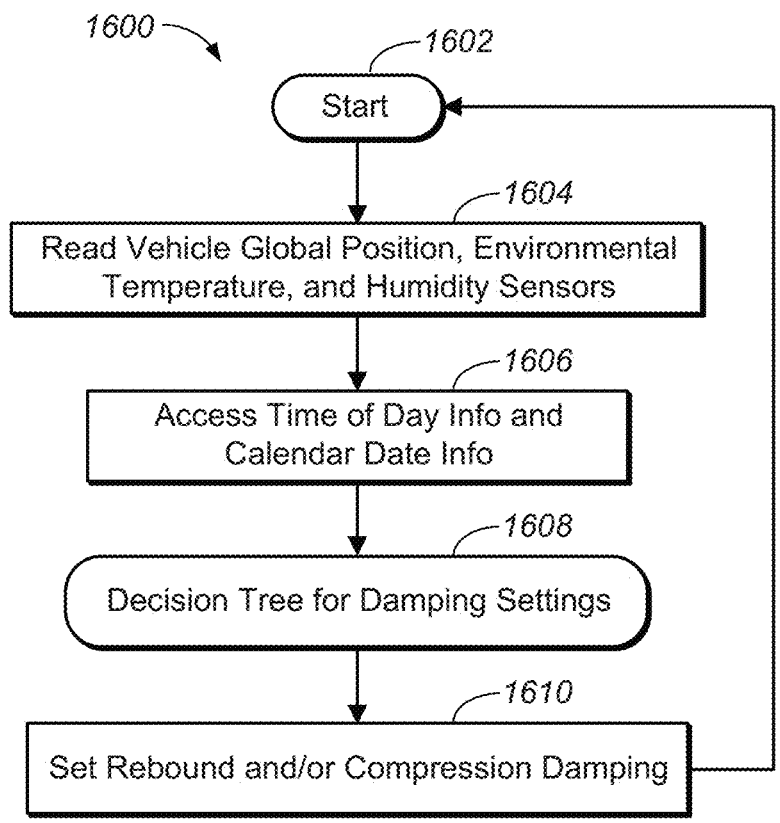

FIG. 16A is a flow diagram of a method 1600 for controlling vehicle motion, in accordance with an embodiment. The method 1600 provides for control mode determinations based on a vehicle's global position, the time of day, the calendar date, the environmental temperature, and the humidity. The method 1600 starts at operation 1602. The method 1602 moves from operation 2602 to operation 1604.

At operation 1604, in one embodiment, the set of sensors 440 sense the vehicles global position, the environmental temperature and the humidity.

At operation 1606, in one embodiment, a date tracker 478 determines the time of day and the calendar date.

At operation 1608, in one embodiment, the control system 404 accesses (retrieves from the set of sensors 440 or receives from the set of sensors 440) the sensed information from the set of sensors 440 (such as the vehicle global position information, the environmental temperature information and the humidity information) and the date information from the date tracker 478 (such as the time of day and the calendar date). The control system 404, in one embodiment, compares the determined vehicle global position with a database of information regarding global positioning, compares the measured environmental temperature values with predetermined environmental temperature threshold values, and compares the measured humidity values with predetermined humidity threshold values 489. The control system 404 then determines, based on the comparisons made and the date information, control mode settings for each of the vehicle shock absorbers.

At operation 1610, in one embodiment, the control system 404 causes the control modes to be applied to the shock absorbers by setting the rebound and/or compression damping control modes.

Figure 16B:
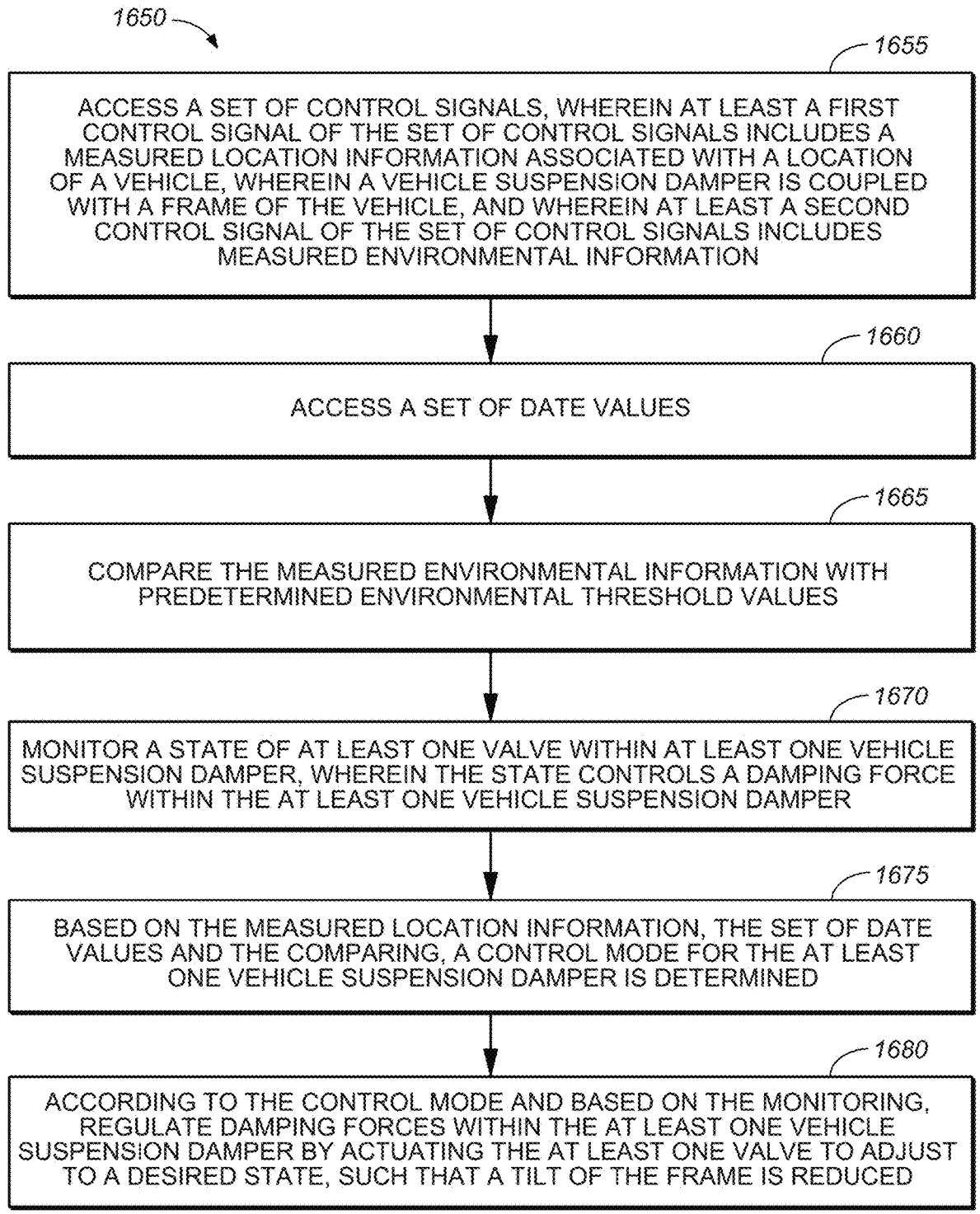

FIG. 16B is a flow diagram of a method 1650 for controlling vehicle motion, in accordance with an embodiment. With reference to FIG. 16B and FIGS. 4A-4C, the method 1650 is described.

At operation 1655, in one embodiment, a set of control signals 442 is accessed, wherein at least a first control signal of the set of control signals 442 includes a measured location information associated with a location of a vehicle, wherein a vehicle suspension damper is coupled with a frame of the vehicle, wherein at least a second control signal of the set of control signals includes measured environmental information.

At operation 1660, in one embodiment, a set of date values is accessed.

At operation 1665, in one embodiment, the measured environmental information is compared with predetermined environmental threshold values 487.

At operation 1670, in one embodiment, a state of at least one valve within the at least one vehicle suspension damper is monitored, wherein the state controls a damping force within the at least one vehicle suspension damper.

At operation 1675, in one embodiment, based on the measured location information, the set of date values and the comparing, a control mode for the at least one vehicle suspension damper is determined.

At operation 1680, in one embodiment, according to the control mode and based on the monitoring, damping forces are regulated within the at least one vehicle suspension damper by actuating the at least one valve to adjust to a desired state, such that a tilt of the frame is reduced.

Figure 17A:
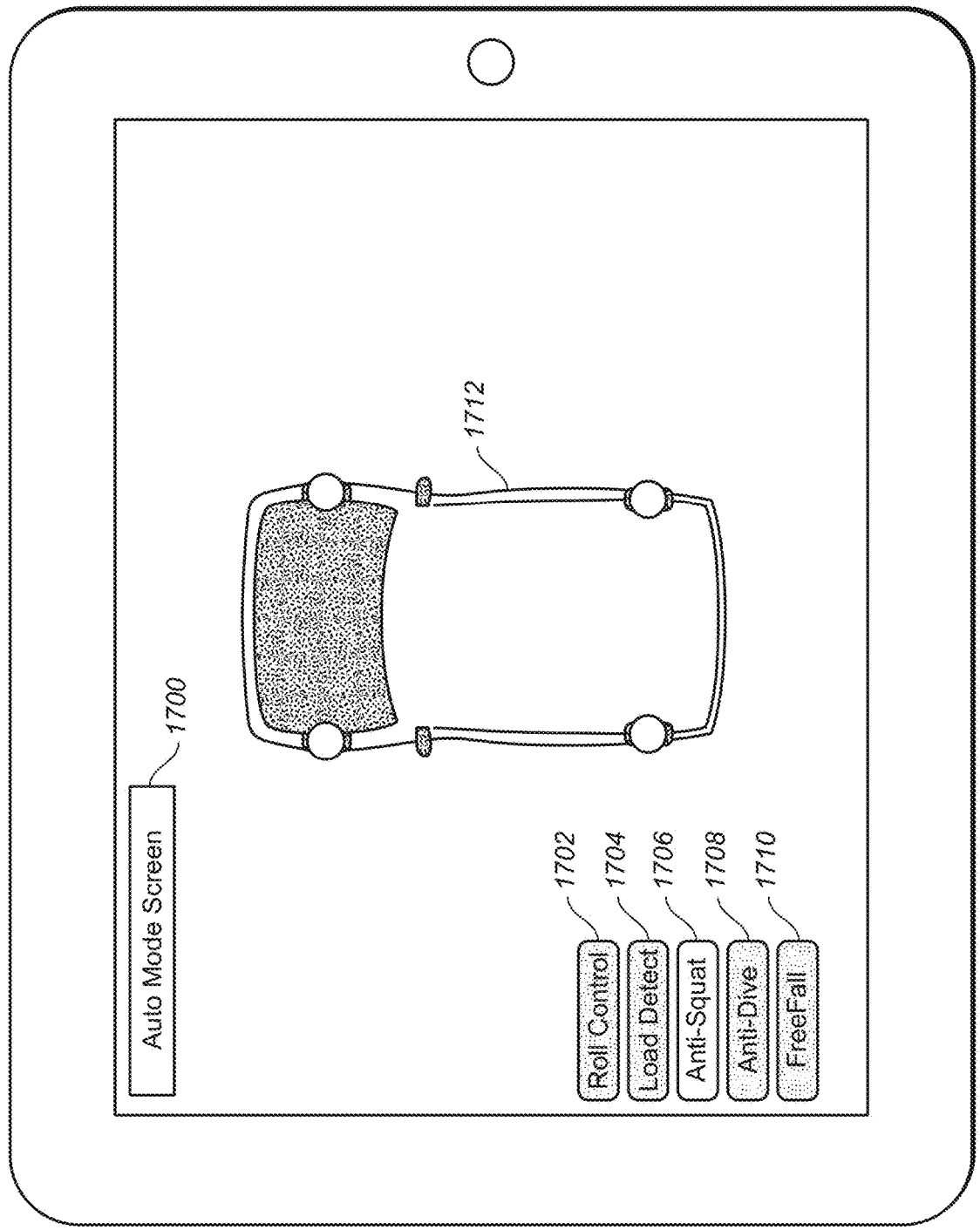
FIGS. 17A-17C show interactive touch screens, in accordance with various embodiments.
Figure 17B:
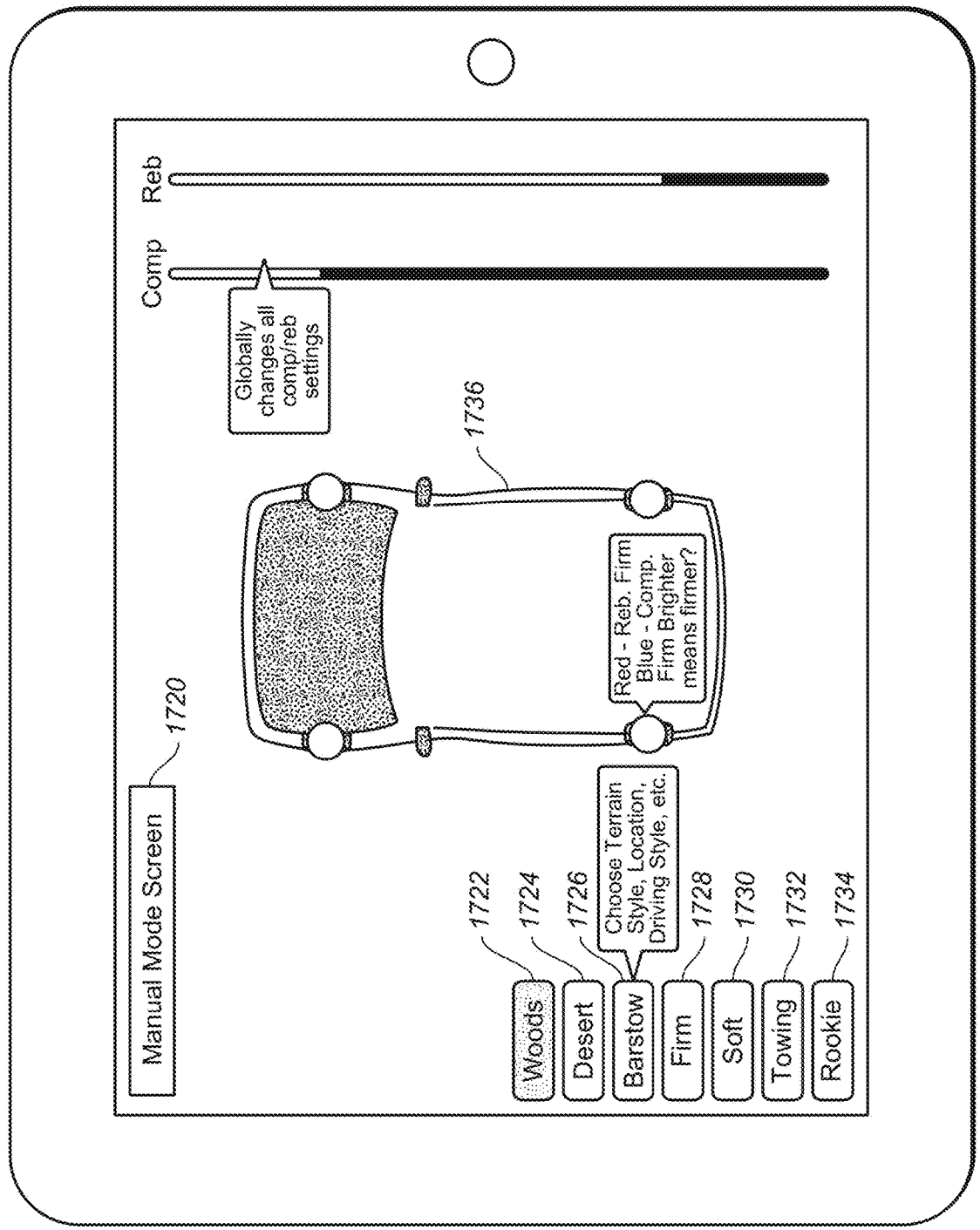
Figure 17C:
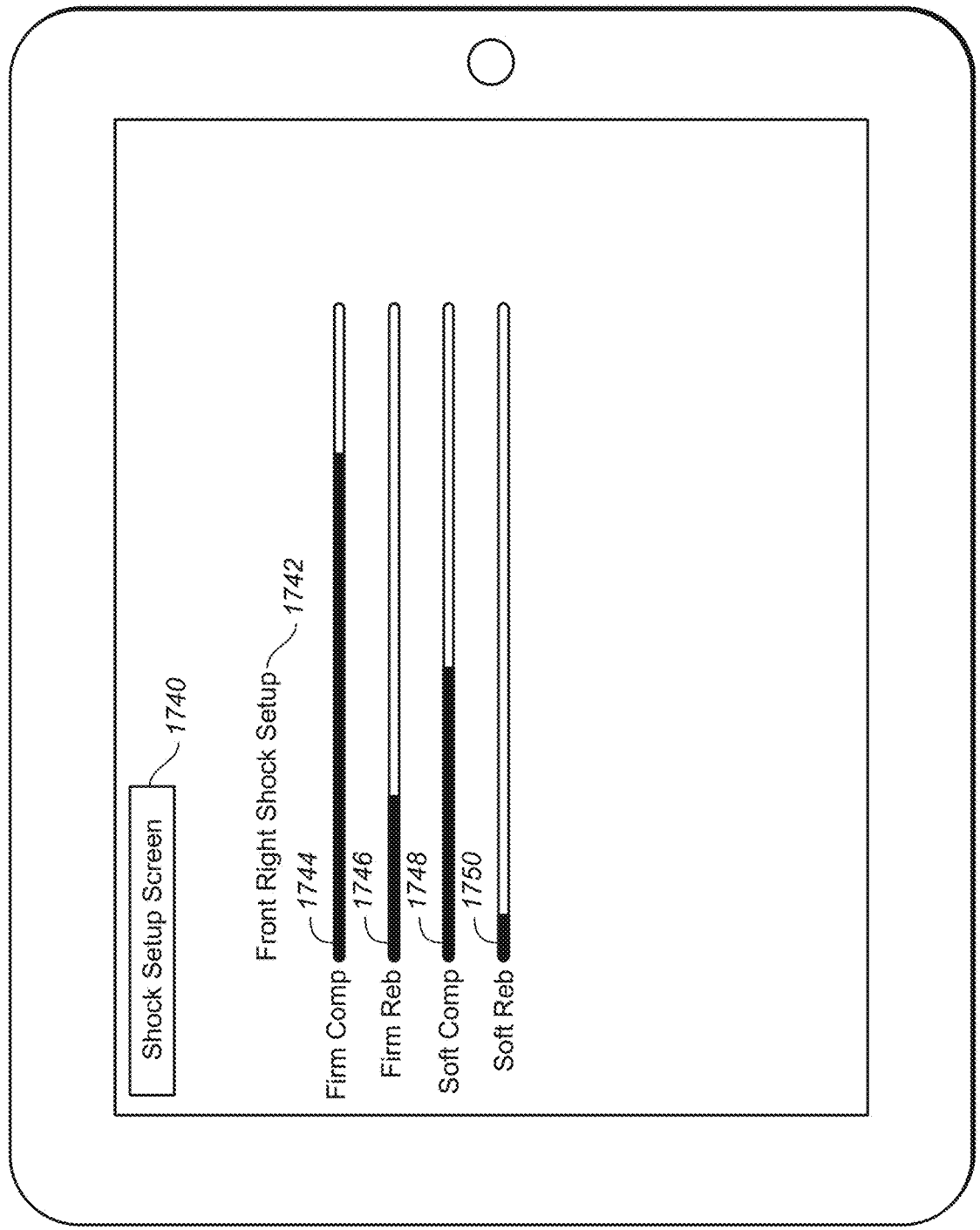

At FIGS. 17A-17C, user interfaces of the auto mode screen 1700, the manual mode screen 1720 and the shock setup screen 1740 are shown, in accordance with various embodiments. These user interfaces may appear on a touch-screen mounted in a vehicle or on a small phone/tablet that may be accessed remotely, in various embodiments.

The auto mode screen 1700 at FIG. 17A appears on an interactive touch screen, which includes any of the following options for automatic performance: a roll control option 1702; a load detect option 1704; an anti-squat option 1706; an anti-dive option 1708; and a freefall option 1710. Any of these options may be enabled or disabled. Additionally, a vehicle 1712 is shown at the auto mode screen 1700. A visual indicator (e.g., a color, a pattern, etc.) at each wheel shows if the rebound or compression of the shock absorber located at that wheel base is firm or soft.

The manual mode screen 1720 at FIG. 17B appears on an interactive touch screen, which includes various selectable options that, once selected, support a certain terrain, style, location, driving style, etc. related to the selection. For example, selectable options may include any of the following: a woods option 1722; a desert option 1724; a Barstow option 1726; a firm setting option 1728; a soft setting option 1730; a towing option 1732; and a rookie (slow driving) option 1734. Basically, parameters may be chosen based on a location of the vehicle or type of terrain anticipated to be traveling upon, for example. Additionally, parameters may be controlled through a remote phone that is communicatively coupled with a wireless transmitter located at the vehicle. Further, the manual mode screen 1720 may also include a visual of a vehicle 1736. A visual indicator (e.g., a color, a pattern, etc.) at each wheel represents what control mode under which each wheel is operating.

The shock setup screen 1740 at FIG. 17C appears on an interactive touch screen, in one embodiment, which includes displays a representation of the extent to which each shock absorber is functioning under a particular control mode. For example, the front right shock setup 1742 is shown to be functioning under all four control mode settings ("Firm Comp" 1744, "Firm Reb" 1746, "Soft Comp" 1748, and "Soft Reb" 1750) at varying levels, as is represented by the color indicator extending from each control mode setting label.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What we claim is:

1. A method for adjusting a suspension damper based upon sensor input, said method comprising:
receiving sensor input corresponding to environmental information pertaining to an environment in which a vehicle is located, said sensor input obtained from a sensor; and
changing a valve setting in said suspension based upon said sensor input, wherein said sensor input corresponding to said environmental information is generated by said sensor detecting a humidity at said location in which said vehicle is located.

2. The method for adjusting a suspension damper based upon sensor input as recited in claim 1, wherein said sensor input corresponding to said environmental information is generated by said sensor detecting an environmental condition occurring at said location in which said vehicle is located.

3. The method for adjusting a suspension damper based upon sensor input as recited in claim 1, wherein a plurality of said suspension dampers are adjusted based upon said sensor input corresponding to said environmental information generated by said sensor detecting an environmental condition occurring at said location in which said vehicle is located.

4. The method for adjusting a suspension damper based upon sensor input as recited in claim 1, wherein said sensor input corresponding to said environmental information is generated by said sensor detecting a temperature at said location in which said vehicle is located.

5. The method for adjusting a suspension damper based upon sensor input as recited in claim 1, wherein said sensor input corresponding to said environmental information is generated by said sensor detecting a temperature and said humidity at said location in which said vehicle is located.

6. The method for adjusting a suspension damper based upon sensor input as recited in claim 1, wherein said sensor input corresponding to said environmental information is generated by said sensor detecting an environmental condition and comparing said environmental condition to an environmental threshold value.

7. The method for adjusting a suspension damper based upon sensor input as recited in claim 1, wherein said sensor input corresponding to said environmental information is generated by said sensor detecting a temperature at said location in which said vehicle is located and comparing said temperature to a temperature threshold value.

8. The method for adjusting a suspension damper based upon sensor input as recited in claim 1, wherein said sensor input corresponding to said environmental information is generated by said sensor detecting said humidity at said location in which said vehicle is located and comparing said humidity to a humidity threshold value.

9. The method for adjusting a suspension damper based upon sensor input as recited in claim 1, wherein said sensor input corresponding to said environmental information is generated by said sensor for determining a temperature and said humidity at said location in which said vehicle is located and comparing said temperature to a temperature threshold value and comparing said humidity to a humidity threshold value.

10. The method for adjusting a suspension damper based upon sensor input as recited in claim 1, wherein said sensor input corresponding to said environmental condition is generated by said sensor wherein said sensor is selected from the group consisting of: a sensor for determining a temperature of said environment, and a sensor for determining said humidity of said environment.

* * * * *